US010873719B2

(12) United States Patent
Ohmura et al.

(10) Patent No.: US 10,873,719 B2
(45) Date of Patent: Dec. 22, 2020

(54) IMAGE PROCESSING DEVICE, IMAGE PROCESSING SYSTEM, IMAGE PROCESSING METHOD, AND COMPUTER PROGRAM PRODUCT

(71) Applicants: Keiji Ohmura, Kanagawa (JP); Takeshi Hasegawa, Kanagawa (JP)

(72) Inventors: Keiji Ohmura, Kanagawa (JP); Takeshi Hasegawa, Kanagawa (JP)

(73) Assignee: RICOH COMPANY, LIMITED, Tokyo (JP)

( * ) Notice: Subject to any disclaimer, the term of this patent is extended or adjusted under 35 U.S.C. 154(b) by 16 days.

(21) Appl. No.: 15/665,459

(22) Filed: Aug. 1, 2017

(65) Prior Publication Data

US 2017/0359546 A1 Dec. 14, 2017

Related U.S. Application Data

(63) Continuation of application No. PCT/JP2015/086394, filed on Dec. 25, 2015.

(30) Foreign Application Priority Data

Feb. 5, 2015 (JP) .................................. 2015-021637
Oct. 26, 2015 (JP) .................................. 2015-209977

(51) Int. Cl.
*H04N 5/445* (2011.01)
*G09G 5/00* (2006.01)
(Continued)

(52) U.S. Cl.
CPC ..... *H04N 5/44504* (2013.01); *G06K 9/00718* (2013.01); *G06K 9/00771* (2013.01);
(Continued)

(58) Field of Classification Search
CPC .. H04N 5/44504; H04N 5/44591; H04N 7/18; H04N 7/188; H04N 7/181;
(Continued)

(56) References Cited

U.S. PATENT DOCUMENTS 9,082,018 B1 * 7/2015 Laska ................. G06F 3/04845
2005/0104958 A1 * 5/2005 Egnal ................. G06K 9/00771
348/143
(Continued)

FOREIGN PATENT DOCUMENTS

CN 104244802 A 12/2014
CN 104284146 A 1/2015
(Continued)

OTHER PUBLICATIONS

International Search Report dated Mar. 29, 2016 in PCT/JP2015/086394 filed on Dec. 25, 2015 ( with English Translation).
(Continued)

*Primary Examiner* — Joseph G Ustaris
*Assistant Examiner* — Jimmy S Lee
(74) *Attorney, Agent, or Firm* — Oblon, McClelland, Maier & Neustadt, L.L.P.

(57) ABSTRACT

An image processing device includes a display device, a video display controller configured to display video data imaged by an imaging device in a predetermined display region to be displayed by the display device, and a region display controller configured to display a plurality of display elements representing determination regions based on a plurality of types of determination functions with respect to the video data in the display region by superimposing the plurality of display elements on the video data in aspects different from each other.

16 Claims, 37 Drawing Sheets

(51) Int. Cl.
*G09G 5/14* (2006.01)
*H04N 7/18* (2006.01)
*G06K 9/00* (2006.01)
*G06K 9/62* (2006.01)
*H04N 21/47* (2011.01)
*H04N 21/431* (2011.01)
*G06T 7/00* (2017.01)
*G09G 5/377* (2006.01)

(52) U.S. Cl.
CPC ............ *G06K 9/6253* (2013.01); *G06T 7/001* (2013.01); *G09G 5/00* (2013.01); *G09G 5/14* (2013.01); *H04N 7/18* (2013.01); *H04N 7/188* (2013.01); *H04N 21/4316* (2013.01); *H04N 21/47* (2013.01); *G09G 5/377* (2013.01); *H04N 7/181* (2013.01)

(58) Field of Classification Search
CPC .......... G06K 9/00718; G06K 9/00771; G06K 9/6253; G06T 7/001; G09G 5/00; G09G 5/14; G09G 5/377
USPC ........................................................ 348/129
See application file for complete search history.

(56) References Cited

U.S. PATENT DOCUMENTS

| | | | | |
|---|---|---|---|---|
| 2007/0014439 | A1* | 1/2007 | Ando | G08B 31/00 382/118 |
| 2009/0096871 | A1* | 4/2009 | Kuwano | G06T 7/20 348/169 |
| 2014/0050455 | A1* | 2/2014 | Ni | H04N 7/181 386/224 |
| 2014/0132758 | A1* | 5/2014 | Saptharishi | G06T 7/90 348/135 |
| 2014/0267390 | A1* | 9/2014 | Padwick | G06T 3/4038 345/629 |
| 2015/0015704 | A1 | 1/2015 | Hirasawa et al. | |
| 2015/0015718 | A1* | 1/2015 | Fujimatsu | G06K 9/00771 348/159 |
| 2015/0371403 | A1* | 12/2015 | Koyama | G06K 9/00288 382/103 |

FOREIGN PATENT DOCUMENTS

| | | |
|---|---|---|
| JP | 2004-248147 | 9/2004 |
| JP | 2006-078381 | 3/2006 |
| JP | 2008-16898 | 1/2008 |
| JP | 2013-253913 | 12/2013 |
| JP | 2014-123276 | 3/2014 |
| JP | 5506989 | 5/2014 |
| JP | 2015-019250 | 1/2015 |
| JP | 2016-018571 | 2/2016 |
| JP | 2016-039496 | 3/2016 |
| JP | 2016-048910 | 4/2016 |
| WO | 2016/125420 | 8/2016 |

OTHER PUBLICATIONS

Written Opinion dated Mar. 29, 2016 in PCT/JP2015/086394 filed on Dec. 25, 2015.
Office Action dated Aug. 8, 2019 in Chinese Application No. 201580075316.X (w/English translation).
Office Action dated Jul. 14, 2020 in Japanese Application No. 2019-183272 (w/English translation).

* cited by examiner

FIG.10
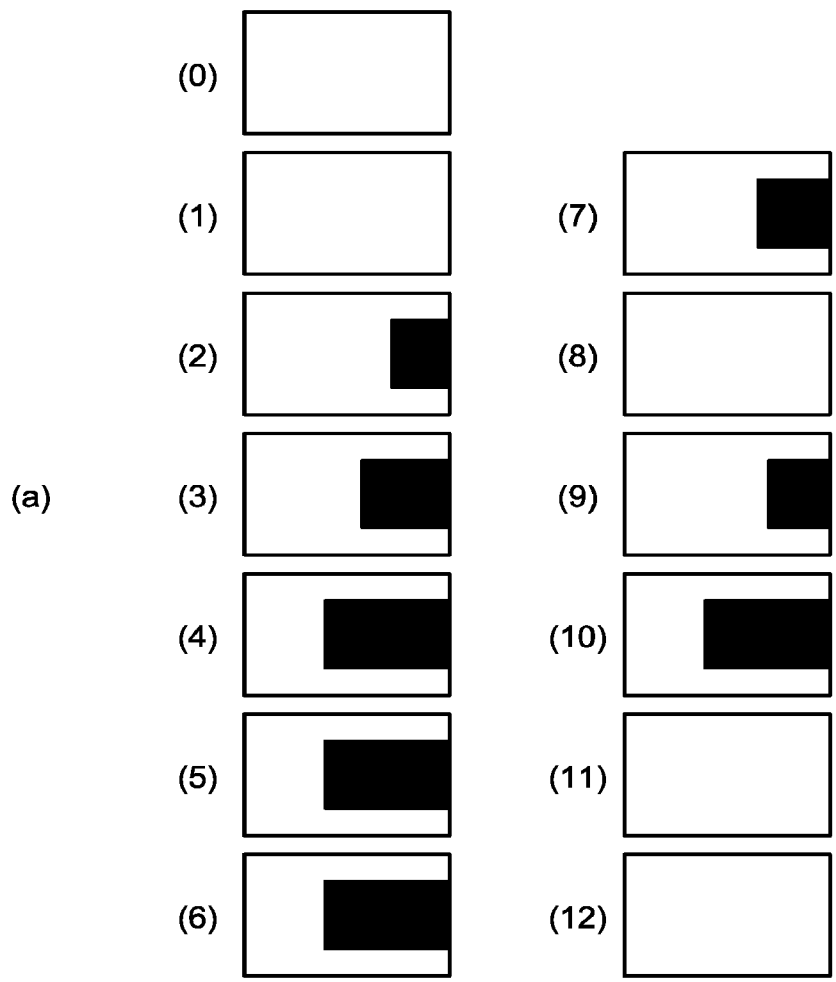
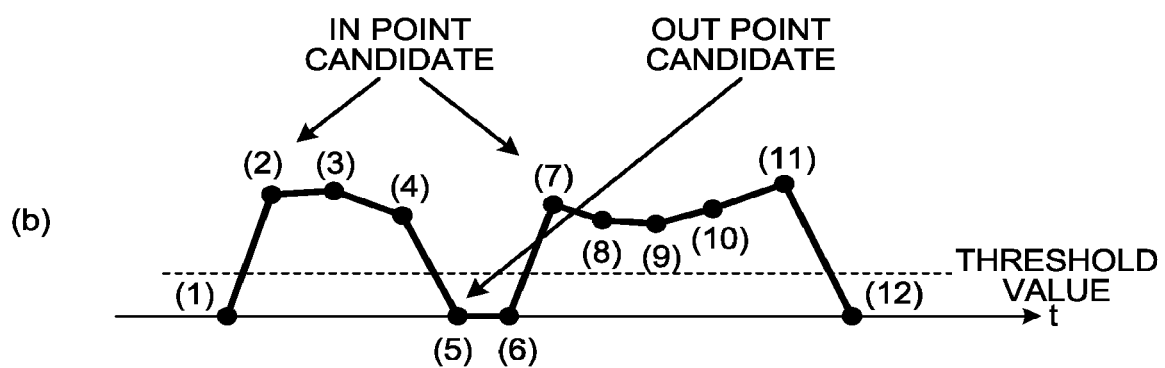

IMAGE PROCESSING DEVICE, IMAGE PROCESSING SYSTEM, IMAGE PROCESSING METHOD, AND COMPUTER PROGRAM PRODUCT

CROSS-REFERENCE TO RELATED APPLICATIONS

This application is a continuation of PCT international Application Ser. No. PCT/JP2015/086394, filed on Dec. 25, 2015, which designates the United States and which claims the benefit of priority from Japanese Patent Application No. 2015-021637, filed on Feb. 5, 2015 and Japanese Patent Application No. 2015-209977, filed on Oct. 26, 2015; the entire contents of which are incorporated herein by reference.

BACKGROUND OF THE INVENTION

1. Field of the Invention

The present invention relates to an image processing device, an image processing system, an image processing method, and a computer program product.

2. Description of the Related Art

Recently, the development of an image monitoring system is remarkable in which video data obtained by recording a video by an imaging device such as a camcorder is analyzed, and the detection of an object, the detection of the movement or the abnormality of the object on the video, or the like is performed. Such an image monitoring system, for example, is applied to a production line or the like of a product.

As such an image monitoring system detecting an abnormality of a product on the basis of an image, in Japanese Unexamined Patent Application Publication No. 2006-78381, proposed is a system in which it is determined whether or not there is an abnormality at a predetermined timing, and OK determination or NG determination is displayed.

However, a technology described in Japanese Unexamined Patent Application Publication No. 2006-78381 only displays a result of determining whether or not there is an abnormality at a predetermined timing, and thus, in a case where there are various determination functions (for example, a function of constantly performing detection but not at a predetermined timing, a function of detecting only a change in the image but not the abnormality, or the like), it is not possible to simultaneously represent how such functions are operated. Therefore, in the case of a system having a plurality of determination functions, there is a problem in that it is not possible to simultaneously grasp operation states of such determination functions.

SUMMARY OF THE INVENTION

According to one aspect of the present invention, an image processing device includes a display device, a video display controller configured to display video data imaged by an imaging device in a predetermined display region to be displayed by the display device, and a region display controller configured to display a plurality of display elements representing determination regions based on a plurality of types of determination functions with respect to the video data in the display region by superimposing the plurality of display elements on the video data in aspects different from each other.

BRIEF DESCRIPTION OF THE DRAWINGS

FIG. 10 is a diagram illustrating an operation of detecting the change point in the trigger region.

DESCRIPTION OF EMBODIMENTS

Figure 1:
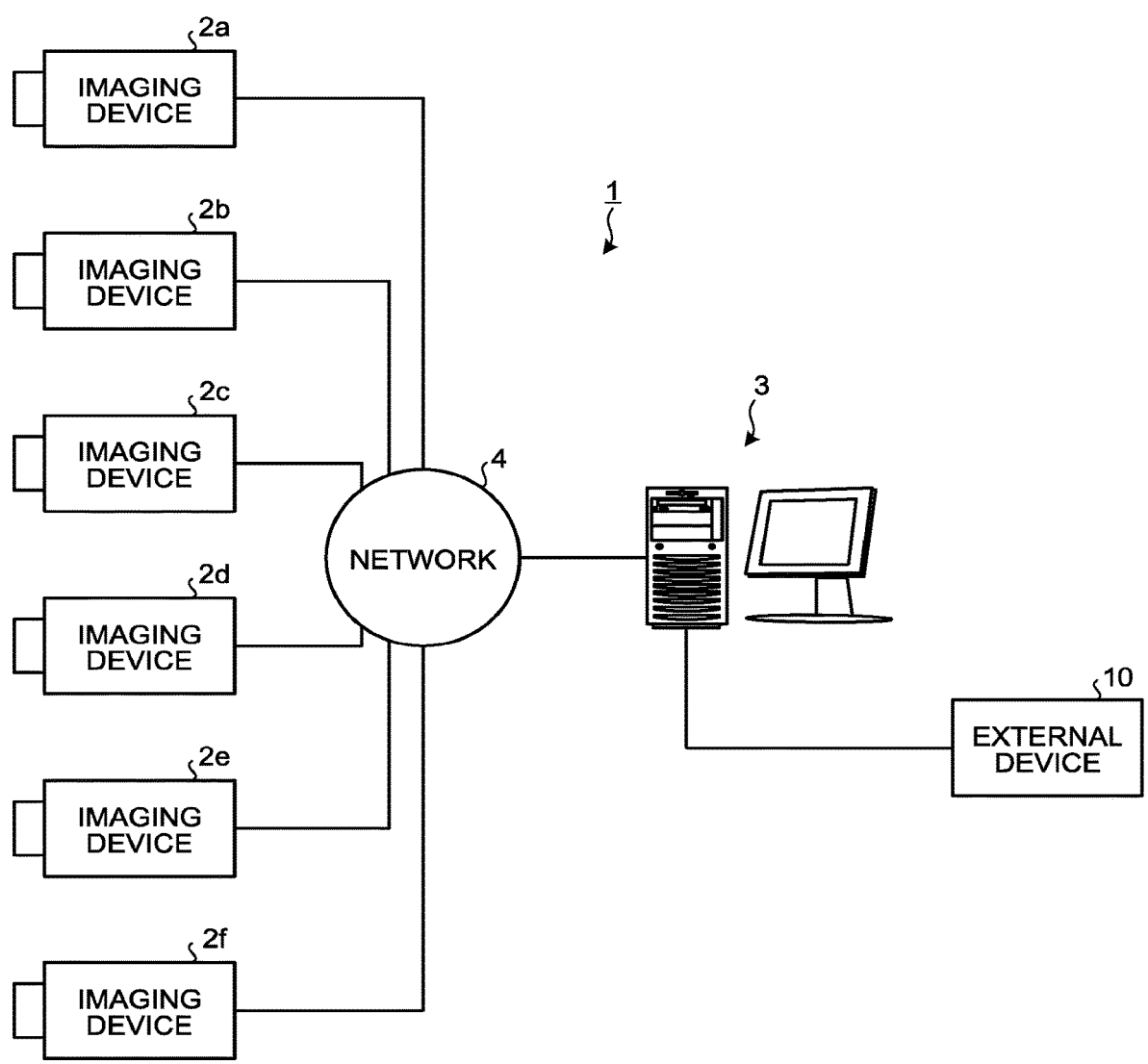
FIG. 1 is a diagram illustrating an example of an overall configuration of an image processing system according to an embodiment.

The accompanying drawings are intended to depict exemplary embodiments of the present invention and should not be interpreted to limit the scope thereof. Identical or similar reference numerals designate identical or similar components throughout the various drawings.

Description of the Embodiments

The terminology used herein is for the purpose of describing particular embodiments only and is not intended to be limiting of the present invention.

As used herein, the singular forms "a", "an" and "the" are intended to include the plural forms as well, unless the context clearly indicates otherwise.

In describing preferred embodiments illustrated in the drawings, specific terminology may be employed for the sake of clarity. However, the disclosure of this patent specification is not intended to be limited to the specific terminology so selected, and it is to be understood that each specific element includes all technical equivalents that have the same function, operate in a similar manner, and achieve a similar result.

Hereinafter, embodiments of an image processing device, an image processing system, an image processing method, a program, and a recording medium of the present invention will be described in detail with reference to the drawings. In addition, the present invention is not limited by the following embodiments, and constituents in the following embodiments include constituents which can be easily conceived by a person skilled in the art, substantially the same constituents, and constituents in a range of so-called equivalents. Further, various omissions, substitutes, changes, and combines can be performed of the constituents within a range not departing from the gist of the following embodiments.

Overall Configuration of Image Processing System

FIG. 1 is a diagram illustrating an example of the overall configuration of an image processing system according to an embodiment. The overall configuration of an image processing system 1 of this embodiment will be described with reference to FIG. 1.

As illustrated in FIG. 1, the image processing system 1 of this embodiment includes imaging devices 2a to 2f (imaging device), an information processing device 3, and a network 4.

The imaging devices 2a to 2f is a camcorder which converts light from a subject into an electrical signal, and thus, images (shoots) the subject, and generates video data which is a moving image (for example, 10 [FPS]) formed of a plurality of frames (image data). For example, the imaging devices 2a to 2f image a production facility, a production line, or the like, which produces a product, and generate the video data for detecting abnormality with respect to a work, which is a manufacture.

Furthermore, in a case where it is not necessary to distinguish the imaging devices 2a to 2f from each other or in a case where the imaging devices 2a to 2f are collectively referred, the imaging devices 2a to 2f are simply referred to as an "imaging device 2". In addition, in FIG. 1, the image processing system 1 includes six imaging devices 2, but is not limited thereto, and may include other number of imaging devices 2.

The information processing device 3 is a personal computer (PC), a work station, or the like, which functions as an image processing device executing image determination on the basis of the video data imaged by the imaging device 2. In addition, the information processing device 3 is connected to an external device 10 such as a production facility, to communicate with each other, for example, through a fieldbus standard.

The network 4, for example, is a network of an Ethernet (Registered Trademark) standard for connecting the imaging devices 2a to 2f and the information processing device 3 to each other. In this case, in the network 4, data communication is performed by a protocol such as a transmission control protocol (TCP)/an internet protocol (IP). In addition, in this case, in the imaging devices 2a to 2f and the information processing device 3, a media access control (MAC) address for communicating with a protocol such as TCP/IP is provided, and an IP address such as a private IP address is allocated. In addition, a specific configuration of the network 4, for example, includes a star wiring form in which each of the imaging devices 2a to 2f and the information processing device 3 is connected to a switching hub including a plurality of ports through a local area network (LAN) cable, as an example.

Furthermore, an example will be described in which the network 4 illustrated in FIG. 1 performs communication through TCP/IP, but is not limited thereto, and for example, a form or the like may be adopted in which a plurality of video graphics array (VGA) terminals or universal serial bus (USB) ports are provided on the information processing device 3 side, and a plurality of imaging devices 2 are connected to the information processing device 3 through the VGA cable or the USB cable.

Hardware Configuration of Information Processing Device

Figure 2:
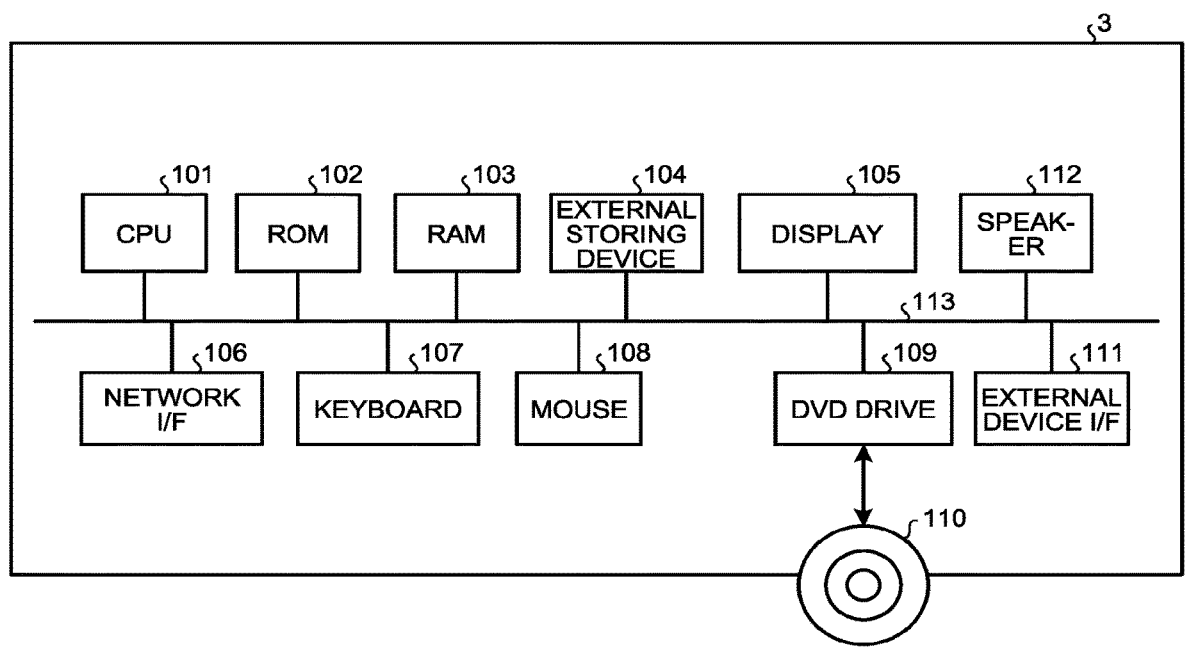
FIG. 2 is a diagram illustrating an example of a hardware configuration of an information processing device according to the embodiment.

FIG. 2 is a diagram illustrating an example of a hardware configuration of the information processing device according to the embodiment. The hardware configuration of the information processing device 3 of this embodiment will be described with reference to FIG. 2.

As illustrated in FIG. 2, the information processing device 3 includes a central processing unit (CPU) 101, a read only memory (ROM) 102, a random access memory (RAM) 103, an external storing device 104, a display 105, a network I/F 106, a keyboard 107, a mouse 108, a digital versatile disc (DVD) drive 109, an external device I/F 111, and a speaker 112.

The CPU 101 is a device controlling the entire operation of the information processing device 3. The ROM 102 is a non-volatile storing device which stores a program for the information processing device 3. The RAM 103 is a volatile storing device which is used as a work area of the CPU 101.

The external storing device 104 is a storing device such as a hard disk drive (HDD) or a solid state drive (SSD), which stores various data items such as the video data imaged by the imaging device 2 and setting information.

The display 105 is a display device displaying a screen of various information items such as a cursor, a menu, a window, a character, or an image, or an application for executing image determination operation of the information processing device 3. The display 105, for example, is a cathode ray tube (CRT) display, a liquid crystal display, a plasma display, an organic electroluminescence (EL) display, or the like. Furthermore, the display 105, for example, is connected to a main body of the information processing device 3 through a VGA cable, high-definition multimedia interface (HDMI: Registered Trademark) cable, or the like, or is connected to the main body of the information processing device 3 through an Ethernet cable.

The network I/F 106 is an interface for performing the data communication by being connected to the network 4. The network I/F 106, for example, is a network interface card (NIC) which is capable of performing communication in a protocol such as TCP/IP. Specifically, the information processing device 3 acquires the video data from the imaging device 2 through the network 4 and the network I/F 106.

The keyboard 107 is an input device which inputs a character, a number, the selection of various instructions, the movement of a cursor, the setting of the setting information, and the like. Furthermore, the set-up number is not limited to a set-up number configured only of numbers, and may be a set-up number in which alphabetical characters, symbols, and the like are combined. The mouse 108 is an input device for performing the selection and the execution of various instructions, the selection of a processing target, the movement of the cursor, the setting of the setting information, and the like.

The DVD drive 109 is a device which reads out data from a DVD 110, as an example of a detachable storing medium, writes data in the DVD, and deletes data from the DVD.

The external device I/F 111 is an interface for performing the data communication by being connected to the external device 10. The external device I/F 111, for example, is an interface card which is capable of performing communication in a fieldbus standard. Specifically, the information processing device 3 performs the data communication with respect to the external device 10 through the external device I/F 111.

The speaker 112 is a device which outputs sound according to the operation of the application.

The CPU 101, the ROM 102, the RAM 103, the external storing device 104, the display 105, the network I/F 106, the keyboard 107, the mouse 108, the DVD drive 109, the external device I/F 111, and the speaker 112 described above are connected to each other to communicate with each other through a bus 113 such as an address bus and a data bus. Furthermore, in the case of being connected through an Ethernet cable, the display 105 is connected to the network I/F 106, and in this case, the data communication is performed by the protocol such as TCP/IP.

Block Configuration of Information Processing Device

Figure 3:
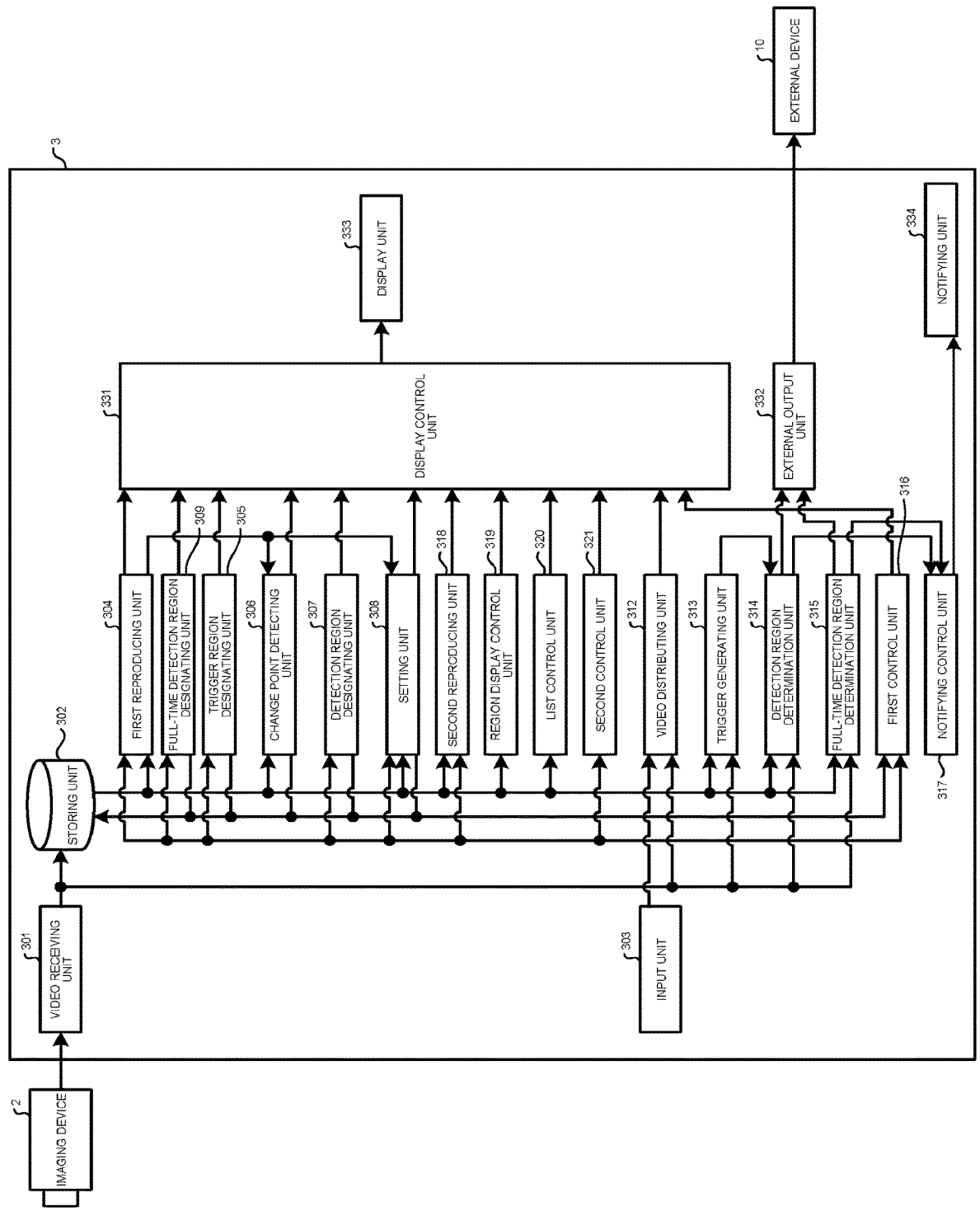
FIG. 3 is a diagram illustrating an example of a configuration of a functional block of the information processing device according to the embodiment.

FIG. 3 is a diagram illustrating an example of the configuration of a functional block of the information processing device according to the embodiment. A block configuration of the information processing device 3 will be described with reference to FIG. 3.

As illustrated in FIG. 3, the information processing device 3 includes a video receiving unit 301, a storing unit 302 (storage), an input unit 303, a first reproducing unit 304, a trigger region designating unit 305, a change point detecting unit 306, a detection region designating unit 307, a setting unit 308, a full-time detection region designating unit 309, a video distributing unit 312 (an example of a video display controller), a trigger generating unit 313, a detection region determination unit 314, a full-time detection region determination unit 315, a first control unit 316 (an example of a region display controller), a notifying control unit 317, a second reproducing unit 318 (an example of a video display controller), a region display control unit 319 (an example of a region display controller), a list control unit 320 (a list controller), a second control unit 321, a display control unit 331, an external output unit 332, a display unit 333 (display device), and a notifying unit 334 (notifying controller). Furthermore, in FIG. 3, in order to simplify the description, the network 4 is not illustrated. In addition, in each of the function units described above, the trigger region designating unit 305, the detection region designating unit 307, the full-time detection region designating unit 309, the trigger generating unit 313, the detection region determination unit 314, the full-time detection region determination unit 315, and the first control unit 316 correspond to an example of a "time information managing controller" of the present invention.

The video receiving unit 301 is a function unit which performs the data communication with respect to the imaging device 2 through the network 4, and receives the video data from the imaging device 2. The video receiving unit 301 stores the received video data in the storing unit 302. The video receiving unit 301 is realized by the network I/F 106 illustrated in FIG. 2.

The storing unit 302 is a storing device which stores the video data received from the video receiving unit 301, various setting information items, time information described below, and the like. The storing unit 302 stores the video data received from the video receiving unit 301 by identifying that the video data is the video data which is generated by the imaging device 2. The storing unit 302, for example, is realized by the RAM 103 or the external storing device 104 illustrated in FIG. 2.

The input unit 303 is a device which performs manipulation input for the image determination operation or the like which are executed by the information processing device 3. The input unit 303 is realized by the keyboard 107 and the mouse 108 illustrated in FIG. 2.

The first reproducing unit 304 is a function unit which transmits the video data acquired from the storing unit 302 to the display control unit 331, and reproduces and displays the video data on the display unit 333 with respect to the display control unit 331, according to the manipulation signal from the input unit 303 manipulated by a user. Specifically, the first reproducing unit 304 reproduces and displays the video data on a setting video display unit 502 of a setting screen 500 to be displayed on the display unit 333 described below in FIG. 6 or the like. The first reproducing unit 304 is realized by a program which is executed by the CPU 101 illustrated in FIG. 2.

The trigger region designating unit 305 is a function unit which designates a trigger region determining a timing of a trigger in the display region of the video data in the display unit 333 (the setting video display unit 502 described below in FIG. 6 or the like), according to the manipulation signal from the input unit 303 manipulated by the user. The trigger region designating unit 305 stores the information of the designated trigger region in the storing unit 302 in association with each of the imaging devices 2. In addition, the information of the trigger region, for example, is information such as coordinates representing the position of the trigger region in the display region of the video data and the shape of the trigger region. The trigger region designated by the trigger region designating unit 305 is used for a flash detecting function described below. The trigger region designating unit 305 is realized by a program which is executed by the CPU 101 illustrated in FIG. 2.

In a case where the trigger region is designated by the trigger region designating unit 305, the change point detecting unit 306 is a function unit which acquires a frame for a predetermined time before and after the time of a frame of the video data reproduced and displayed by the first reproducing unit 304 at a designated time point, and in the acquired frame, calculates a difference in pixel values of the frame and the immediately previous frame for each frame, and detects a change point with respect to an image within the trigger region on the basis of the calculated difference. The change point will be described below. In a calculating method of the difference, for example, the pixel values in the trigger regions of two frames are compared with each other, and the total number of pixels having pixel values different from each other by greater than or equal to predetermined sensitivity is calculated as the difference. Furthermore, in a case where the frame is an image in a gray scale, the pixel value is coincident with a brightness value, and thus, brightness values in the trigger regions of two frames may be compared with each other, and the total number of pixels having brightness values different from each other by greater than or equal to the predetermined sensitivity may be calculated as the difference. In addition, in a case where the frame is an image configured of pixel values of RGB, the pixel values of any one of red (R), green (G), and blue (B) may be compared with each other, and as described above, the total number of pixels having pixel values different from each other by greater than or equal to the predetermined sensitivity may be calculated as the difference. In addition, edge detection processing may be performed in the image of the frame, and the total number of edge portions may be calculated as the difference. The change point detecting unit 306 is realized by the program which is executed by the CPU 101 illustrated in FIG. 2.

The detection region designating unit 307 is a function unit which designates a detection region, which is target of an image determination operation of detecting an abnormality in the display region of the video data in the display unit 333 (the setting video display unit 502), according to the manipulation signal from the input unit 303 manipulated by the user. The detection region designating unit 307 stores the information of the designated detection region in the storing unit 302 in association with each of the imaging devices 2. In addition, the information of the detection region, for example, is information such as coordinates representing the position of the detection region in the display region of the video data and the shape of the detection region. In addition, as described below, it is possible for the detection region designating unit 307 to designate a plurality of detection regions in the display region of the video data. The detection region designated by the detection region designating unit 307 is used for a flash detecting function described below. The detection region designating unit 307 is realized by a program which is executed by the CPU 101 illustrated in FIG. 2.

The setting unit 308 is a function unit which sets various setting information items and stores the setting information in the storing unit 302, according to the manipulation signal from the input unit 303 manipulated by the user. In addition, the setting unit 308 transmits information required to be displayed in the setting information which is set to the display control unit 331 from the storing unit 302, and displays the setting information on the display unit 333 with respect to the display control unit 331. The setting unit 308 is realized by a program which is executed by the CPU 101 illustrated in FIG. 2.

The full-time detection region designating unit 309 is a function unit which designates a full-time detection region, which is the target of the image determination operation of full-time detecting the abnormality in display region of the video data in the display unit 333 (the setting video display unit 502), according to the manipulation signal from the input unit 303 manipulated by the user. The full-time detection region designating unit 309 stores the information of the designated full-time detection region in the storing unit 302 in association with each of the imaging devices 2. In addition, the information of the full-time detection region, for example, is information such as coordinates representing the position of the full-time detection region in the display region of the video data and the shape of the full-time detection region. The full-time detection region designated by the full-time detection region designating unit 309 is used for a full-time detecting function described below. The full-time detection region designating unit 309 is realized by a program which is executed by the CPU 101 illustrated in FIG. 2.

The video distributing unit 312 is a function unit which transmits the real-time video data acquired from the video receiving unit 301 to the display control unit 331, and displays the video data on the display unit 333 with respect to the display control unit 331, according to the manipulation signal from the input unit 303 manipulated by the user. Specifically, the video distributing unit 312 sorts and displays the corresponding video data on video display units 401a to 401f of a watcher screen 400 to be displayed on the display unit 333 described below in FIG. 5 or the like. In addition, the video distributing unit 312 stores (records) each of the video data items to be displayed on the video display unit 401 in the storing unit 302. The video distributing unit 312 is realized by a program which is executed by the CPU 101 illustrated in FIG. 2.

The trigger generating unit 313 is a function unit which compares a difference image with an image in the trigger region of the frame of the video data in the trigger regions of the video display units 401a to 401f of the watcher screen 400 in FIG. 16 described below, and generates a trigger signal at the timing of the trigger, after a monitoring operation is started. The trigger generating unit 313 is realized by a program which is executed by the CPU 101 illustrated in FIG. 2.

The detection region determination unit 314 is a function unit which compares a detection standard image with the image of the detection region in the frame of the video data in the detection regions of the video display units 401a to 401f described above, before the setting time or after the setting time at the time of receiving the trigger signal generated by the after trigger generating unit 313, and determines whether or not there is an abnormality. The detection region determination unit 314 is realized by a program which is executed by the CPU 101 illustrated in FIG. 2.

The full-time detection region determination unit 315 is a function unit which compares a full-time detection standard image with the image in the full-time detection region of the frame of the video data, and constantly executes determination of whether or not there is an abnormality in the full-time detection region of the video display units 401a to 401f of the watcher screen 400 in FIG. 16 described below, after the monitoring operation is started. The full-time detection region determination unit 315 is realized by a program which is executed by the CPU 101 illustrated in FIG. 2.

The first control unit 316 is a function unit which controls the entire operation of the watcher screen 400 other than the start and the stop of the monitoring operation on the watcher screen 400 in FIG. 16 described below, according to the manipulation signal from the input unit 303 manipulated by the user. The first control unit 316 is realized by a program which is executed by the CPU 101 illustrated in FIG. 2.

The notifying control unit 317 is a function unit which outputs sound to the notifying unit 334, on the basis of the result of determining the detection region by the detection region determination unit 314. The notifying control unit 317 is realized by a program which is executed by the CPU 101 illustrated in FIG. 2.

The second reproducing unit 318 is a function unit which transmits the video data acquired from the storing unit 302 to the display control unit 331, and reproduces and displays the video data on the display unit 333 with respect to the display control unit 331, according to the manipulation signal from the input unit 303 manipulated by the user. Specifically, the second reproducing unit 318 sorts the corresponding video data, and reproduces and displays the sorted video data on video display units 701a to 701f of a viewer screen 700 to be displayed on the display unit 333 described below in FIG. 25 or the like. The second reproducing unit 318 is realized by a program which is executed by the CPU 101 illustrated in FIG. 2.

The region display control unit 319 is a function unit which displays the state of each of the determination regions to be superimposed on the frame of the video data which is reproduced and displayed on the video display units 701a to 701f of the viewer screen 700, on the basis of the information of the detection time each of the determination regions stored in the input unit 303 (the trigger region, the detection region, and the full-time detection region) (the time information). The region display control unit 319 is realized by a program which is executed by the CPU 101 illustrated in FIG. 2.

The list control unit 320 is a function unit which reads out a marker file stored in the storing unit 302, and displays a marker list screen 800 described below in FIG. 27, on which the contents of the marker file are displayed, on the viewer screen 700. Here, the marker file is a file in which time when the abnormality is detected by the full-time detecting function, time when the trigger is generated by the flash detecting function (the trigger signal is generated), and time when the abnormality is detected are chronologically recorded. The list control unit 320 is realized by a program which is executed by the CPU 101 illustrated in FIG. 2.

The second control unit 321 is a function unit which controls the entire operation of the viewer screen 700. The second control unit 321 is realized by a program which is executed by the CPU 101 illustrated in FIG. 2.

The display control unit 331 is a function unit which controls a display operation of the display unit 333. Specifically, the display control unit 331 displays the video data acquired from the first reproducing unit 304, the setting information set by the setting unit 308, the trigger region designated by the trigger region designating unit 305, the detection region designated by the detection region designating unit 307, and the like on the display unit 333. The display control unit 331 is realized by a program (a driver) which is executed by the CPU 101 illustrated in FIG. 2.

The external output unit 332 is a function unit which outputs an abnormality signal to the external device 10 in a case where the abnormality is determined by the detection region determination unit 314 or the full-time detection region determination unit 315. The external output unit 332 is realized by the external device I/F 111 illustrated in FIG. 2. Furthermore, the external output unit 332 outputs the abnormality signal, but is not limited thereto and may perform a procedure such as the transmission of a batch file for notifying an abnormality through an e-mail to the external device 10 or the notification of an abnormality onto the watcher screen 400 (for example, flash display by a lamp icon).

The display unit 333 is a device which displays various data items according to the control of the display control unit 331. In this embodiment, the display unit 333, in particular, displays the watcher screen 400, the setting screen 500, the viewer screen 700, and the like, described below, by a program (an application) which is executed by the CPU 101 illustrated in FIG. 2. The display unit 333 is realized by the display 105 illustrated in FIG. 2.

The notifying unit 334 is a device which outputs sound according to the control of the notifying control unit 317. The notifying unit 334 is realized by the speaker 112 illustrated in FIG. 2.

Furthermore, a part or all of the first reproducing unit 304, the trigger region designating unit 305, the change point detecting unit 306, the detection region designating unit 307, the setting unit 308, the full-time detection region designating unit 309, the video distributing unit 312, the trigger generating unit 313, the detection region determination unit 314, the full-time detection region determination unit 315, the first control unit 316, the notifying control unit 317, the second reproducing unit 318, the region display control unit 319, the list control unit 320, the second control unit 321, and the display control unit 331, illustrated in FIG. 3, may be realized by a hardware circuit such as an application specific integrated circuit (ASIC) or a field-programmable gate array (FPGA) but not by a program, which is software.

In addition, the function of each function unit illustrated in FIG. 3 is conceptually described, but is not limited thereto. For example, a plurality of function units illustrated in FIG. 3 as an independent function unit may be configured of one function unit. On the other hands, the function of one function unit in FIG. 3 may be divided into a plurality of functions, and thus, the function unit may be configured as a plurality of function units.

In addition, in order to simplify the following description, expression that the display control unit 331 displays the received data on the display unit 333 will be simplified to expression that a function unit transmitting the data to the display control unit 331 displays the data on the display unit 333 (or on the screen displayed on the display unit 333). For example, in a case where the first reproducing unit 304 transmits the video data to the display control unit 331, and reproduces and displays the video data on the display unit 333 with respect to the display control unit 331, it is simply expressed that the first reproducing unit 304 reproduces and displays the video data on the display unit 333.

Directory Structure of Information Stored in Storing Unit

Figure 4:
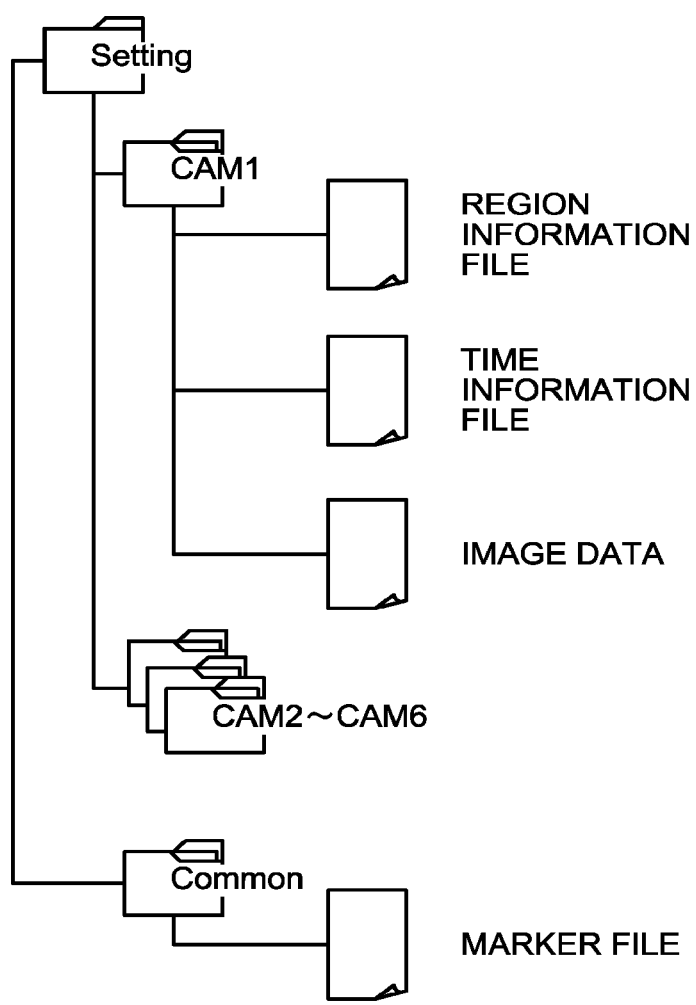
FIG. 4 is a diagram illustrating an example of a directory structure of information stored in a storing device in the information processing device according to the embodiment.

FIG. 4 is a diagram illustrating an example of a directory structure of the information stored in the storing device in the information processing device according to the embodiment. The directory structure for managing the information in the storing unit 302 will be described with reference to FIG. 4.

First, as illustrated in FIG. 4, the storing unit 302 forms a "Setting" folder and a "Common" folder as a root folder. In the "Setting" folder, "CAM1" to "CAM6" folders for storing the information relevant to each of the imaging devices 2 (hereinafter, simply and collectively referred to as a "camera folder") are formed. The "CAM1" to "CAM6" folders corresponds to folders relevant to the respective imaging devices 2a to 2f.

As illustrated in FIG. 4, in each of the camera folders, a region information file, a time information file, and image data are stored. Here, the region information file is a file which includes position information of each determination region set with respect to the corresponding imaging device 2 (information such as coordinates representing a position and the shape of the region) and attribute information described below. In addition, the time information file is a file which includes time when the monitoring operation is started and ended with respect to the corresponding imaging device 2, time when each of the determination regions is designated (set), and time when each of the determination regions is detected during the monitoring operation. In addition, the image data is data such as a trigger standard image described below, the difference image, a detection standard image, and the full-time detection standard image.

In addition, in the "Common" folder, the marker file described above is stored.

Furthermore, a directory structure for managing the information illustrated in FIG. 4 is an example, and is not limited thereto, and the information may be managed by other data structures. In addition, the name of the folder illustrated in FIG. 4 is also an example, and is not limited thereto.

Configuration of Watcher Screen

Figure 5:
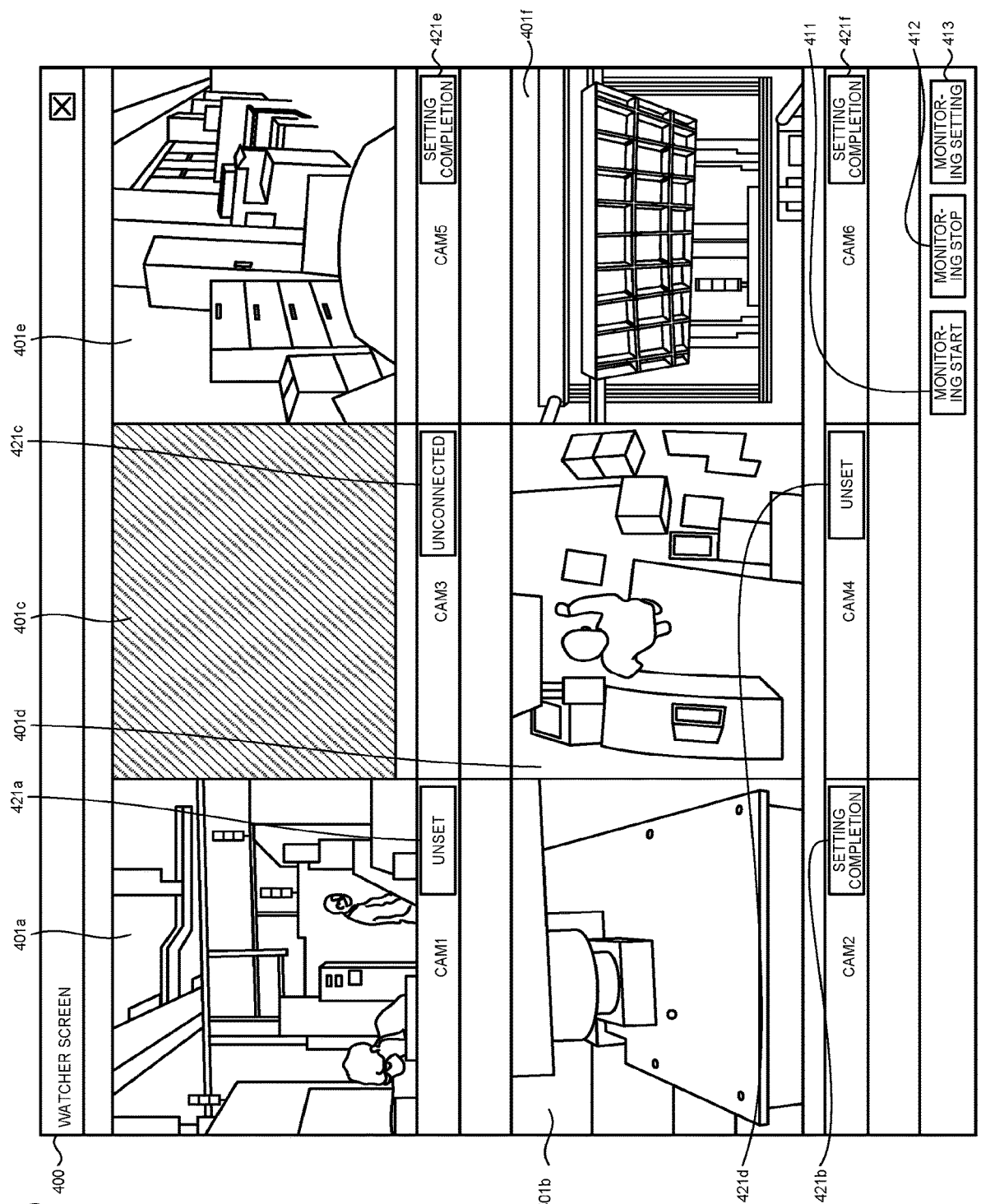
FIG. 5 is a diagram illustrating an example in which a plurality of real-time videos are displayed on a watcher screen to be displayed on a display device of the information processing device according to the embodiment.

FIG. 5 is a diagram illustrating an example in which a plurality of real-time videos are displayed on the watcher screen to be displayed on the display device of the information processing device according to the embodiment. The configuration of the watcher screen 400 and an operation in which the plurality of real-time videos are displayed will be described with reference to FIG. 5.

The watcher screen 400 illustrated in FIG. 5 is displayed on the display unit 333 according to a program (an application) which is executed by the CPU 101. In a case where the video data received from the plurality of imaging devices 2 is displayed in real time, and the image determination operation (the monitoring operation) is executed, the watcher screen 400 is a screen where the image determination is executed in each of the designated determination regions. Specifically, in the watcher screen 400, in a case where the image determination operation (the monitoring operation) is executed, the trigger signal is generated by the trigger generating unit 313 in the trigger region which is designated by the trigger region designating unit 305 at the timing of the trigger. In addition, in the watcher screen 400, the presence or absence of an abnormality is determined in the detection region which is designated by the detection region designating unit 307 before setting time or after the setting time when the trigger signal is received by the detection region determination unit 314. In addition, in the watcher screen 400, in a case where the image determination operation (the monitoring operation) is executed, the full-time detection region determination unit 315 constantly determines the presence or absence of the abnormality in the full-time detection region which is designated by the full-time detection region designating unit 309.

As illustrated in FIG. 5, the watcher screen 400 includes the video display units 401a to 401f, a monitoring start button 411, a monitoring stop button 412, a monitoring setting button 413, and state display units 421a to 421f.

The video display units 401a to 401f are display units which respectively display the real-time video data acquired by the video distributing unit 312 through the video receiving unit 301 from the imaging devices 2a to 2f, according to the manipulation signal from the input unit 303 manipulated by the user. In addition, the video display units 401a to 401f is capable of being in a selective state in the case of being pressed according to the manipulation of the input unit 303 by the user (for example, a click manipulation or the like of the mouse 108, the same applies hereinafter). Furthermore, in a case where the video display units 401a to 401f are referred without being distinguished or collectively referred, the video display units 401a to 401f will be simply referred to as a "video display unit 401".

When the monitoring start button 411 is pressed according to the manipulation of the input unit 303 by the user, the trigger signal is generated by the trigger generating unit 313 at the trigger timing in the trigger region designated by the trigger region designating unit 305 on the video display unit 401 in the selective state where the real-time video data is displayed, and the determination of the presence or absence of an abnormality is started in the detection region before the setting time or after the setting time at the time of receiving the trigger signal by the detection region determination unit 314. Further, in the video display unit 401 in a selective state where the real-time video data is displayed, the determination of the presence or absence of the abnormality in the full-time detection region designated by the full-time detection region designating unit 309 is started.

When the monitoring stop button 412 is pressed according to the manipulation of the input unit 303 by the user, in the video display unit 401 in the selective state, the generating operation of the trigger generating unit 313 in which the trigger signal is generated at the timing of the trigger, the determination operation of the detection region determination unit 314 in which the presence or absence of the abnormality is determined in the detection region, and the determination operation of the full-time detection region determination unit 315 in which the presence or absence of the abnormality is determined in the full-time detection region are stopped.

When the monitoring setting button 413 is pressed according to the manipulation of the input unit 303 by the user, the setting screen 500 illustrated in FIG. 6 or the like described below is displayed on the display unit 333 by the first control unit 316 in order to set each of the determination regions.

The state display units 421a to 421f are display units displaying the state of the imaging device 2 corresponding to each of the video display unit 401. For example, in the state display units 421a to 421f, the contents representing the state of the imaging device 2, such as "Unconnected", "Unset", "Setting Completion", and "during Monitoring", are displayed. "Unconnected" represents a state where the imaging device 2 corresponding to the video display unit 401 is not connected to the image processing system 1, and a state where the video data is not displayed on the video display unit 401. "Unset" represents a state where the trigger region, the detection region, the full-time detection region, and the like are not set with respect to the video data displayed on the video display unit 401. "Setting Completion" represents a state where the setting of the trigger region, the detection region, the full-time detection region, and the like with respect to the video data displayed on the video display unit 401 are completed. "during Monitoring" represents a state where the image determination operation (the monitoring operation) is executed on the basis of the information of each of the set determination regions. Furthermore, in a case where the state display units 421a to 421f are referred without being distinguished or collectively referred, the state display units 421a to 421f will be simply referred to as a "state display unit 421".

Configuration of Setting Screen

Figure 6:
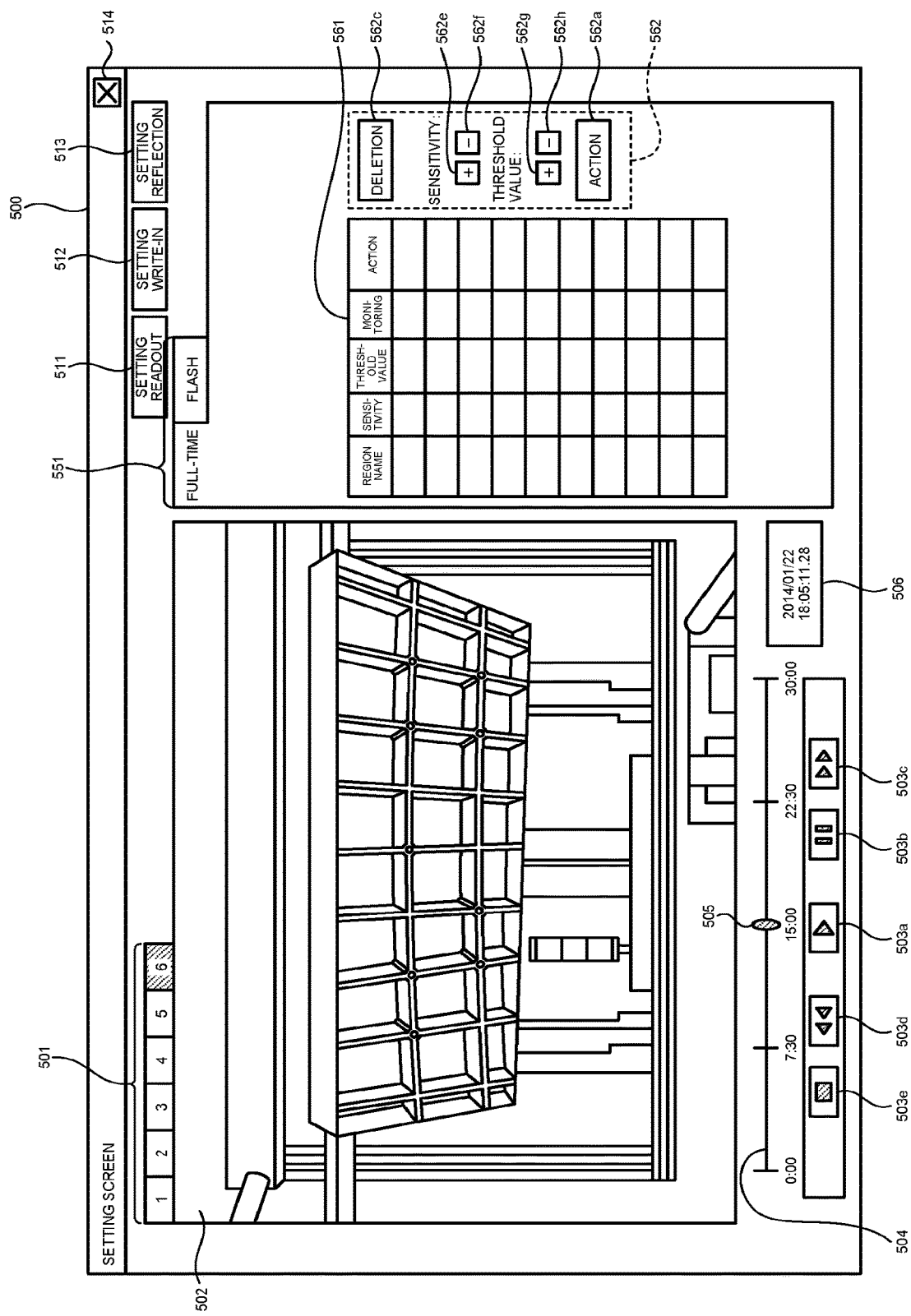
FIG. 6 is a diagram illustrating an example of a state in which video data is displayed on a setting screen to be displayed on the display device of the information processing device according to the embodiment.

FIG. 6 is a diagram illustrating an example of a state where the video data is displayed on the setting screen to be displayed on the display device of the information processing device according to the embodiment. The configuration of the setting screen 500 will be described FIG. 6 and FIG. 8 described below.

The setting screen 500 is a screen on which the trigger region, the detection region, and the full-time detection region are designated, and the sensitivity, the threshold value, and the like of the image determination in the detection region and the full-time detection region are set. The setting screen 500 illustrated in FIG. 6 is a screen for setting a full-time detecting function, and includes a camera selection tab 501, a setting video display unit 502, a reproducing button 503a, temporary stop button 503b, a fast-forward button 503c, a fast-backward button 503d, a stop button 503e, a seek bar 504, a slider 505, a time display unit 506, a setting readout button 511, a setting write-in button 512, a setting reflection button 513, a close button 514, a region selection tab 551, a full-time detection region information portion 561, and a full-time detection region button group 562.

The camera selection tab 501 is a manipulating unit which selects any one video data item in the video data items of the imaging devices 2a to 2f, of which the trigger region, the detection region, and the full-time detection region are desired to be designated by the user, to be displayed on the setting video display unit 502. For example, the video data items imaged by the imaging devices 2a to 2f are respectively associated to "1" to "6", and in the example of FIG. 6, an example is illustrated in which "6", that is, the video data of the imaging device 2f is selected.

The setting video display unit 502 is a display unit in which the video data acquired from the storing unit 302 is reproduced and displayed by the first reproducing unit 304, according to the manipulation signal from the input unit 303, which is manipulated by the user. In the example of FIG. 6, the camera selection tab 501 of "6" is selected and manipulated by the first reproducing unit 304 according to the manipulation of the input unit 303 by the user, the first reproducing unit 304 reproduces and displays the video data imaged by the imaging device 2f on the setting video display unit 502.

When the reproducing button 503a is pressed according to the manipulation of the input unit 303 by the user, the video data displayed on the setting video display unit 502 is reproduced and started by the first reproducing unit 304. When the temporary stop button 503b is pressed according to the manipulation of the input unit 303 by the user, the video data which is reproduced and displayed on the setting video display unit 502 by the first reproducing unit 304 is temporarily stopped. When the fast-forward button 503c is pressed according to the manipulation of the input unit 303 by the user, the video data which is reproduced and displayed on the setting video display unit 502 is subjected to fast-forward display by the first reproducing unit 304. When the fast-backward button 503d is pressed according to the manipulation of the input unit 303 by the user, the video data which is reproduced and displayed on the setting video display unit 502 is subjected to fast-backward display by the first reproducing unit 304. When the stop button 503e is pressed according to the manipulation of the input unit 303 by the user, the video data the video which is reproduced and displayed on the setting video display unit 502 is stopped by the first reproducing unit 304.

The seek bar 504 is a rod-like body which represents the time of the video data reproduced and displayed on the setting video display unit 502 according to the position of the slider 505 which is disposed on the seek bar. The slider 505 is a body and a manipulating unit which slide to the position on the seek bar 504 corresponding to the imaging time of the video data (time when the displayed frame is imaged) reproduced and displayed on the setting video display unit 502. In contrast, in a case where the slider 505 slides according to the manipulation of the input unit 303 by the user, the frame of the video data at the imaging time corresponding to the position on the seek bar 504 where the slider 505 exists is displayed on the setting video display unit 502 by the first reproducing unit 304.

The time display unit 506 is a display unit which displays an imaging date and an imaging time of the video data reproduced and displayed on the setting video display unit 502 by the first reproducing unit 304.

When the setting readout button 511 is pressed according to the manipulation of the input unit 303 by the user, the information or the like such as the trigger region with respect to the imaging device 2 selected by the camera selection tab 501, the detection region, and the full-time detection region, which is stored in the storing unit 302, is read out and is displayed on each of the display units of the setting screen 500, by the setting unit 308. When the setting write-in button 512 is pressed according to the manipulation of the input unit 303 by the user, the information or the like such as the trigger region, the detection region, and the full-time detection region, which is set on the setting screen 500, is stored in the storing unit 302 by the setting unit 308 in association with the imaging device 2 selected by the camera selection tab 501. When the setting reflection button 513 is pressed according to the manipulation of the input unit 303 by the user, the information or the like such as the trigger region, the detection region, and the full-time detection region, which is set on the setting screen 500, is valid by the setting unit 308 until the application of the watcher screen 400, the setting screen 500, or the like is closed (for example, is temporarily stored in the RAM 103).

When the close button 514 is pressed according to the manipulation of the input unit 303 by the user, the setting screen 500 is closed and the watcher screen 400 is displayed on the display unit 333 by the setting unit 308.

The region selection tab 551 is configured of a tab for designating the full-time detection region used in the full-time detecting function and a tab for designating the trigger region and the detection region used in the flash detecting function. For example, the setting screen 500 illustrated in FIG. 6 represents a state in which the tab for designating the full-time detection region is selected according to the manipulation of the input unit 303 by the user. On the other hand, the setting screen 500 illustrated in FIG. 8 described below represents a state in which the tab for designating the trigger region and the detection region is selected according to the manipulation of the input unit 303 by the user.

The full-time detection region information portion 561 is a display unit and a selecting manipulating unit which display the name of the full-time detection region designated by the full-time detection region designating unit 309, the sensitivity, the threshold value, a monitoring method (in FIG. 6, represented as "Monitoring"), and the presence or absence of action (in FIG. 6, represented as "Action") (hereinafter, such information with respect to the full-time detection region will be referred to as attribute information).

The full-time detection region button group 562 is a button group which is designated by the full-time detection region designating unit 309 and edits the attribute information with respect to the full-time detection region displayed in the full-time detection region information portion 561. The full-time detection region button group 562 includes an action button 562a, a deletion button 562c, a sensitivity increase button 562e, a sensitivity decrease button 562f, a threshold value increase button 562g, and a threshold value decrease button 562h. The functions of each of the buttons of the full-time detection region button group 562 will be described below.

As described above, the setting screen 500 illustrated in FIG. 8 described below represents a state in which the tab for designating the trigger region and the detection region is selected by the region selection tab 551, and includes a trigger region information portion 507, a standard image display unit 508a, a difference image display unit 508b, a detection region information portion 509, and a detection region button group 510.

The trigger region information portion 507 is a display unit which displays the name of the trigger region designated by the trigger region designating unit 305 and the sensitivity and the threshold value for the change point detecting unit 306 to detect the change point described above. The standard image display unit 508a is a display unit which displays a trigger standard image extracted by the change point detecting unit 306. The difference image display unit 508b is a display unit which displays the difference image (described below) extracted by the change point detecting unit 306.

Figure 8:
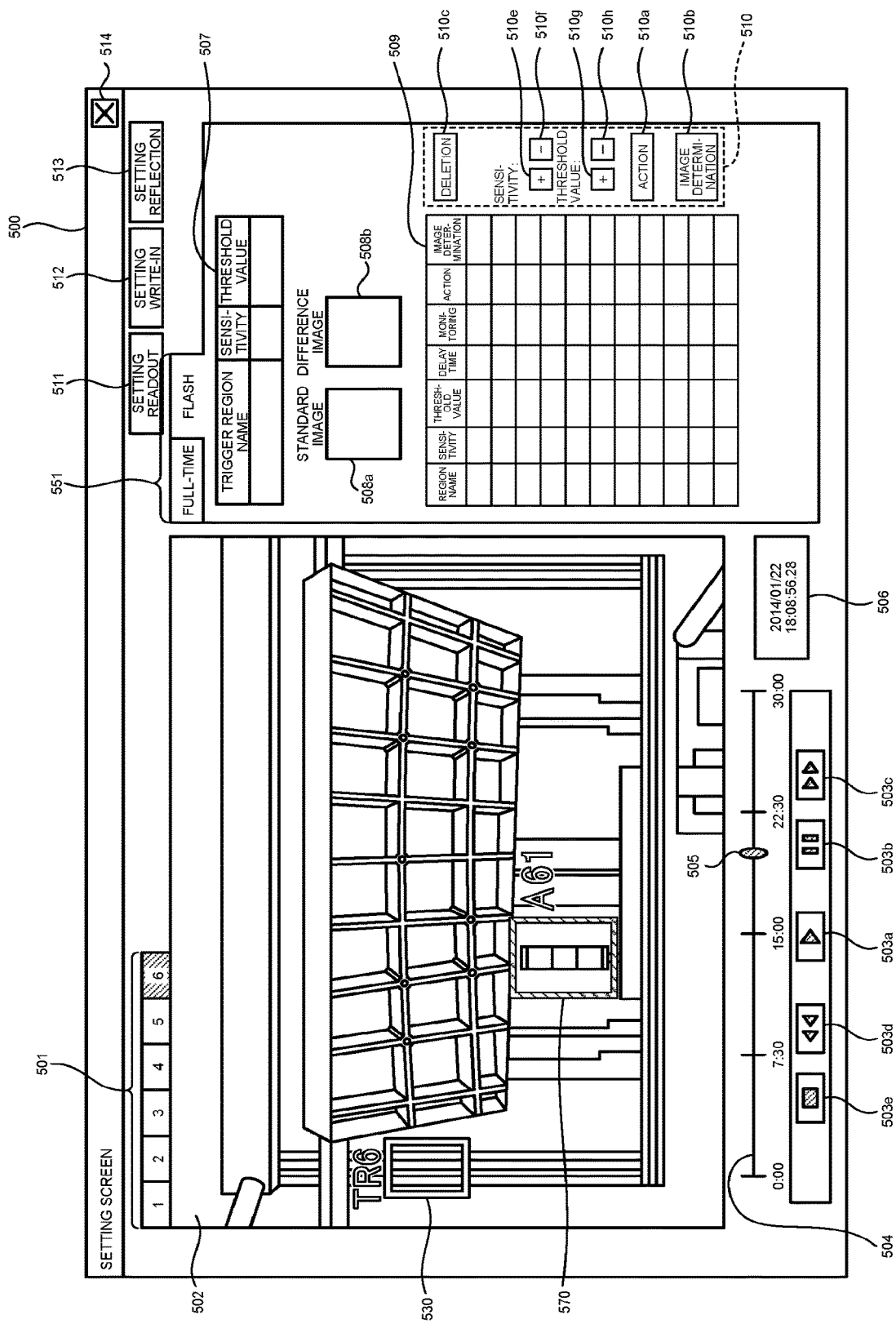
FIG. 8 is a diagram illustrating an example in which a trigger region is designated in the setting video display unit on the setting screen to be displayed on the display device of the information processing device according to the embodiment.

The detection region information portion 509 is a display unit and a selecting manipulating unit which display the name of the detection region designated by the detection region designating unit 307, the sensitivity, the threshold value, detection delay time (in FIG. 8, represented as "delay time"), a monitoring method (in FIG. 8, represented as "monitoring"), the presence or absence of action (in FIG. 8, represented as "action"), and an image determination method (in FIG. 8, represented as "image determination") (hereinafter, such information with respect to the detection region will be referred to as attribute information).

The detection region button group 510 is a button group which is designated by the detection region designating unit 307 and edits the attribute information with respect to the detection region displayed in the detection region information portion 509. The detection region button group 510 includes an action button 510a, an image determination selection button 510b, a deletion button 510c, a sensitivity increase button 510e, a sensitivity decrease button 510f, a threshold value increase button 510g, and a threshold value decrease button 510h. The functions of each of the buttons of the detection region button group 510 will be described below.

Designation of Full-Time Detection Region

Figure 7:
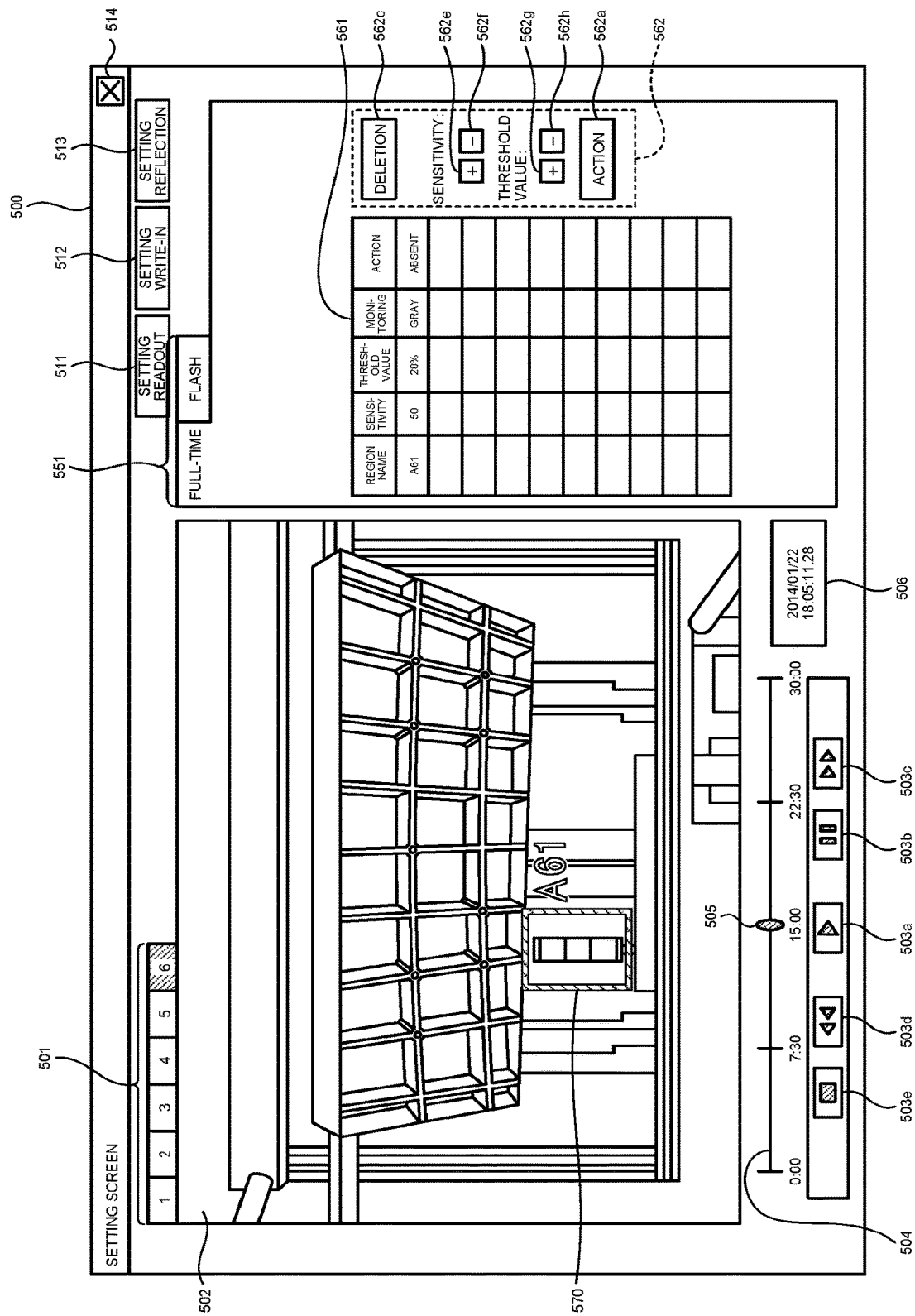
FIG. 7 is a diagram illustrating an example in which a full-time detection region is designated in a setting video display unit on a setting screen to be displayed on the display device of the information processing device according to the embodiment.

FIG. 7 is a diagram illustrating an example in which the full-time detection region is designated in the setting video display unit on the setting screen to be displayed on the display device of the information processing device according to the embodiment. The designation of the full-time detection region will be described with reference to FIG. 7.

The setting screen 500 illustrated in FIG. 7 represents a state in which a full-time detection region 570 is designated in the setting video display unit 502 on which the video data is reproduced and displayed by the first reproducing unit 304. Specifically, first, in a case where the temporary stop button 503b is pressed according to the manipulation of the input unit 303 by the user at a timing where a portion of an image desired to be subjected to the image determination of the full-time detecting function is displayed while the video data is reproduced and displayed on the setting video display unit 502, the first reproducing unit 304 temporarily stops the video data which is reproduced and displayed on the setting video display unit 502, the imaging date and the imaging time of the frame at such a time point are displayed on the time display unit 506. Then, in a case where a "Full-Time" tab of the region selection tab 551 is selected and manipulated according to the manipulation of the input unit 303 by the user, the setting unit 308 displays the information with respect to the full-time detection region.

Next, the full-time detection region designating unit 309 designates and displays the full-time detection region 570 (the determination region) in the setting video display unit 502, according to the manipulation of the input unit 303 by the user (for example, a drag manipulation of the mouse 108).

In addition, the setting unit 308 displays the name named in the full-time detection region 570 which is designated by the full-time detection region designating unit 309 as the attribute information of the full-time detection region 570, and the predetermined sensitivity (for example, "50"), the predetermined threshold value (for example, "20%"), the monitoring method (for example, "Gray Scale"), and the presence or absence of action (for example, "Absent"), used in the image determination described below, as the default value, on the full-time detection region information portion 561. As illustrated in FIG. 7, for example, the setting unit 308 names "A61" as the name of the full-time detection region 570 by assuming the detection region as a full-time detection region designated with respect to the video data of the imaging device of "6" (the imaging device 2f). In addition, the full-time detection region designating unit 309 extracts an image in the full-time detection region 570 of the frame (the image) to be displayed on the setting video display unit 502 at the time when the full-time detection region 570 is designated as the full-time detection standard image and stores the extracted image in the storing unit 302, and stores the information of the designated full-time detection region 570 (the position information such as the position and the shape, the attribute information, and the like) in the storing unit 302, in association with the imaging device 2 selected by the camera selection tab 501 (in the example of FIG. 7, the imaging device 2f). Further, the full-time detection region designating unit 309 stores the information (the time information) at the time when the full-time detection region 570 is designated in the storing unit 302, in association with the imaging device 2 selected by the camera selection tab 501. Furthermore, in the same method as that described above, it is possible to designate a plurality of full-time detection regions by the full-time detection region designating unit 309.

It is possible to edit the attribute information of the full-time detection region designated on the setting screen 500 illustrated in FIG. 7 (in FIG. 7, the full-time detection region 570). First, in a case where any one of the full-time detection regions of which the attribute information is displayed in the full-time detection region information portion 561 (in FIG. 7, only the attribute information of the full-time detection region 570 is displayed) is selected according to the manipulation of the input unit 303 by the user, the setting unit 308 reversely displays a display portion of the attribute information of the full-time detection region of the selected full-time detection region information portion 561. Hereinafter, an example will be described in which the full-time detection region 570 illustrated in FIG. 7 (a full-time detection region name of "A61") is selected.

Next, for example, in a case where the action button 562a is pressed according to the manipulation of the input unit 303 by the user, the setting unit 308 switches a setting value of the presence or absence of the action of the selected full-time detection region 570. For example, in a case where the presence or absence of the action of the full-time detection region 570 is "Absent", and the action button 562a is pressed, the setting unit 308 sets the presence or absence of the action of the full-time detection region 570 to "Present". In contrast, in a case where the presence or absence of the action of the full-time detection region 570 is "Present", and the action button 562a is pressed, the setting unit 308 sets the presence or absence of the action of the full-time detection region 570 to "Absent". As described below, in a case where the presence or absence of the action is "Present", in a case where the full-time detection region determination unit 315 determines that there is an abnormality in the full-time detection region according to the image determination, the external output unit 332 outputs the abnormality signal.

In addition, for example, in a case where the deletion button 562c is pressed according to the manipulation of the input unit 303 by the user, the setting unit 308 deletes the attribute information of the full-time detection region 570 displayed in the full-time detection region information portion 561, and deletes the information of the full-time detection region 570 stored in the storing unit 302. In addition, the full-time detection region designating unit 309 deletes the full-time detection region 570 displayed on the setting video display unit 502, and deletes the full-time detection standard image stored in the storing unit 302.

In addition, for example, in a case where the sensitivity increase button 562*e* is pressed according to the manipulation of the input unit 303 by the user, the setting unit 308 increases the value of the sensitivity which is used for the image determination of the selected full-time detection region 570 by a predetermined value. On the other hand, in a case where the sensitivity decrease button 562*f* is pressed according to the manipulation of the input unit 303 by the user, the setting unit 308 decreases the value of the sensitivity which is used for the image determination of the selected full-time detection region 570 by the predetermined value.

In addition, for example, in a case where the threshold value increase button 562*g* is pressed according to the manipulation of the input unit 303 by the user, the setting unit 308 increases the threshold value which is used for the image determination of the selected full-time detection region 570 by the predetermined value. On the other hand, in a case where the threshold value decrease button 562*h* is pressed according to the manipulation of the input unit 303 by the user, the setting unit 308 decreases the threshold value which is used for the image determination of the selected full-time detection region 570 by the predetermined value.

Designation of Trigger Region and Detection of Change Point

Figure 9:
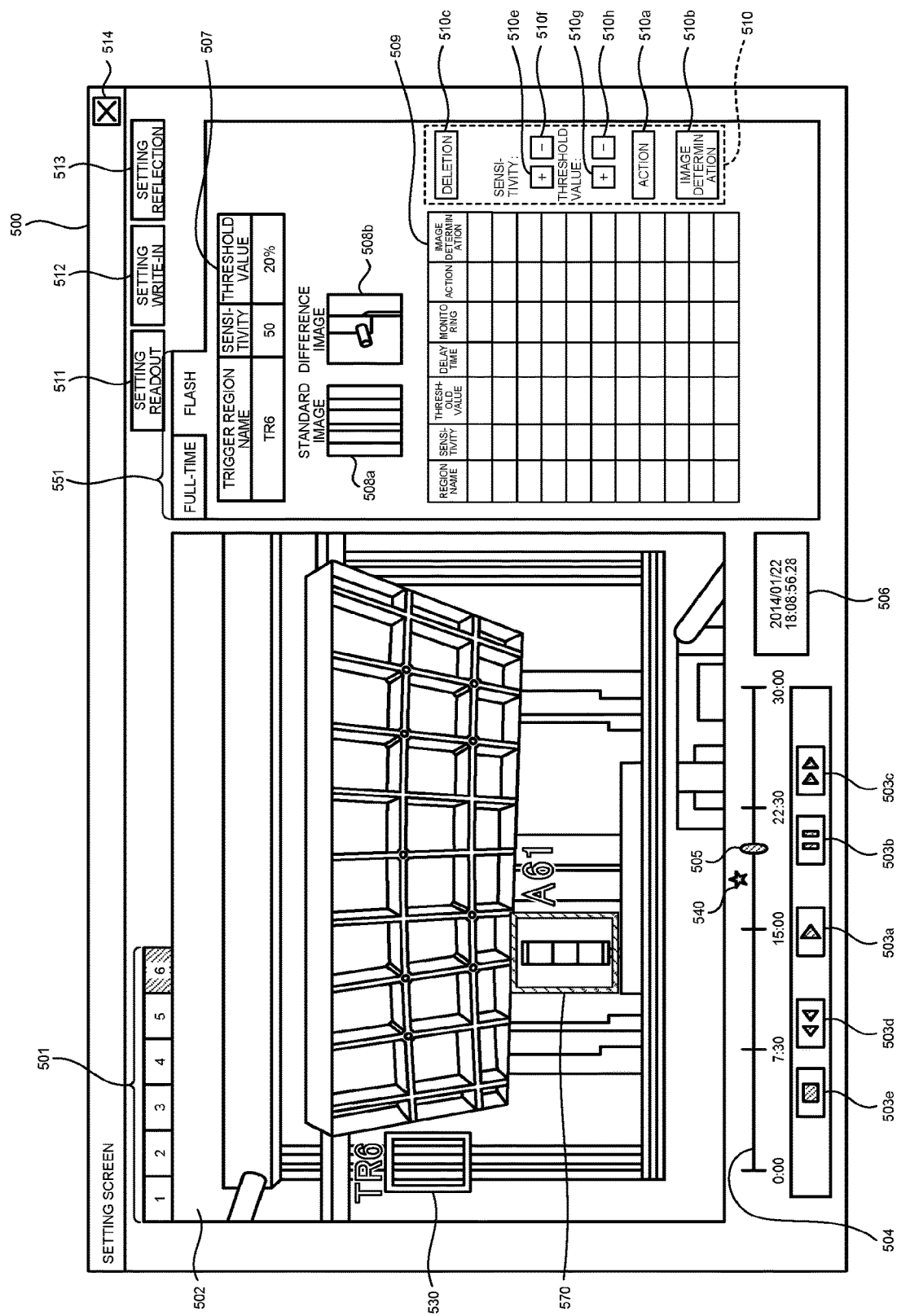
FIG. 9 is a diagram illustrating an example of mark display in a case where a change point is observed in the trigger region on the setting screen to be displayed on the display device of the information processing device according to the embodiment.
Figure 11:
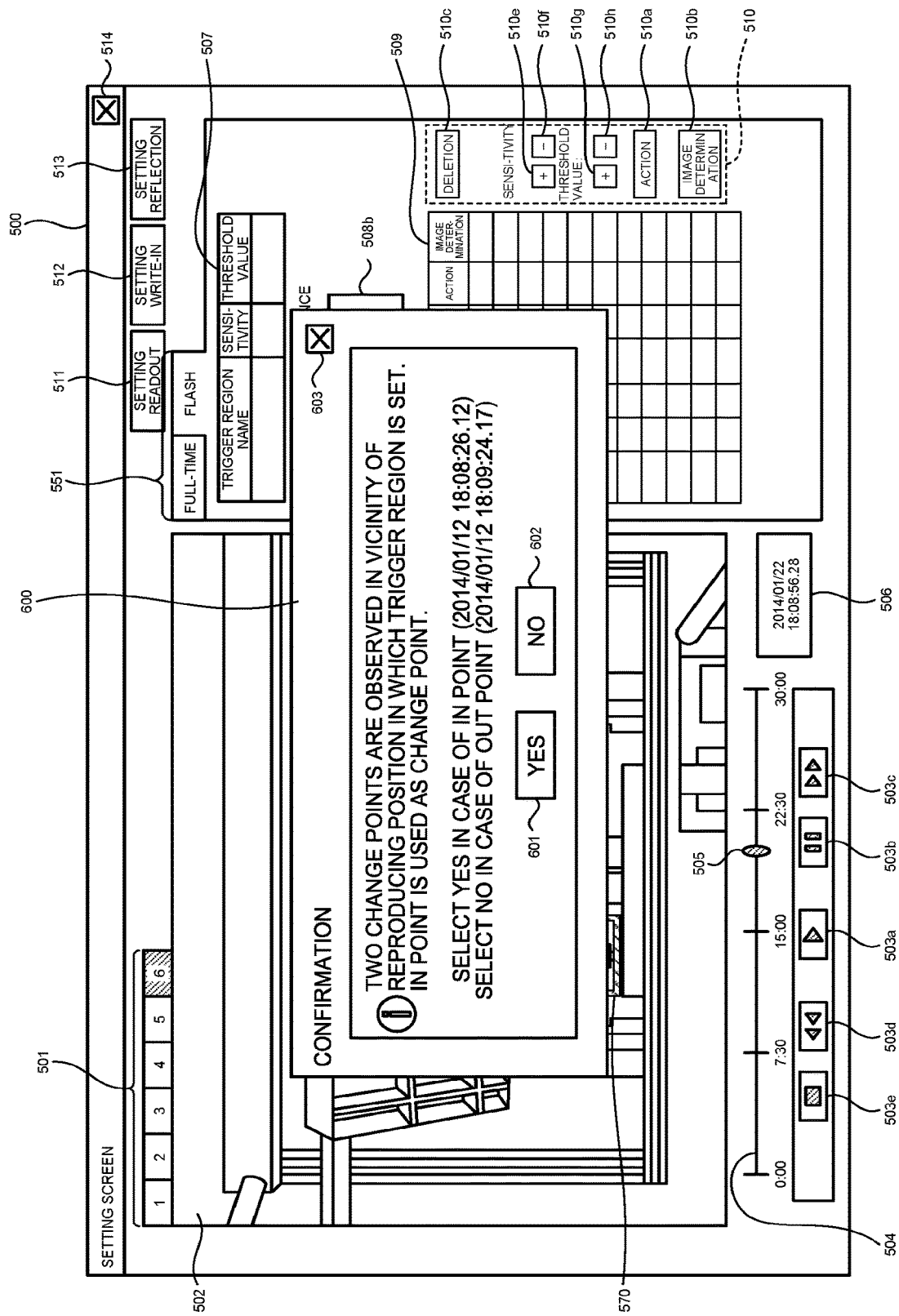
FIG. 11 is a diagram illustrating an example of a dialogue to be displayed in a case where two change points are observed in the trigger region on the setting screen to be displayed on the display device of the information processing device according to the embodiment.
Figure 12:
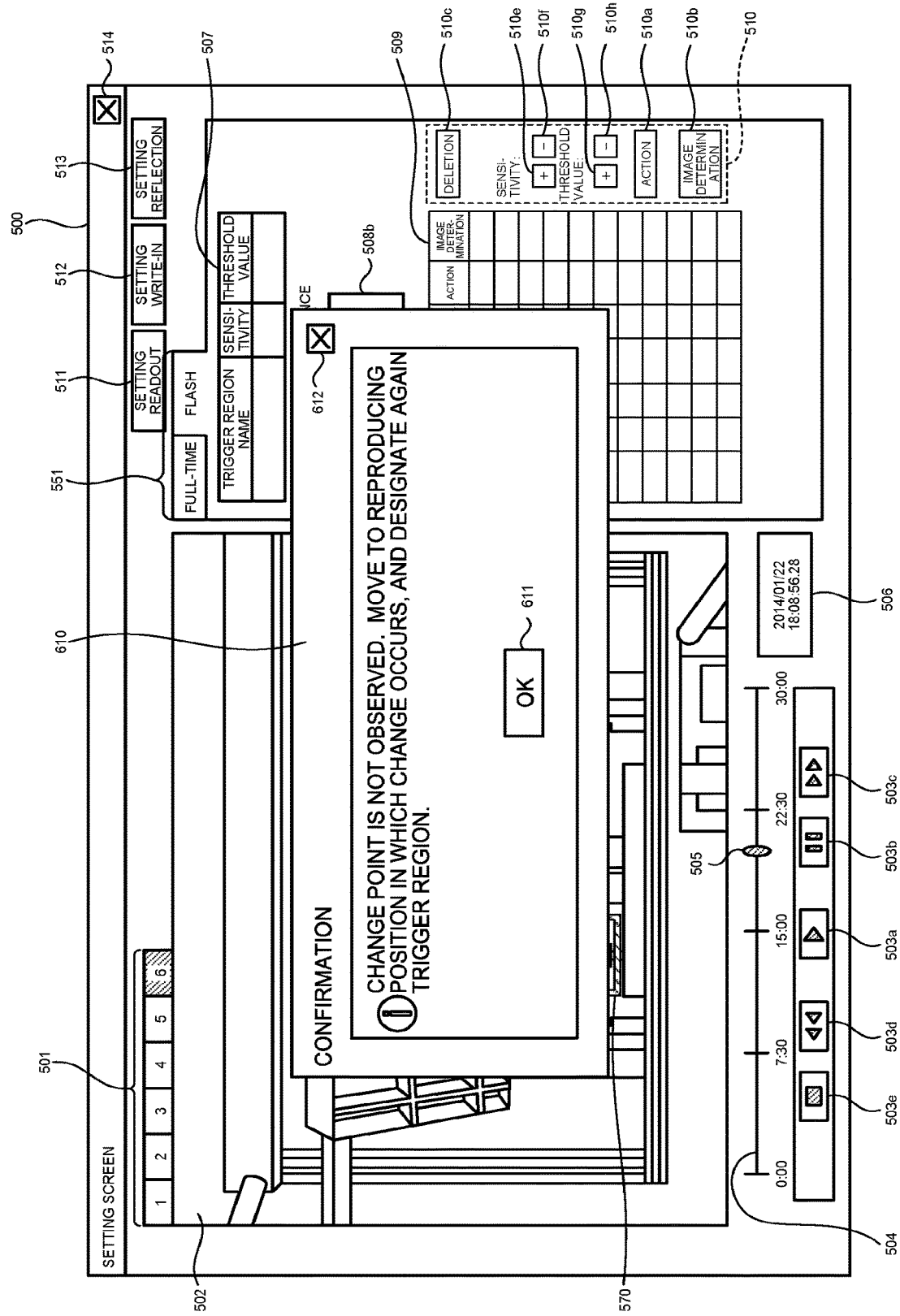
FIG. 12 is a diagram illustrating an example of a dialogue to be displayed in a case where the change point is not observed in the trigger region on the setting screen to be displayed on the display device of the information processing device according to the embodiment.

FIG. 8 is a diagram illustrating an example in which the trigger region is designated in the setting video display unit on the setting screen to be displayed on the display device of the information processing device according to the embodiment. FIG. 9 is a diagram illustrating an example of mark display in a case where the change point is observed in the trigger region on the setting screen to be displayed on the display device of the information processing device according to the embodiment. FIG. 10 is a diagram illustrating an operation of detecting the change point in the trigger region. FIG. 11 is a diagram illustrating an example of a dialogue to be displayed in a case where two change points are observed in the trigger region on the setting screen to be displayed on the display device of the information processing device according to the embodiment. FIG. 12 is a diagram illustrating an example of a dialogue to be displayed in a case where the change point is not observed in the trigger region on the setting screen to be displayed on the display device of the information processing device according to the embodiment. The designation of the trigger region and the detection of the change point will be described with reference to FIGS. 8 to 12.

The setting screen 500 illustrated in FIG. 8 illustrates a state in which a trigger region 530 is designated in the setting video display unit 502 on which the video data is reproduced and displayed by the first reproducing unit 304. Specifically, first, in a case where the temporary stop button 503*b* is pressed according to the manipulation of the input unit 303 by the user at a timing where a desired portion of the image based on the occurrence of the trigger is displayed while the video data is reproduced and displayed on the setting video display unit 502, the first reproducing unit 304 temporarily stops the video data which is reproduced and displayed on the setting video display unit 502, and displays the imaging date and the imaging time of the frame at such a time point on the time display unit 506. Next, in a case where a "Flash" tab of the region selection tab 551 is selected and manipulated according to the manipulation of the input unit 303 by the user, the setting unit 308 displays the information with respect to the trigger region and the detection region.

Next, the trigger region designating unit 305 designates the trigger region 530 (the determination region) and displays the designated trigger region on the setting video display unit 502, according to the manipulation of the input unit 303 by the user (for example, the drag manipulation of the mouse 108).

The setting screen 500 illustrated in FIG. 9 illustrates a state in which the change point detecting unit 306 detects the change point in the trigger region 530 which is designated by the trigger region designating unit 305. Specifically, first, in a case where a trigger region 530 is designated by the trigger region designating unit 305, the change point detecting unit 306 acquires a frame for a predetermined time before and after the imaging time of the frame of the video data which is reproduced and displayed by the first reproducing unit 304 at (for example, for 2 minutes before and after the imaging time), and extracts the image in the trigger region 530 of the time which is designated by the trigger region 530 as the trigger standard image (a first standard image), at a designated time point. Here, the change point is a time point where a predetermined change of the image in the trigger region 530 occurs as a standard of a timing where the trigger generating unit 313 generates the trigger signal. Hereinafter, a specific detecting method of the change point of the change point detecting unit 306 will be described.

As illustrated in FIG. 10(*a*), the change point detecting unit 306 acquires thirteen frames (a frame (0) to a frame (12)) as the frame for the predetermined time. In this case, the frame for the predetermined time before and after the frame (6) as the basis is acquired by the change point detecting unit 306. In addition, in order to simplify the description, an image of a portion corresponding to the trigger region 530 in each of the frames will also be referred to as each of a frame (0) to a frame (12). Then, the change point detecting unit 306 calculates a difference in pixel values between each of the frames and the immediately prior frame in the acquired frame. A calculating method of the difference is as described above. The change point detecting unit 306 extracts the frame exemplified in FIG. 10(*a*), and a graph chronologically illustrating the difference calculated for each of the frames is a graph illustrated in FIG. 10(*b*). In FIG. 10(*b*), for example, the difference of the frame (1) represents a difference between the frame (1) and the frame (0) which is the immediately previous frame. Here, an IN point and an OUT point as the change point will be defined as described below. That is, the IN point is set to a time point at which the image in the trigger region 530 is started to be changed in the continuous frames. In addition, the OUT point is a set to a time point at which the image trigger region 530 is started to be changed in the continuous frames. Furthermore, the change point detecting unit 306 calculates the difference between each of the frames and the immediately previous frame in the acquired frame, but is not limited to the immediately previous frame, and for example, a difference between each of the frames and a frame several frames before the frame may be calculated.

The change point detecting unit 306 finds a candidate of the IN point and a candidate of the OUT point on the basis of the calculated difference between the respective frames. Specifically, in a case where the calculated difference is continuous for greater than or equal to two frames, and is greater than or equal to a predetermined threshold value, the change point detecting unit 306 sets a frame having a difference which is initially greater than or equal to the predetermined threshold value to a candidate frame of the IN point. In the example of FIG. 10(*b*), the difference of the frame (1) is less than the threshold value, the difference of the frame (2) is greater than or equal to the threshold value, the difference of the frame (3) is greater than or equal to the threshold value, and a difference between two frames of the frames (2) and (3) is greater than or equal to the threshold value, and thus, the frame (2) having a difference which is initially greater than or equal to the threshold value is set to the candidate frame of the IN point. Similarly, the frame (7) is also set to the candidate frame of the IN point. In addition, in a case where the difference is not continuous for greater than or equal to two frames, and a difference for only one frame is greater than or equal to the threshold value, there is a possibility of noise, and thus, the frame is not set to the candidate frame of the IN point.

On the other hand, in a case where the calculated difference is continuous for greater than or equal to two frames, and is less than or equal to the predetermined threshold value, the change point detecting unit 306 sets the frame having a difference which is initially less than the predetermined threshold value to a candidate frame of the OUT point. In the example of FIG. 10(b), the difference of the frame (4) is greater than or equal to the threshold value, the difference of the frame (5) is less than the threshold value, the difference of the frame (6) is also less than the threshold value, and a difference between two frames of the frames (5) and (6) is less than the threshold value, and thus, the frame (5) having a difference which is initially less than the threshold value is set to the candidate frame of the OUT point. Here, the frame (12) is a frame having a difference which is less than the predetermined threshold value, but the following frame (13) is a frame other than the frame extracted by the change point detecting unit 306, and thus, is not the candidate frame of the OUT point. In addition, in a case where the difference is not continuous for greater than or equal to two frames, and only one difference for one frame is less than the threshold value, there is a possibility of noise, and thus, the frame is not the candidate frame of the OUT point.

As described above, in the example of FIG. 10, the change point detecting unit 306 specifies the frames (2) and (7) as the candidate frame of the IN point, and specifies the frame (5) as the candidate frame of the OUT point. Thus, in a case where a plurality of candidate frames of the IN point are specified, the change point detecting unit 306 determines a frame closest to the frame (6) in the middle of the acquired frame, that is, the frame (7) as the frame of the IN point. Furthermore, in the example of FIG. 10, only one frame (the frame (5)) is specified as the candidate frame of the OUT point, and as with the candidate of the IN point, there is a case where a plurality of frames are specified as the candidate frame of the OUT point. Thus, in a case where the plurality of candidate frames of the OUT point are specified, the change point detecting unit 306 determines a frame closest to the frame (6) in the middle of the acquired frame as the frame of the OUT point, as with the candidate of the IN point. In the example of FIG. 10, the candidate frame of the OUT point is only the frame (5), and thus, the change point detecting unit 306 determines the frame (5) as the frame of the OUT point. As described above, the change point detecting unit 306 determines the frame of the IN point and the frame of the OUT point from the acquired frame for the predetermined time, and thus, detects the change point (the IN point and the OUT point).

Furthermore, in a case where the change point is detected, the change point detecting unit 306 may perform dynamic body detection in the trigger region 530 by using a frame before the frame of the change point, a frame after the frame of the change point, or preceding and following frames, and may store vector information representing an entrance direction of a dynamic body in the storing unit 302. In this case, the trigger generating unit 313 may confirm whether or not the dynamic body is moved from a direction which is identical to the direction represented by the vector information, by using the vector information stored in the storing unit 302, and may generate the trigger signal on the basis of the confirmation result.

In addition, the detecting method of the change point in the trigger region 530 according to the change point detecting unit 306 is not limited to the method described above, and the change point may be detected by any method insofar as the change point is a change point defining a timing at which the trigger is generated.

In addition, as described above, in a case where the difference is continuous for greater than or equal to two frames, and is greater than or equal to the predetermined threshold value, the change point detecting unit 306 sets a frame having a difference which is initially greater than or equal to the predetermined threshold value to the candidate frame of the IN point, but is not limited thereto. That is, a case may be included in which the difference is not continuous for greater than or equal to two frames, and is continuous for frames of greater or equal to the other number and is greater than or equal to the predetermined threshold value. The same applies to a case where the candidate frame of the OUT point is found.

In addition, FIG. 10 illustrates an example in which the frames of both of the IN point and the OUT point are observed, but there is a case where only the frame of the IN point or only the frame of the OUT point is observed by the change point detecting unit 306, and in this case, the IN point or the OUT point is detected as the change point. In this case, the change point detecting unit 306 extracts an image of a frame of the detected change point in the trigger region 530 as the difference image. The change point detecting unit 306 stores the extracted trigger standard image and the difference image of the frame at the change point in the storing unit 302, displays the trigger standard image on the standard image display unit 508a, and displays the difference image on the difference image display unit 508b, in association with the imaging device 2 selected by the camera selection tab 501 (in the example of FIG. 10, the imaging device 2f). Further, in the seek bar 504, the change point detecting unit 306 displays the trigger mark 540 on a portion corresponding to the time of the frame of the detected change point. In addition, in a case where the change point is detected by the change point detecting unit 306, the trigger region designating unit 305 stores the information of the designated trigger region 530 (the position information such as the position and the shape, the attribute information, and the like) in the storing unit 302, in association with the imaging device 2 selected by the camera selection tab 501 (in the example of FIG. 10, the imaging device 2f). In addition, the setting unit 308 displays the name named in the trigger region 530 which is designated by the trigger region designating unit 305, and the predetermined sensitivity (for example, "50") and the predetermined threshold value (for example, "20%") (the default value), which are used for detecting the change point of the change point detecting unit 306 on the trigger region information portion 507, as the attribute information of the trigger region 530. As illustrated in FIG. 8, for example, the setting unit 308 names "TR6" as the name of the trigger region 530 by assuming that the trigger region is the trigger region designated with respect to the video data of the imaging device of "6" (the imaging device 2f). Further, the trigger region designating unit 305 stores the information (the time information) at the time when the trigger region 530 is designated in the storing unit 302, in association with the imaging device 2 selected by the camera selection tab 501.

In a case where two change points (the IN point and the OUT point) are detected by the change point detecting unit 306 as described above, in the trigger region 530 designated by the trigger region designating unit 305, the setting screen 500 illustrated in FIG. 11 represents a state in which a change point selecting dialogue 600 is displayed. Thus, in a case where greater than or equal to two change points are detected, the change point detecting unit 306 displays the change point selecting dialogue 600 for selecting any one of two change points (the IN point and the OUT point) closest to the time point where the trigger standard image is extracted to generate the trigger on the display unit 333. The change point selecting dialogue 600 includes a yes button 601, a no button 602, and a close button 603. The close button 603 is a button for closing the change point selecting dialogue 600.

In a case the yes button 601 is pressed according to the manipulation of the input unit 303 by the user, the change point detecting unit 306 detects the IN point as the change point, and extracts the image of the frame of the IN point in the trigger region 530 as the difference image. Then, the change point detecting unit 306 stores the extracted trigger standard image, and a difference image of a frame at an IN point in the storing unit 302, displays the trigger standard image on the standard image display unit 508*a*, and displays the difference image on the difference image display unit 508*b*, in association with the imaging device 2 selected by the camera selection tab 501. Further, the change point detecting unit 306 displays the trigger mark 540 on a portion corresponding to the time of the frame of the detected IN point in the seek bar 504.

On the other hands, in a case where the no button 602 is pressed according to the manipulation of the input unit 303 by the user, the change point detecting unit 306 detects the OUT point as the change point, and extracts the image of the frame of the OUT point in the trigger region 530 as the difference image. Then, the change point detecting unit 306 stores the extracted trigger standard image, and a difference image of a frame at an OUT point in the storing unit 302, displays the trigger standard image on the standard image display unit 508*a*, and displays the difference image on the difference image display unit 508*b*, in association with the imaging device 2 selected by the camera selection tab 501. Further, the change point detecting unit 306 displays the trigger mark 540 in a portion corresponding to the time of the frame of the detected OUT point in the seek bar 504. Other operations are identical to the operation described above in FIG. 9.

Thus, the IN point and the OUT point are detected by the change point detecting unit 306 as the change point, and any one of two change points can be selected by the user, and thus, the user is capable of selecting the change point desired to be designated.

In a case where the change point designated by the trigger region designating unit 305 is not observed by the change point detecting unit 306 in the trigger region 530, the setting screen 500 illustrated in FIG. 12 represents a state in which a no change point notification dialogue 610 is displayed. In the operation described in FIG. 10 described above, there is a case where the change point detecting unit 306 is not capable of detecting the change point since the calculated difference is not greater than or equal to a predetermined threshold value. In this case, the change point detecting unit 306 displays the no change point notification dialogue 610 representing that the change point is not observed on the display unit 333.

The no change point notification dialogue 610 includes an OK button 611 and a close button 612. The close button 612 is a button for closing the no change point notification dialogue 610. In a case where the OK button 611 is pressed according to the manipulation of the input unit 303 by the user, the change point detecting unit 306 closes the no change point notification dialogue 610 without storing any information in the storing unit 302 or displaying the image on the standard image display unit 508*a* and the difference image display unit 508*b*.

Figure 13:
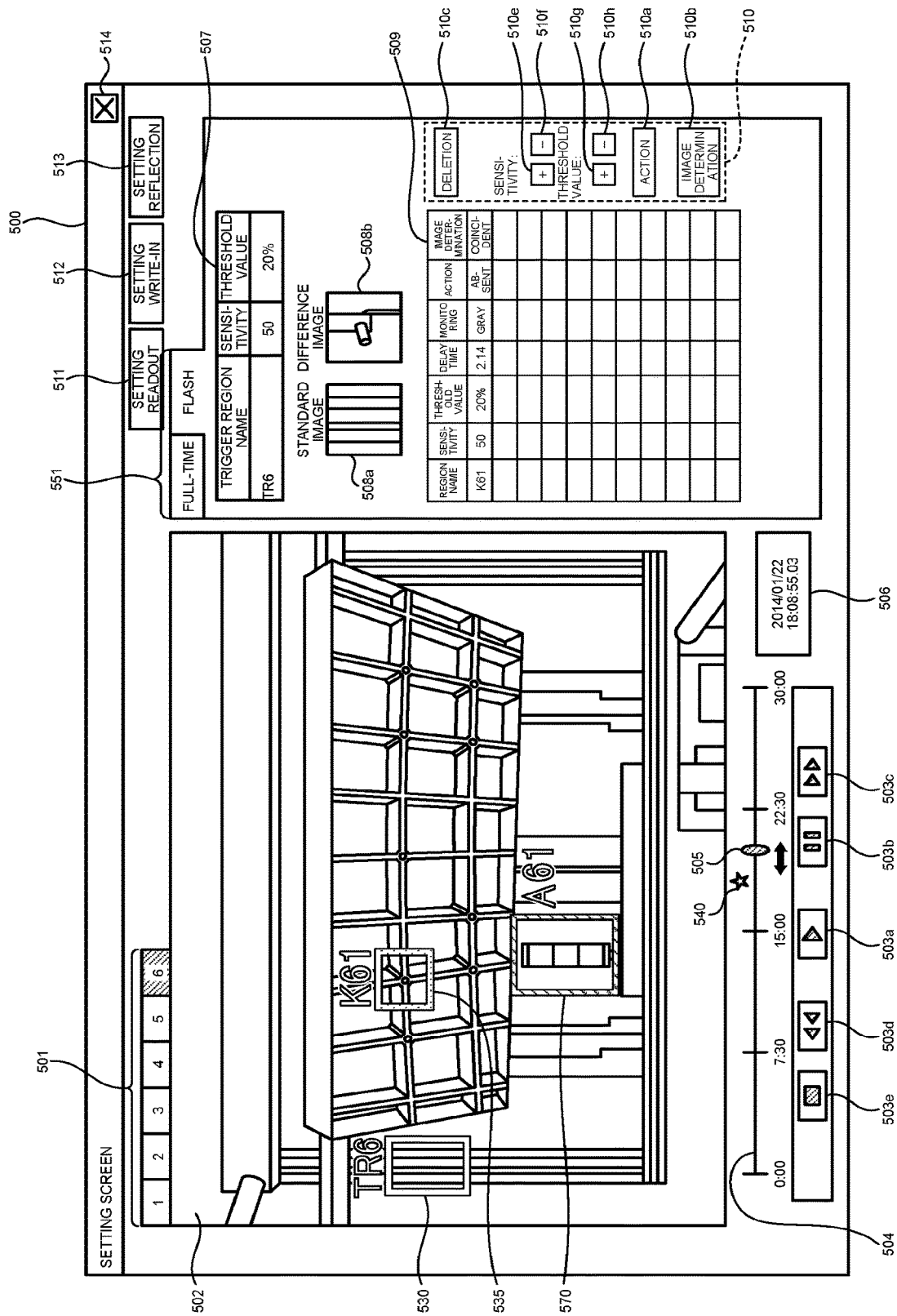
FIG. 13 is a diagram illustrating an example in which a detection region is designated in the setting video display unit on the setting screen to be displayed on the display device of the information processing device according to the embodiment.
Figure 14:
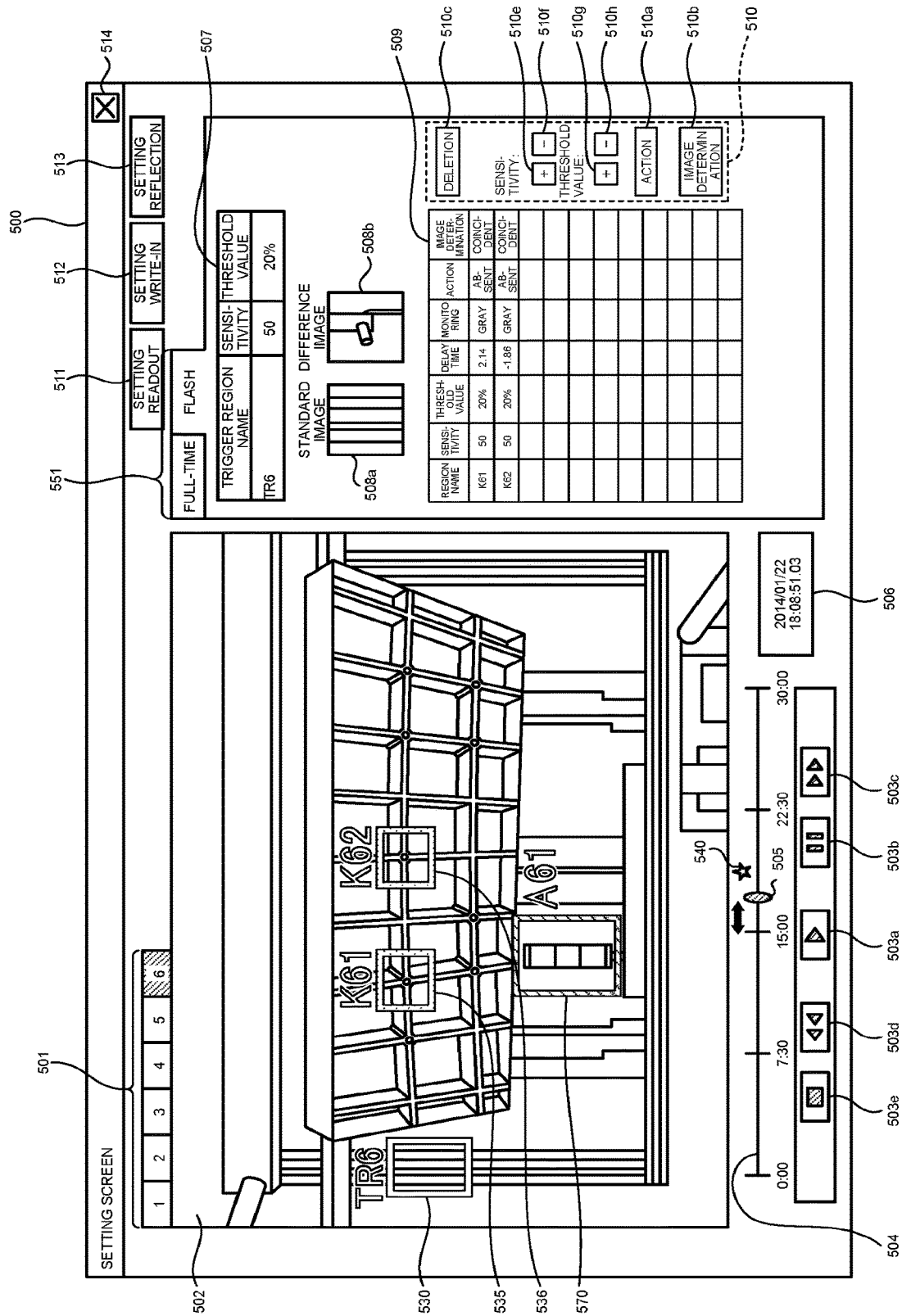
FIG. 14 is a diagram illustrating an example in which a second detection region is designated in the setting video display unit on the setting screen to be displayed on the display device of the information processing device according to the embodiment.
Figure 15:
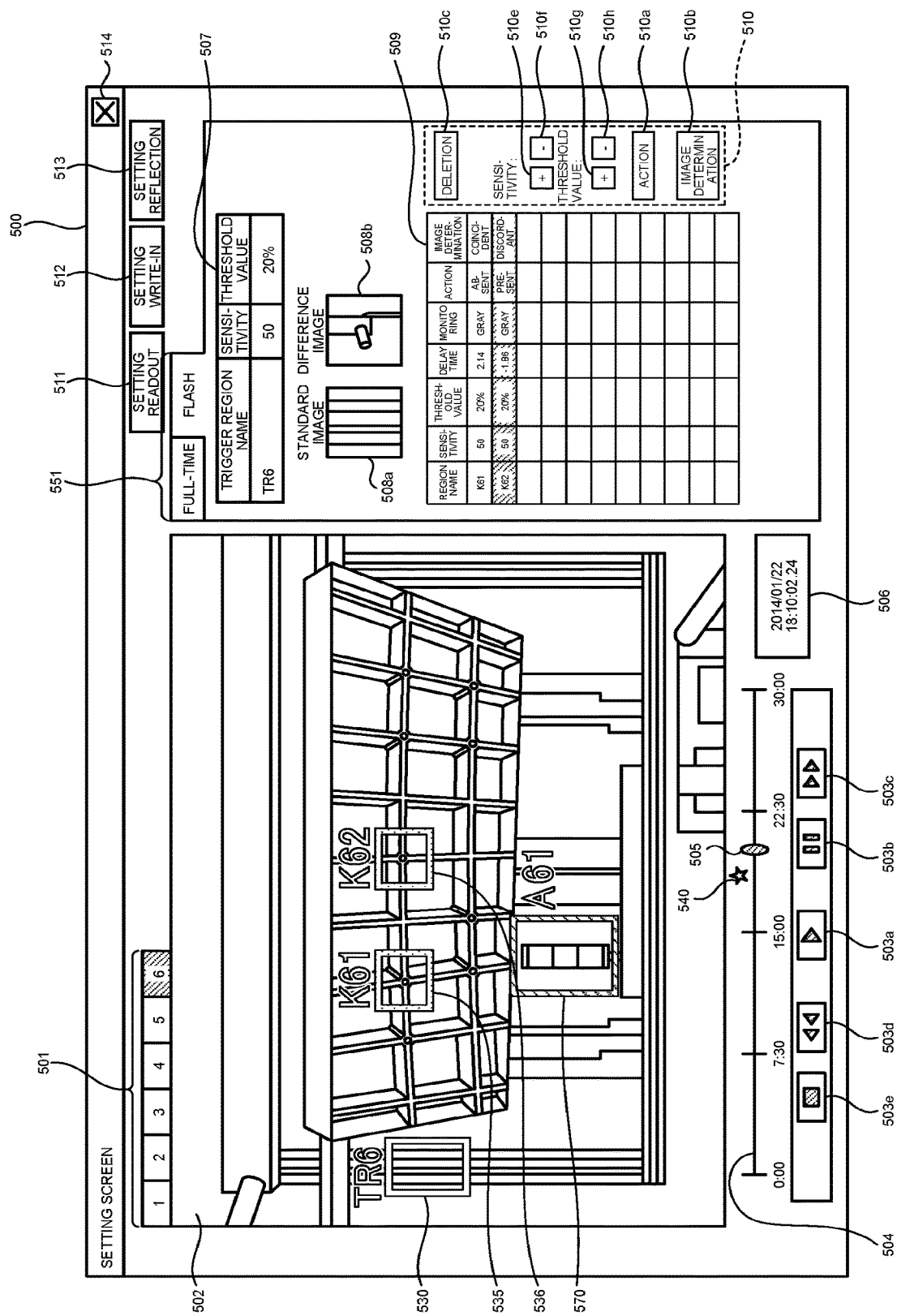
FIG. 15 is a diagram illustrating an example in which attribute information of the detection region designated in the setting video display unit is set on the setting screen to be displayed on the display device of the information processing device according to the embodiment.

Designation of Detection Region and Setting of Attribute Information of Detection Region FIG. 13 is a diagram illustrating an example where the detection region is designated in the setting video display unit on the setting screen displayed on the display device of the information processing device according to the embodiment. FIG. 14 is a diagram illustrating an example in which a second detection region is designated in the setting video display unit on the setting screen to be displayed on the display device of the information processing device according to the embodiment. FIG. 15 is a diagram illustrating an example in which the attribute information of the detection region designated in the setting video display unit on the setting screen to be displayed on the display device of the information processing device according to the embodiment is set. The designation of the of the detection region, the setting of the attribute information of the detection region, and the like will be described with reference to FIGS. 13 to 15.

The setting screen 500 illustrated in FIG. 13 represents a state in which a detection region 535 is designated in the setting video display unit 502 on which the video data is reproduced and displayed by the first reproducing unit 304. Specifically, first, in a case where the temporary stop button 503*b* is pressed according to the manipulation of the input unit 303 by the user at a timing where the portion of the image desired to be subjected to the image determination of the flash detecting function is displayed while the video data is reproduced and displayed in the setting video display unit 502, the first reproducing unit 304 temporarily stops the video data which is reproduced and displayed on the setting video display unit 502, and displays the imaging date and the imaging time of the frame at such a time point on the time display unit 506.

Next, the detection region designating unit 307 designates and displays the detection region 535 (the determination region) on the setting video display unit 502 according to the manipulation of the input unit 303 by the user (for example, the drag manipulation of the mouse 108). Here, in order for the detection region designating unit 307 to designate the detection region 535, it is necessary that the trigger region designated by the trigger region designating unit 305 is selected (in the example of FIG. 13, "TR6") in the trigger region information portion 507. That is, the detection region 535 designated by the detection region designating unit 307 is associated with the trigger region selected in the trigger region information portion 507.

In addition, the setting unit 308 displays the name named in the detection region 535 designated by the detection region designating unit 307 as the attribute information of the detection region 535, and the predetermined sensitivity (for example, "50"), the predetermined threshold value (for example, "20%"), the monitoring method (for example, a "Gray Scale"), the presence or absence of action (for example, "Absent"), and the image determination method (for example, "Coincident"), used in the image determination described below, as the default value on the detection region information portion 509. As illustrated in FIG. 13, for example, the setting unit 308 names "K61" as the name of the detection region 535 by assuming the detection region as a first region associated with the trigger region of "TR6". In addition, the setting unit 308 calculates the delay time of the time of the frame at the time point at which the detection region 535 is designated by the detection region designating unit 307 (in the example of FIG. 13 "2.14") as the attribute information with respect to the time of the change point detected by the change point detecting unit 306, and displays the delay time on the detection region information portion 509. That is, in this case, in the detection region 535 named as "K61", the image determination is set to be performed after "2.14" seconds from the trigger timing.

In addition, the detection region designating unit 307 extracts an image in a detection region 535 at the time when the detection region 535 is designated as the detection standard image (a second standard image) and stores the extracted image in the storing unit 302, and stores the information of the designated detection region 535 (the position information such as the position and the shape, the attribute information, and the like) in the storing unit 302, in association with the imaging device 2 selected by the camera selection tab 501 (in the example of FIG. 13, the imaging device 2f). Further, the detection region designating unit 307 stores the information (the time information) at the time when the detection region 535 is designated in the storing unit 302, in association with the imaging device 2 selected by the camera selection tab 501.

The setting screen 500 illustrated in FIG. 14 represents a state in which a detection region 536, which is the second detection region, is designated in the setting video display unit 502 on which the video data is reproduced and displayed by the first reproducing unit 304. Specifically, first, the slider 505 of the seek bar 504 slides according to the manipulation of the input unit 303 by the user while the video data is reproduced and displayed (is temporarily stopped) in the setting video display unit 502, and performs adjustment to the timing where the portion of the image desired to be subjected to the image determination of the flash detecting function is displayed. The first reproducing unit 304 displays the imaging date and the imaging time of the frame of the video data, which are temporarily stopped in the setting video display unit 502, on the time display unit 506.

Next, the detection region designating unit 307 designates and displays the detection region 536 (the determination region), which is the second detection region, on the setting video display unit 502, according to the manipulation of the input unit 303 by the user (for example, the drag manipulation of the mouse 108). Here, in order for the detection region designating unit 307 to designate the detection region 536, as with a case where the detection region 535 is designated, it is necessary that the trigger region designated by the trigger region designating unit 305 is selected (in the example of FIG. 14, "TR6") in the trigger region information portion 507. That is, the detection region 536 designated by the detection region designating unit 307 is associated with trigger region selected in the trigger region information portion 507.

In addition, the setting unit 308 displays the name named in the detection region 536 designated by the detection region designating unit 307 as the attribute information of the detection region 536, and the predetermined sensitivity (for example, "50"), the predetermined threshold value (for example, "20%"), the monitoring method (for example, "Gray Scale"), the presence or absence of action (for example, "Absent"), and the image determination method (for example, "Coincident"), used in the image determination described below, as the default value on the detection region information portion 509. As illustrated in FIG. 14, for example, the setting unit 308 names "K62" as the name of the detection region 536 by assuming the detection region as a second region associated with the trigger region of "TR6". In addition, the setting unit 308 calculates the delay time of the time of the frame at the time point at which the detection region 536 is designated by the detection region designating unit 307 (in the example of FIG. 14, "−1.86") as the attribute information with respect to the time of the change point detected by the change point detecting unit 306, and displays the calculated delay time on the detection region information portion 509. That is, in this case, in the detection region 536 named as "K62", the image determination is set to be performed before "1.86" seconds from the trigger timing.

In addition, the detection region designating unit 307 extracts an image in a detection region 536 at the time when the detection region 536 is designated as the detection standard image and stores the extracted image in the storing unit 302, and stores the information of the designated detection region 536 (the position information such as the position and the shape, the attribute information, and the like) in the storing unit 302, in association with the imaging device 2 selected by the camera selection tab 501 (in the example of FIG. 14, the imaging device 2f). Further, the detection region designating unit 307 stores the information (the time information) at the time when the detection region 536 is designated in the storing unit 302, in association with the imaging device 2 selected by the camera selection tab 501. Furthermore, in the same method as that described above, it is possible to designate another detection region by the detection region designating unit 307.

The setting screen 500 illustrated in FIG. 15 represents a state in which "K62" is selected from the detection regions "K61" (the detection region 535) and "K62" (the detection region 536) of which the attribute information is displayed on the detection region information portion 509. The edition of the attribute information of the detection region will be described with reference to FIG. 15.

As illustrated in FIG. 15, first, in a case where any one of the detection regions of which the attribute information is displayed on the detection region information portion 509 is selected according to the manipulation of the input unit 303 by the user, the setting unit 308 reversely displays a display portion of the attribute information of the selected detection region of the detection region information portion 509. Hereinafter, as illustrated in FIG. 15, an example will be described in which the detection region 536 (a detection region name of "K62") is selected.

Next, for example, in a case where the action button 510a is pressed according to the manipulation of the input unit 303 by the user, the setting unit 308 switches a setting value of the presence or absence of the action of the selected detection region 536. For example, in a case where the presence or absence of the action of the detection region 536 is "Absent", and the action button 510a is pressed, the setting unit 308 sets the presence or absence of the action of the detection region 536 as "Present". In contrast, in a case where the presence or absence of the action of the detection region 536 is "Present", and the action button 510a is pressed, the setting unit 308 sets the presence or absence of the action of the detection region 536 as "Absent". As described below, in a case where the presence or absence of the action is "Present", and the detection region determination unit 314 determines that there is an abnormality in the image determination of the detection region, the external output unit 332 outputs the abnormality signal.

In addition, for example, in a case where the image determination selection button 510*b* is pressed according to the manipulation of the input unit 303 by the user, the setting unit 308 switches a setting value of the image determination method of the selected detection region 536. For example, in a case where the image determination method of the detection region 536 is "Coincident", and the image determination selection button 510*b* is pressed, the setting unit 308 sets the image determination method of the detection region 536 as "Discordant". In contrast, in a case where the image determination method of the detection region 536 is "Discordant", and the image determination selection button 510*b* is pressed, the setting unit 308 sets the image determination method of the detection region 536 as "Coincident".

As described below, in a case where the image determination method is "Coincident", and a difference between the extracted image and the detection standard image is greater than or equal to the threshold value of the attribute information, the detection region determination unit 314 determines that there is an abnormality. Thus, examples of a case where the image determination method is "Coincident" include a case where in a facility in which a component is inserted to a work, a state where the component is inserted to the work is set to the detection standard image, and the image determination is performed at a timing where an insertion operation of the component with respect to the work is ended. In this case, when the insertion operation of the component with respect to the work is failed, and the image determination is executed by the detection region determination unit 314 in a state where the component is not normally inserted, the difference with respect to the detection standard image is greater than or equal to the threshold value of the attribute information, and it is determined that there is an abnormality.

In contrast, in a case where the image determination method is "Discordant", and the difference between the extracted image and the detection standard image is less than the threshold value of the attribute information, the detection region determination unit 314 determines that there is an abnormality. Thus, examples of a case where the image determination method is "Discordant" include a case where in the facility in which the component is inserted to the work, the state where the component is not inserted to the work is set to the detection standard image, and the image determination is performed at the timing where the insertion operation of the component with respect to the work is ended. In this case, when the insertion operation of the component with respect to the work is failed, and the image determination is executed by the detection region determination unit 314 the state where the component is not normally inserted, the difference with respect to the detection standard image is less than the threshold value of the attribute information, and it is determined that there is an abnormality. Furthermore, examples of a circumstance where the state in which the component is not inserted to the work is set to the detection standard image include a case where it is difficult to prepare the work to which the component as a completed product is inserted.

In addition, for example, in a case where the deletion button 510*c* is pressed according to the manipulation of the input unit 303 by the user, the setting unit 308 deletes the attribute information of the detection region 536 which is displayed on the detection region information portion 509, and deletes the information of the detection region 536 which is stored in the storing unit 302. In addition, the detection region designating unit 307 deletes the detection region 536 which is displayed on the setting video display unit 502, and deletes the detection standard image which are stored in the storing unit 302.

In addition, for example, in a case where the sensitivity increase button 510*e* is pressed according to the manipulation of the input unit 303 by the user, the setting unit 308 increases the value of the sensitivity which is used for the image determination of the selected detection region 536 by the predetermined value. On the other hand, in a case where the sensitivity decrease button 510*f* is pressed according to the manipulation of the input unit 303 by the user, the setting unit 308 decreases the value of the sensitivity which is used for the image determination of the selected detection region 536 by the predetermined value.

In addition, for example, in a case where the threshold value increase button 510*g* is pressed according to the manipulation of the input unit 303 by the user, the setting unit 308 increases the threshold value which is used for the image determination of the selected detection region 536 by the predetermined value. On the other hand, in a case where the threshold value decrease button 510*h* is pressed according to the manipulation of the input unit 303 by the user, the setting unit 308 decreases the threshold value which is used for the image determination of the selected detection region 536 by the predetermined value.

Image Determination Operation on Watcher Screen

Figure 16:
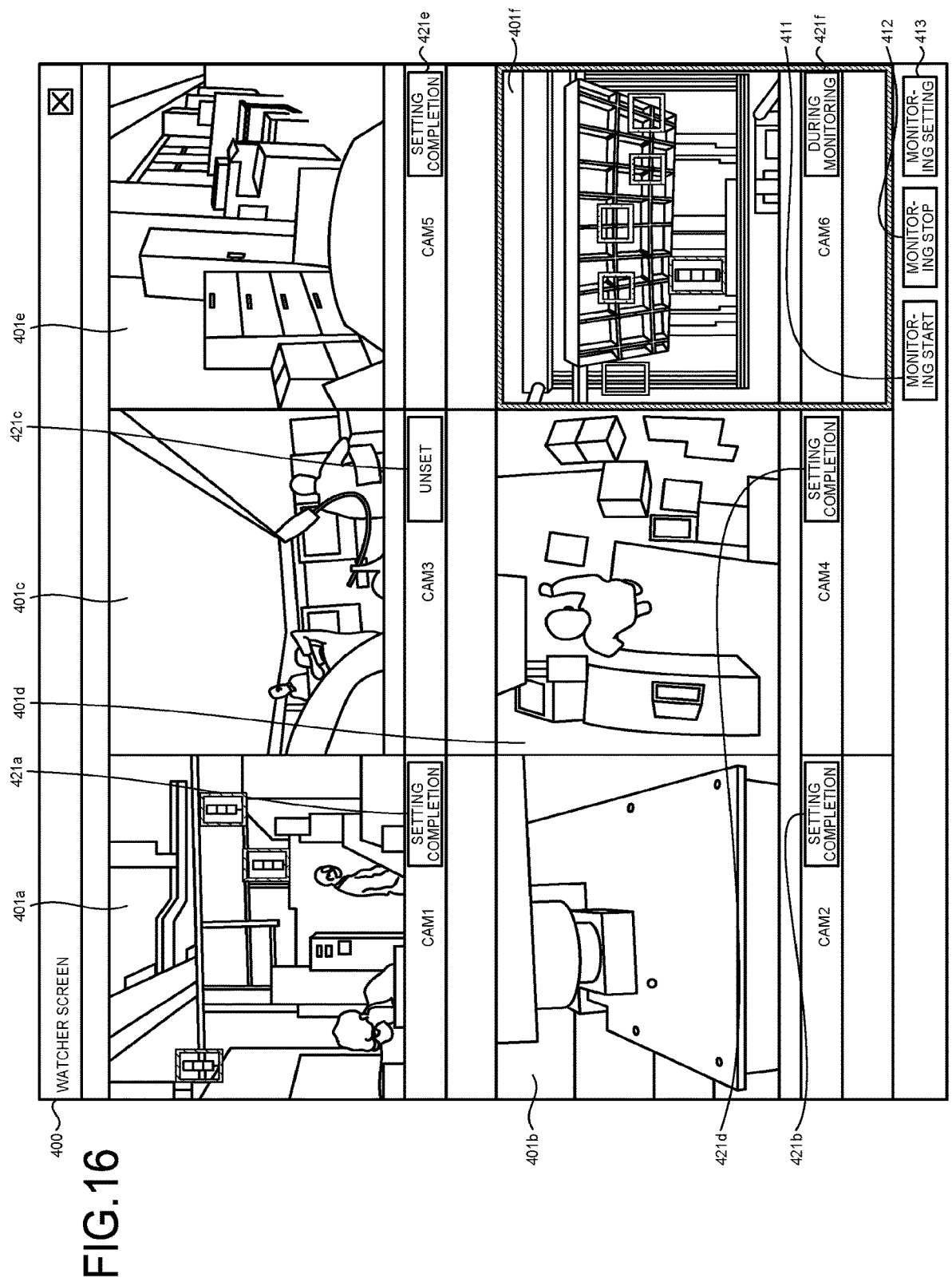
FIG. 16 is a diagram illustrating an example of a state in which a monitoring operation is executed on the watcher screen to be displayed in a display region of the information processing device according to the embodiment.
Figure 17:
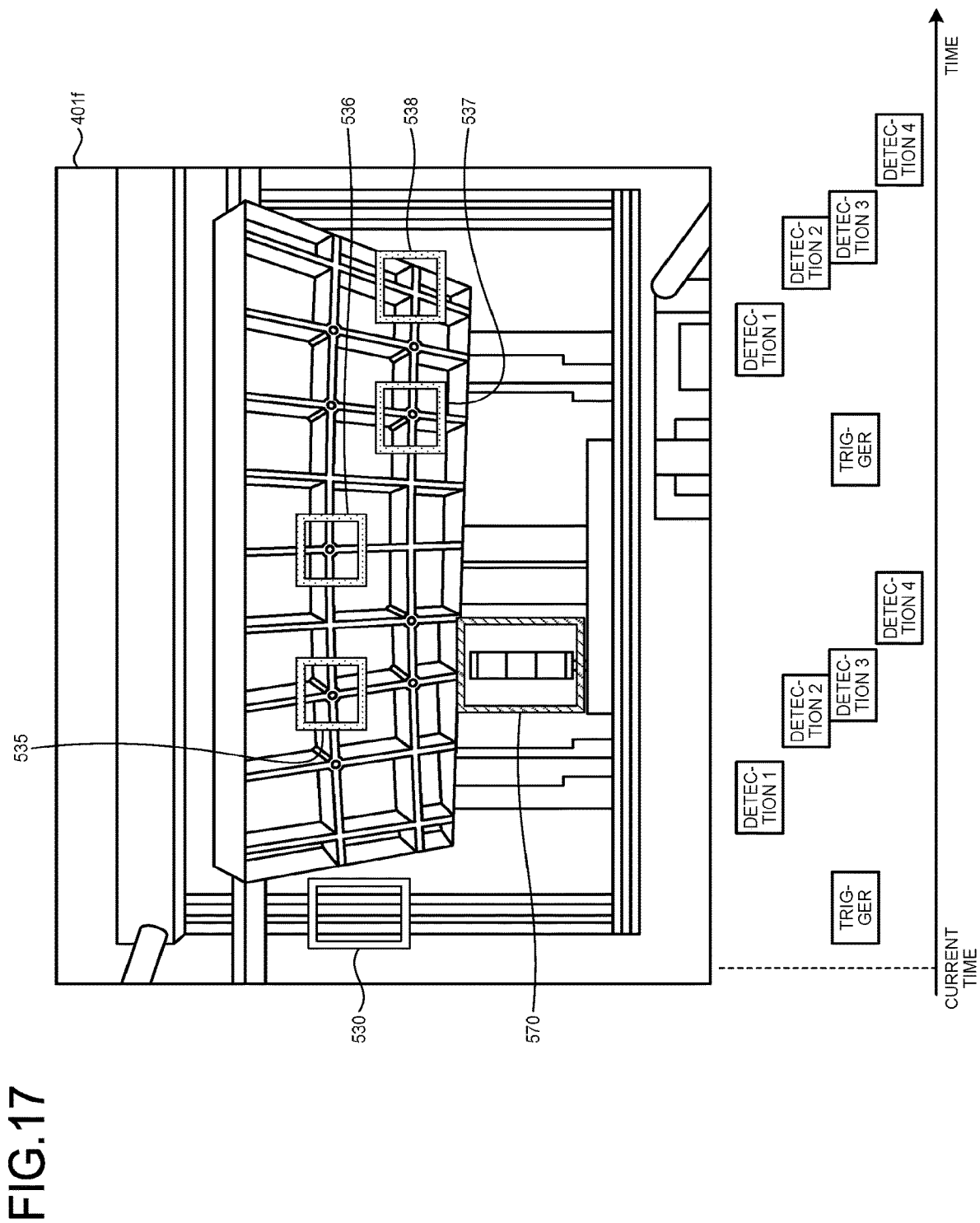
FIG. 17 is a diagram illustrating an example of a state before a trigger is generated by the monitoring operation which is executed on the watcher screen to be displayed in the display region of the information processing device according to the embodiment.
Figure 18:
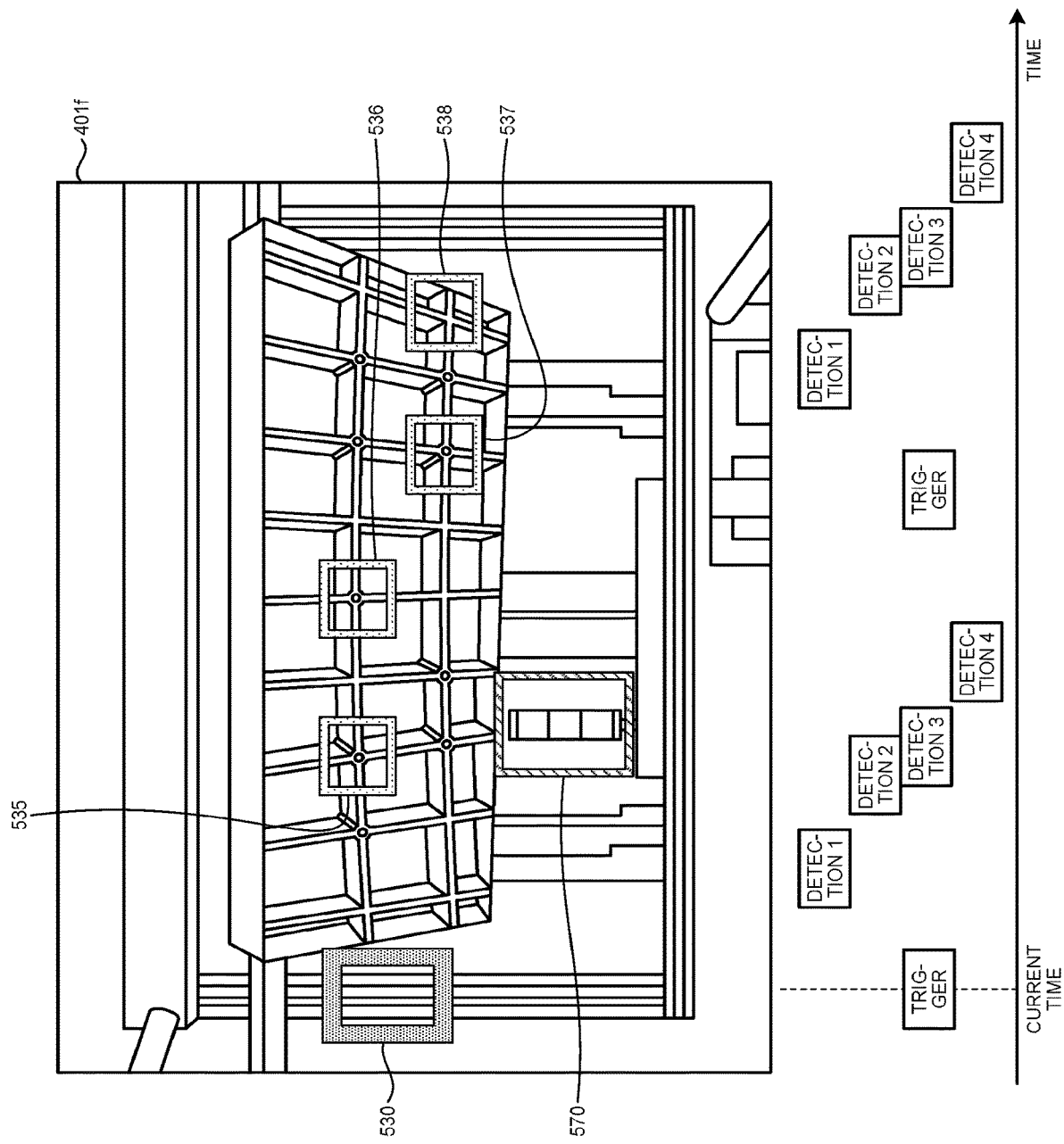
FIG. 18 is a diagram illustrating an example of a state in which the trigger is generated by the monitoring operation which is executed on the watcher screen to be displayed in the display region of the information processing device according to the embodiment.

FIG. 16 is a diagram illustrating an example of a state in which the monitoring operation is executed on the watcher screen to be displayed in the display region of the information processing device according to the embodiment. FIG. 17 is a diagram illustrating an example of a state before the trigger is generated by the monitoring operation which is executed on the watcher screen to be displayed in the display region of the information processing device according to the embodiment. FIG. 18 is a diagram illustrating an example of a state in which the trigger is generated by the monitoring operation which is executed on the watcher screen to be displayed in the display region of the information processing device according to the embodiment. FIGS. 19 to 24 are diagrams illustrating an example of a state in which the image determination is performed in the detection region by the monitoring operation which is executed on the watcher screen to be displayed in the display region of the information processing device according to the embodiment.

First, the outline of the image determination operation (the monitoring operation) on the watcher screen 400 will described with reference to FIG. 16. The watcher screen 400 illustrated in FIG. 16 displays the video data received from the plurality of imaging devices 2 in real time, and illustrates a state in which the full-time detection region of "A61", the trigger region of "TR6", and the detection regions of "K61", "K62", "K63", and "K64" are designated on the video display unit 401*f*. Here, in the image determination operation on the watcher screen 400, a plurality of functions (in the case of this embodiment, the full-time detecting function and the flash detecting function) are executed, and thus, in order to avoid the complication of the appearance, each of the determination regions to be displayed on the video display unit 401 is not displayed. Here, the full-time detecting function is a function of constantly executing the image determination of whether or not the image in the full-time detection region is abnormal during the monitoring operation. In addition, the flash detecting function is a function of executing the image determination of whether or not the image in the detection region is abnormal at a timing before the setting time or after the setting time from the timing where the trigger is detected in the trigger region. In addition, the first control unit 316 is transitioned from the setting screen 500 to the watcher screen 400, and then, the setting of each of the determination regions is completed with respect to the video display unit 401$f$, and thus, "Setting Completion" is displayed on the state display unit 421$f$.

Next, the user presses the video display unit 401 corresponding to the imaging device 2 in which the image determination operation (the monitoring operation) is planned to be started and sets the video display unit to be in the selective state, according to the manipulation of the input unit 303. In the example of FIG. 16, a state is illustrated in which the video display unit 401$f$ is pressed and is set to be in the selective state. Then, in a case where the monitoring start button 411 is pressed according to the manipulation of the input unit 303 by the user, the first control unit 316 starts the image determination operation with respect to the real-time video data of the imaging device 2$f$ to be displayed on the video display unit 401$f$. At this time, as illustrated in FIG. 16, in order to represent the effect that the image determination operation is executed with respect to the imaging device 2$f$, the first control unit 316 displays "during Monitoring" on the state display unit 421$f$. In addition, the first control unit 316 stores the information (the time information) at the time when the image determination operation (the monitoring operation) is started in the storing unit 302, in association with the imaging device 2 corresponding to the video display unit 401 in the selective state. Furthermore, in a case where the monitoring stop button 412 is pressed according to the manipulation of the input unit 303 by the user, the first control unit 316 stops the image determination operation with respect to the video display unit 401 in the selective state, and stores the information (the time information) at the time when the image determination operation (the monitoring operation) is stopped in the storing unit 302, in association with the imaging device 2 corresponding to the video display unit 401.

In the image determination operation on a specific watcher screen 400, first, the video distributing unit 312 sorts and displays the real-time video data acquired from the video receiving unit 301 on the video display units 401$a$ to 401$f$. The trigger generating unit 313 acquires the difference image of the frame at the change point which is detected by the change point detecting unit 306 from the storing unit 302. Then, the trigger generating unit 313 compares the difference image with the image in the trigger region of the frame of the video data, in the trigger region of "TR6" which is designated by the video display unit 401$f$. The trigger generating unit 313 compares the image in the trigger region of the frame of the video data with the difference image of the frame at the change point, and generates the trigger signal at a timing where a difference, which is the total number of pixels of which the pixel value is different by greater than or equal to predetermined sensitivity, is less than a predetermined threshold value (hereinafter, may be referred to as "Detect Trigger"). Then, the trigger generating unit 313 stores the information (the time information) at the time when the trigger signal is generated by the image determination operation in the storing unit 302, in association with the imaging device 2 to which the image determination operation is executed. In addition, the trigger generating unit 313 writes the information (the time information) at the time when the trigger signal is generated by the image determination operation in a marker file of the storing unit 302, in association with the imaging device 2 to which the image determination operation is executed.

In the attribute information items of the detection regions of "K61", "K62", "K63", and "K64", detection delay time is set to each of "1.0" second, "2.2" seconds, "2.5" seconds, and "4.0" seconds. The detection region determination unit 314 acquires the attribute information of the designated detection region from the storing unit 302. The detection region determination unit 314 compares the detection standard image with the image in the detection region of the frame of the video data in the designated detection region before the setting time or after the setting time at the time of receiving the trigger signal generated by the trigger generating unit 313, and performs the image determination of whether or not there is an abnormality.

Specifically, the detection region determination unit 314 compares the image in the detection region of the frame of the video data after the detection delay time of "1.0" second corresponding to the detection region of "K61" from the time point where the trigger signal corresponding to the trigger region of "TR6" is received by the trigger generating unit 313 with the detection standard image, and performs the image determination of whether or not there is an abnormality. At this time, in the image determination, the detection region determination unit 314 compares the detection standard image with the image in the detection region, and in a case where the difference, which is the total number of pixels of which the pixel value is different by greater than or equal to predetermined sensitivity of the attribute information of the detection region of "K61", is greater than or equal to the threshold value of the attribute information, determines that the image determination of the detection region of "K61" is abnormal. Then, the detection region determination unit 314 associates the information (the time information) at the detection time when a normality or an abnormality is detected by the image determination operation with the imaging device 2 to which the image determination operation is executed, and stores the information in the storing unit 302. In addition, the detection region determination unit 314 associates the information (the time information) at the detection time when an abnormality is detected by the image determination operation with the imaging device 2 to which the image determination operation is executed, and writes the information in the marker file of the storing unit 302.

Thus, examples of an example in which the detection region determination unit 314 performs the image determination at a previous timing from the time point of receiving the trigger signal, include a case where in a facility such as a press fitting machine, the image determination is performed with respect to a press fitting state after being press-fitted by using a timing where a press fitting operation is started as the trigger. Specifically, the trigger generating unit 313 generates the trigger signal by using a timing where an operation of allowing the press fitting machine to press-fit a press fitting component with respect to the work is started as the trigger. After that, the press fitting machine press-fits the press fitting component with respect to the work, and each actuator of the press fitting machine is returned to an origin position after being press-fitted operation is ended. Then, the detection region determination unit 314 performs the image determination with respect to the press fitting state of the work after being press-fitted. The timing of the image determination of the detection region determination unit 314 is a timing after time set by the detection delay time from the trigger signal is received from the trigger generating unit 313. Time from the start of the press fitting operation in which the trigger signal is generated until the image determination of the press fitting state after being press-fitted is executed is an automatic operation of the press fitting machine, and thus, is fixing time, and the detection delay time from the trigger timing to the image determination is set as the fixing time.

In addition, the detection region determination unit 314 compares the images in each of the detection regions of the frame of the video data after the detection delay time corresponding to each of the detection regions of "K62", "K63", and "K64" with the detection standard images in each of the detection regions and performs the image determination of whether or not there is an abnormality. A method of the image determination is identical to that of a case of the detection region of "K61" described above.

Then, in a case where the detection region determination unit 314 performs the determination of an abnormality, the external output unit 332 outputs the abnormality signal to the external device 10.

In addition, the full-time detection region determination unit 315 acquires the attribute information of the designated full-time detection region (in FIG. 7, the full-time detection region 570) from the storing unit 302. In the designated full-time detection region, the full-time detection region determination unit 315 compares the full-time detection standard image with the image in the full-time detection region of the frame of the video data and constantly executes the image determination of whether or not there is an abnormality, while the monitoring operation is executed.

Specifically, the full-time detection region determination unit 315 compares the image in the detection region of the frame of the video data corresponding to full-time detection region of "A61" with the standard full-time detection region, and performs the image determination of whether or not there is an abnormality. At this time, in the image determination, the full-time detection region determination unit 315 compares the full-time detection standard image with the image in the full-time detection region, and in a case where the difference, which is the total number of pixels of which the pixel value is different by greater than or equal to predetermined sensitivity of the attribute information of the full-time detection region of "A61", is greater than or equal to the threshold value of the attribute information, determines that the image determination of the full-time detection region of "A61" is abnormal. Then, the full-time detection region determination unit 315 associates the information (the time information) at the detection time when the abnormality is detected by the image determination operation with the imaging device 2 to which the image determination operation is executed, and stores the information in the storing unit 302. In addition, the full-time detection region determination unit 315 associates the information (the time information) at the detection time when the abnormality is detected by the image determination operation with the imaging device 2 to which the image determination operation is executed, and writes the information in the marker file of the storing unit 302.

Then, in a case where the determination of the abnormality is performed by the full-time detection region determination unit 315, the external output unit 332 outputs the abnormality signal to the external device 10.

Next, the image determination operation (the monitoring operation) with respect to the video data based on the flash detecting function will be described in detail by using the video display unit 401f of the watcher screen 400 as an example, with reference to FIGS. 17 to 24. First, in a case where the image determination operation is started with respect to the video display unit 401f, the first control unit 316 displays frames representing each of the determination regions designated by the setting screen 500 by superimposing the frames on the video data of the video display unit 401f. Specifically, as illustrated in FIG. 17, the video display unit 401f displays the trigger region 530, the detection regions 535 to 538, and the full-time detection region 570. At this time, the first control unit 316 displays the frames representing each of the determination regions (an example of the display element) in a normal state (a state in which the detection is not performed in each of the determination regions) with separate colors. For example, the first control unit 316 displays the frame representing the trigger region 530 with "White", the frames representing the detection regions 535 to 538 with "Yellow", and the frame representing the full-time detection region 570 with "Green".

Next, as illustrated in FIG. 18, in a case where the trigger generating unit 313 detects the trigger, the first control unit 316 displays the frame representing the trigger region 530 with a color different from the color in the normal state and displays the frame to be bolder than the frame in the normal state (hereinafter, may be simply referred to as "Bold Display"). For example, the first control unit 316 displays the frame representing the trigger region 530 with "Blue" and displays the frame to be bold, and continues the display state for 1 second. Then, the first control unit 316 returns the displays of the frame representing the trigger region 530 to the displays of the frame in the normal state, after 1 second.

Figure 19:
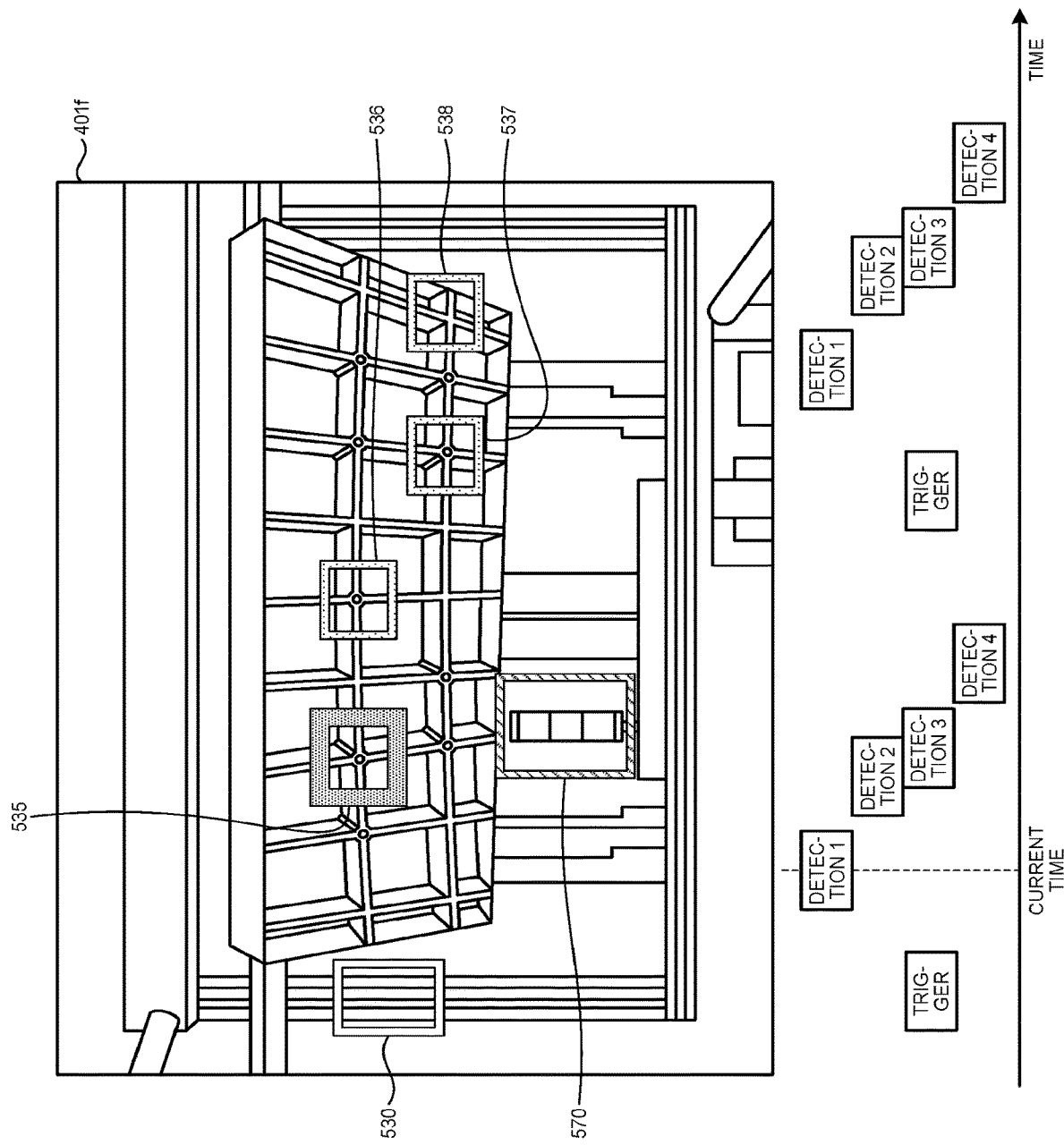
FIG. 19 is a diagram of an example of a state in which image determination is performed in a detection region by the monitoring operation which is executed on the watcher screen to be displayed in the display region of the information processing device according to the embodiment.

Next, the detection region determination unit 314 receives the trigger signal from the trigger generating unit 313, and then, performs the image determination in the detection region 535 after "1.0" second, which is the detection delay time set with respect to the detection region 535. As a result of the determination, in a case where a normality is detected, as illustrated in FIG. 19, the first control unit 316 displays the frame representing the detection region 535 with a color different from the color in the normal state and displays the frame to be bolder than the frame in the normal state. For example, in order to represent that a normality is detected, the first control unit 316 displays the frame representing the detection region 535 with "Blue" and displays the frame to be bold, and continues the display state for 1 second. Then, the first control unit 316 returns the displays of the frame representing the detection region 535 to the display in the normal state, after 1 second.

Figure 20:
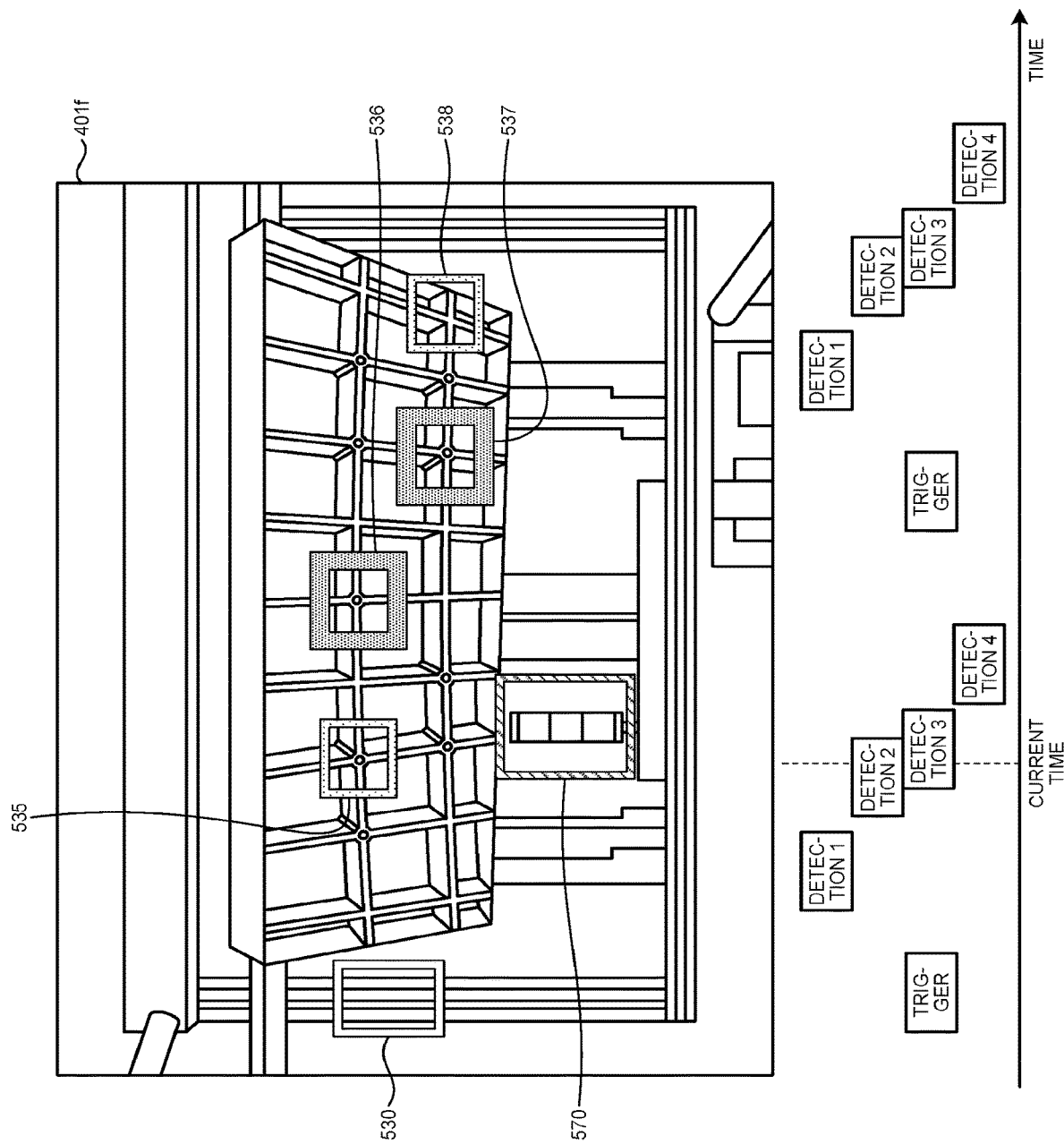
FIG. 20 is a diagram illustrating an example of a state in which the image determination is performed in the detection region by the monitoring operation which is executed on the watcher screen to be displayed in the display region of the information processing device according to the embodiment.

Next, the detection region determination unit 314 receives the trigger signal from the trigger generating unit 313, and then, performs the image determination in the detection region 536 after "2.2" seconds, which is the detection delay time set with respect to the detection region 536. Further, the detection region determination unit 314 receives the trigger signal from the trigger generating unit 313, and then, performs the image determination in a detection region 537 after "2.5" seconds, which is the detection delay time set with respect to the detection region 537. As a result of the determination, in a case where normalities are respectively detected, as illustrated in FIG. 20, the first control unit 316 displays the frames representing each of the detection regions 536 and 537 with a color different from the color in the normal state and displays the frames to be bolder than the frame in the normal state. For example, in order to represent that a normality is detected, the first control unit 316 displays the frames representing each of the detection regions 536 and 537 with "Blue" and displays the frames to be bold, and continues the display state for 1 second. Then, the first control unit 316 returns the displays of each of the detection regions 536 and 537 to the display of the frame in the normal state after 1 second.

Figure 21:
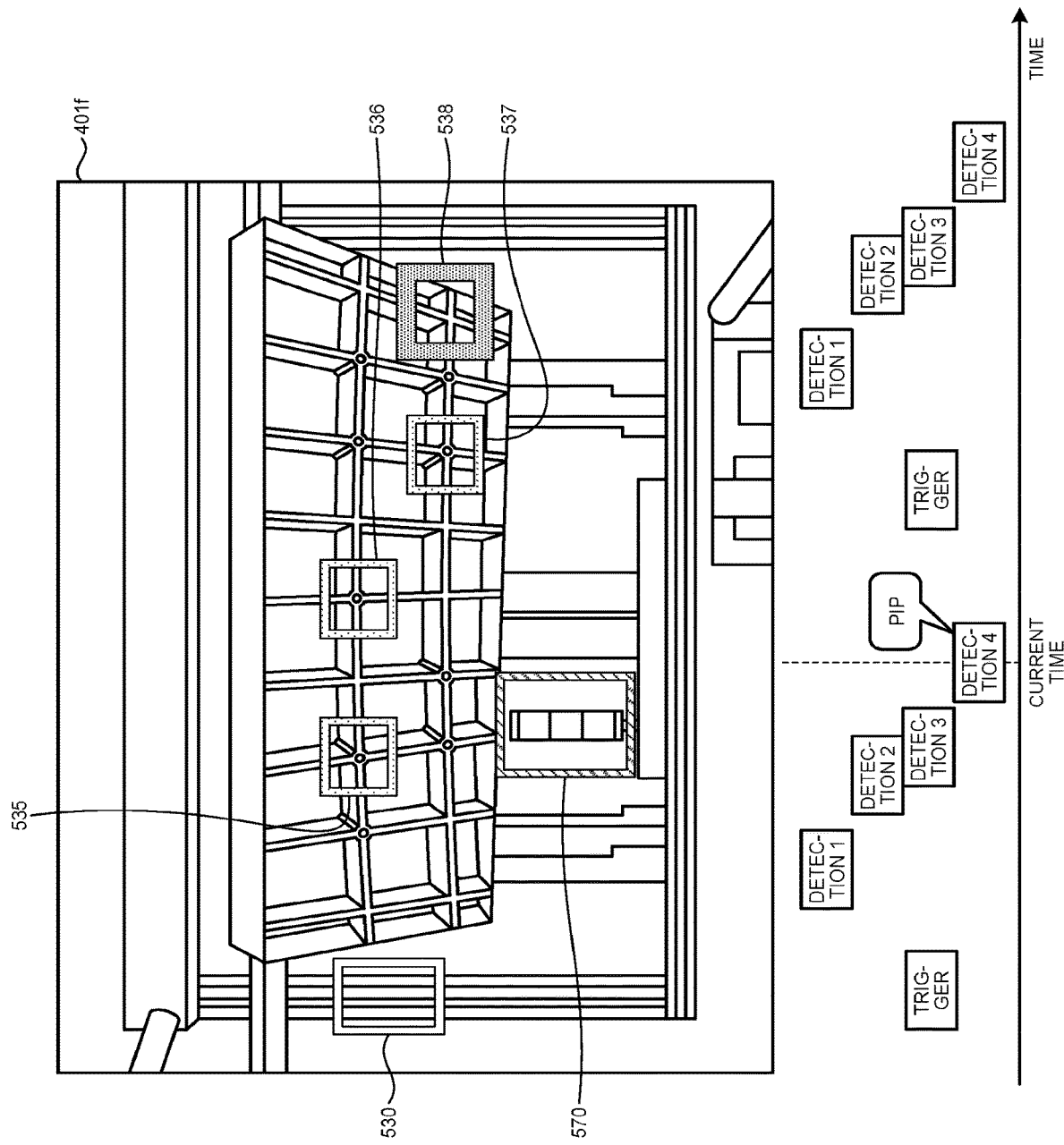
FIG. 21 is a diagram illustrating an example of a state in which the image determination is performed in the detection region by the monitoring operation which is executed on the watcher screen to be displayed in the display region of the information processing device according to the embodiment.

Then, the detection region determination unit 314 receives the trigger signal from the trigger generating unit 313, and then, performs the image determination in the detection region 538 after "4.0" seconds, which is the detection delay time set with respect to the detection region 538. As a result of the determination, in a case where a normality is detected, as illustrated in FIG. 21, the first control unit 316 displays the frame representing the detection region 538 with a color different from the color in the normal state and displays the frame to be bolder than the frame in the normal state. For example, in order to represent that a normality is detected, the first control unit 316 displays the frame representing the detection region 538 with "Blue" and display the frame to be bold, and continues the display state for 1 second. Then, the first control unit 316 returns the display of the frame representing the detection region 538 to the display of the frame in the normal state after 1 second. Then, the notifying control unit 317 outputs determination end sound representing the end of the image determination of the detection region (in FIG. 21, represented as "Pip") to the notifying unit 334 for a predetermined time (for example, 0.2 seconds), at a timing where all of the image determinations of the detection region according to the trigger of the trigger generating unit 313 are ended by the detection region determination unit 314 (that is, a timing where the image determination of the detection region 538 is ended). As described above, in FIGS. 19 to 21, a case has been described in which the normality is detected in all of the image determinations of the detection regions 535 to 538. Next, a case will be described in which an abnormality is detected in any one of the detection regions 535 to 538.

Figure 22:
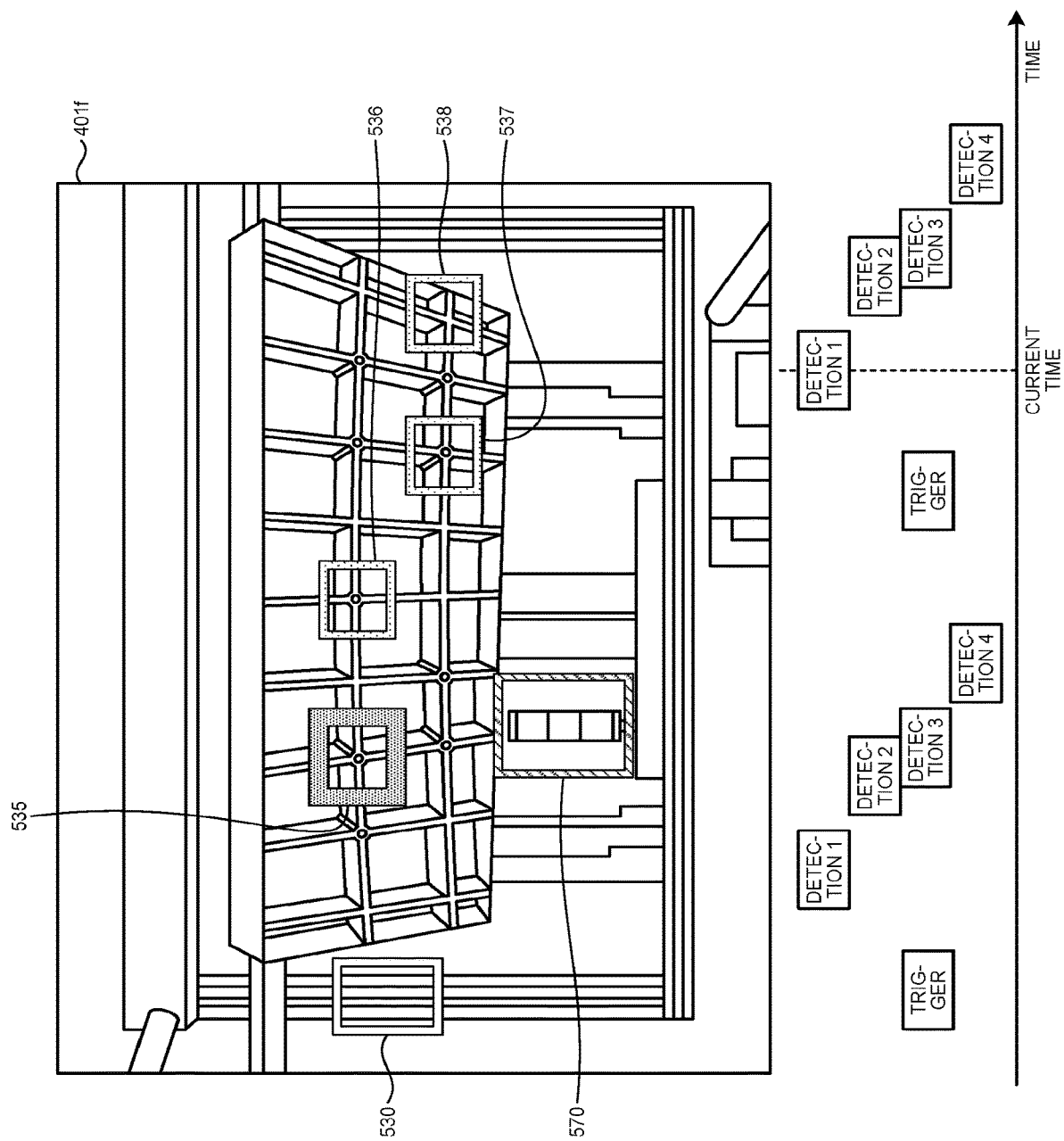
FIG. 22 is a diagram illustrating an example of a state in which the image determination is performed in the detection region by the monitoring operation which is executed on the watcher screen to be displayed in the display region of the information processing device according to the embodiment.

As illustrated in FIG. 18, an operation after the trigger is detected again after the trigger generating unit 313 detects the trigger will be described. The detection region determination unit 314 receives the trigger signal from the trigger generating unit 313, and performs the image determination in the detection region 535 after "1.0" second, which is the detection delay time set with respect to the detection region 535. As a result of the determination, in a case where a normality is detected, as illustrated in FIG. 22, the first control unit 316 displays the frame representing the detection region 535 with a color different from the color in the normal state and displays the frame to be bolder than the frame in the normal state. For example, in order to represent that a normality is detected, the first control unit 316 displays the frame representing the detection region 535 with "Blue" and displays the frame to be bold, and continues the display state for 1 second. Then, the first control unit 316 returns the displays of the frame representing the detection region 535 to the display of the frame in the normal state after 1 second.

Figure 23:
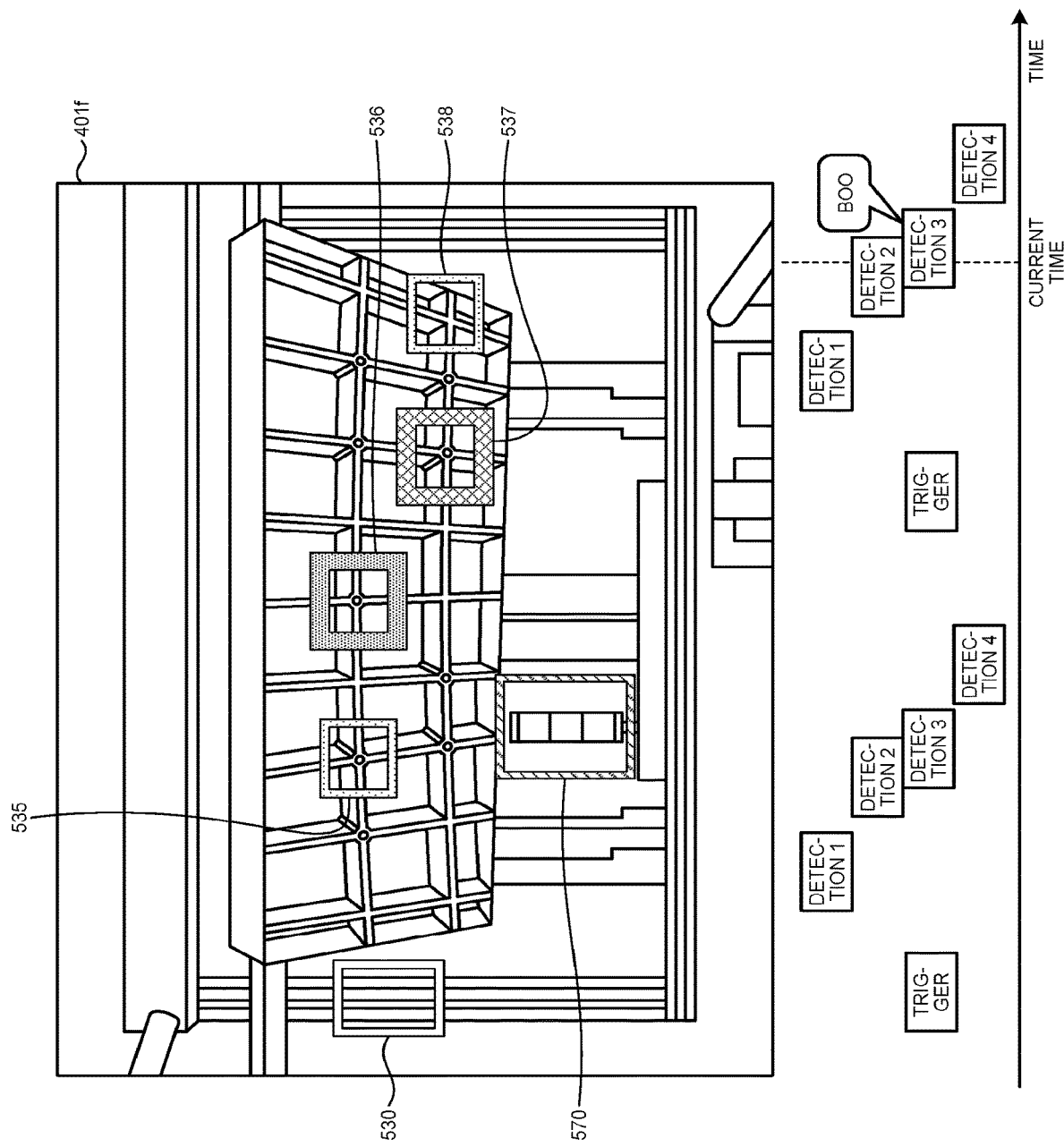
FIG. 23 is a diagram illustrating an example of a state in which the image determination is performed in the detection region by the monitoring operation which is executed on the watcher screen to be displayed in the display region of the information processing device according to the embodiment.

Next, the detection region determination unit 314 receives the trigger signal from the trigger generating unit 313, and performs the image determination in the detection region 536 after "2.2" seconds, which is the detection delay time set with respect to the detection region 536. Further, the detection region determination unit 314 receives the trigger signal from the trigger generating unit 313, and performs the image determination in the detection region 537 after "2.5" seconds, which is the detection delay time set with respect to the detection region 537. As a result of the determination, in a case where a normality is detected in the detection region 536, as illustrated in FIG. 23, the first control unit 316 displays the frame representing the detection region 536 with a color different from the color in the normal state and displays the frame to be bolder than the frame in the normal state. For example, in order to represent that a normality is detected, the first control unit 316 displays the frame representing the detection region 536 with "Blue" and displays the frame to be bold, and continues the display state for 1 second. Then, the first control unit 316 returns the display of the frame representing the detection region 536 to the display of the frame in the normal state after 1 second. In addition, as a result of the determination described above, in a case where an abnormality is detected in the detection region 537, as illustrated in FIG. 23, the first control unit 316 displays the frame representing the detection region 537 with a color different from the color in the normal state and displays the frame to be bolder than the frame in the normal state. For example, in order to represent that an abnormality is detected, the first control unit 316 displays the frame representing the detection region 537 with "Red" and displays the frame to be bold, and continues the display state for 1 second. At this time, the notifying control unit 317 outputs abnormality detection sound (in FIG. 23, represented as "Boo") notifying that the abnormality is detected to the notifying unit 334 for a predetermined time (for example, 1 second), at a timing where an abnormality is detected in the detection region 537 by the detection region determination unit 314. Then, the first control unit 316 returns the displays of the frame representing the detection region 537 to the display of the frame in the normal state after 1 second.

Figure 24:
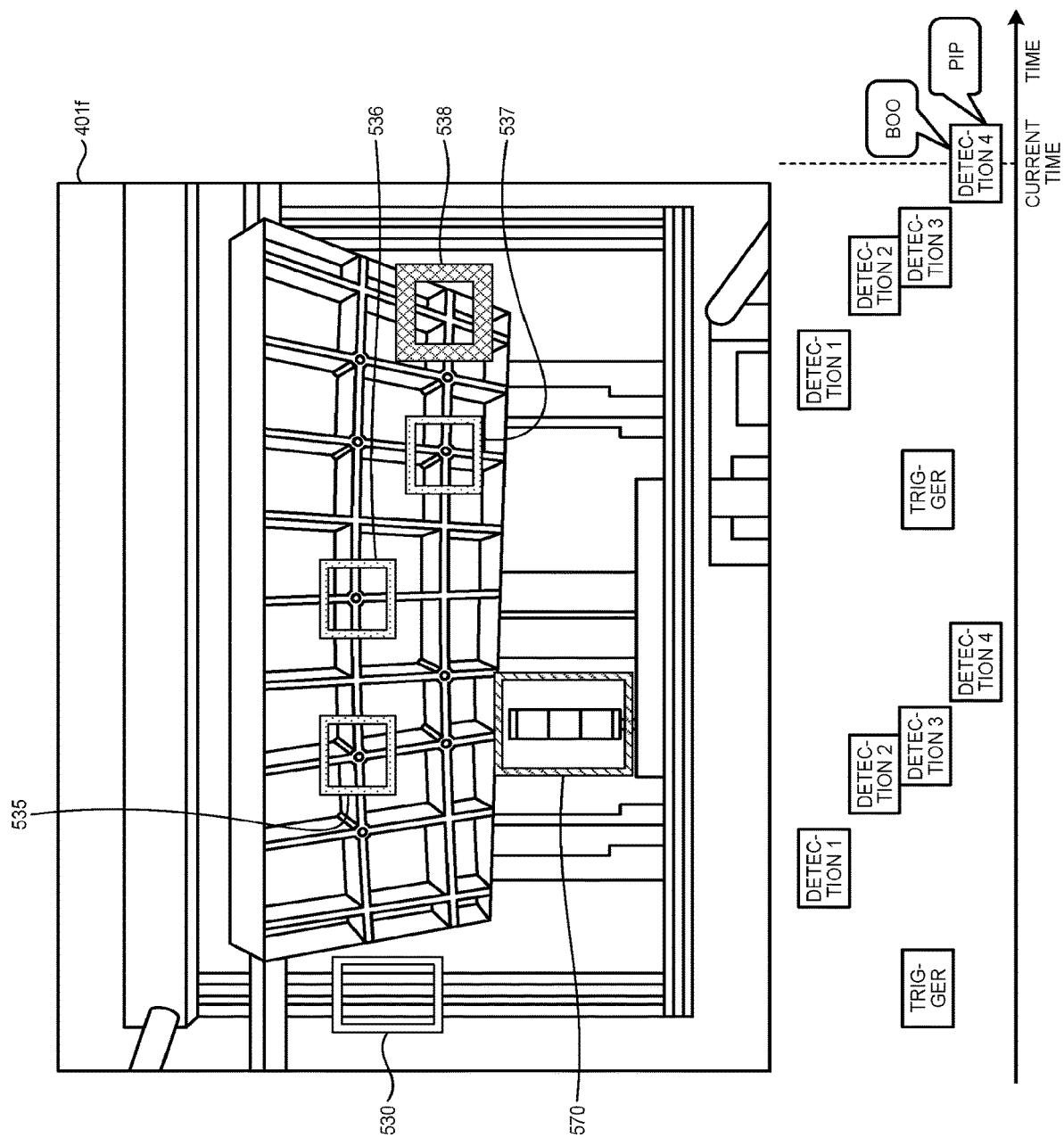
FIG. 24 is a diagram illustrating an example of a state in which the image determination is performed in the detection region by the monitoring operation which is executed on the watcher screen to be displayed in the display region of the information processing device according to the embodiment.

Then, the detection region determination unit 314 receives the trigger signal from the trigger generating unit 313, and then, performs the image determination in the detection region 538 after "4.0" seconds, which is the detection delay time set with respect to the detection region 538. As a result of the determination, in a case where an abnormality is detected, as illustrated in FIG. 24, the first control unit 316 displays the frame representing the detection region 538 with a color different from the color in the normal state and displays the frame to be bolder than the frame in the normal state. For example, in order to represent that an abnormality is detected, the first control unit 316 displays the frame representing the detection region 538 with "Red" and displays the frame to be bold, and continues the display state for 1 second. At this time, the notifying control unit 317 outputs abnormality detection sound notifying that the abnormality is detected (in FIG. 24, represented as "Boo") to the notifying unit 334 for a predetermined time (for example, 1 second), at a timing where an abnormality is detected in the detection region 538 by the detection region determination unit 314. Then, the first control unit 316 returns the display of the frame representing the detection region 538 to the display of the frame in the normal state after 1 second. Then, the notifying control unit 317 outputs determination end sound (in FIG. 24, represented as "Pip") representing that the image determination of the detection region is ended to the notifying unit 334 for a predetermined time (for example, 0.2 seconds), at a timing where all of the image determinations of the detection regions according to the trigger of the trigger generating unit 313 are ended by the detection region determination unit 314 (that is, a timing where the image determination of the detection region 538 is ended). In this case, according to the image determination of the detection region 538, the abnormality detection sound and the determination end sound are output by the notifying unit 334 by being superimposed, but the sounds are different from each other (for example, sound of different scales, or different waveforms or melodies), and thus, it is possible for the user to differentially listen to both of the sounds. As described above, in FIGS. 22 to 24, a case will be described in which an abnormality is detected by any one of the image determinations of the detection regions 535 to 538.

Furthermore, in the above description, the display operation of the frames of each of the determination regions (the trigger region 530, and the detection regions 535 to 538) in the image determination operation with respect to the video data based on the flash detecting function has been described, and the same applies to the display operation of the frame of the full-time detection region 570 in the image determination operation based on the full-time detecting function. For example, as a result of the image determination which is constantly executed by the full-time detection region determination unit 315, in a case where an abnormality is detected in the full-time detection region 570, the first control unit 316 displays the frame representing the full-time detection region 570 with a color different from the color in the normal state and displays the frame to be bolder than the frame in the normal state. For example, in order to represent that an abnormality is detected, the first control unit 316 displays the frame representing the full-time detection region 570 with "Red" and displays the frame to be bold, and continues the display state while the abnormality is detected. Then, in a case where the image of the full-time detection region 570 is returned to the normal state, the first control unit 316 returns the display of the frame representing the full-time detection region 570 to the display of the frame in the normal state. Furthermore, in a case where an abnormality is detected in the full-time detection region 570 by the full-time detection region determination unit 315, the notifying control unit 317 may output the abnormality detection sound notifying that the abnormality is detected to the notifying unit 334.

As described above, in a case where the frames representing each of the determination regions are displayed with different colors, and each detection is performed in the determination region (the detection of the trigger, the detection of the normality, or the detection of the abnormality), the first control unit 316 displays the frames with different colors and displays the frames to be bold such that the frames can be distinguished from each other. Accordingly, the user is capable of visually grasping the performed image determination operation (the monitoring operation) of any function and the timing of each of the detections. Further, in a case where the abnormality is detected in the detection region, and all of the image determinations of the detection regions according to the same trigger are ended, the sound is output. Accordingly, the user is also capable of auditorily grasping the timing where the abnormality is detected and the image determination is ended.

Furthermore, in an example of the watcher screen 400 illustrated in FIG. 16, the monitoring operation can be performed in six display regions of video display units 401a to 401f, and thus, it is desirable that the scale, the waveform, the melody, or the like of the determination end sound is changed by each of the video display units 401. For example, the notifying control unit 317 allocates and outputs "Do Re Mi Fa Sol La", which is the scale, to the notifying unit 334, as the determination end sound in each of the video display units 401. Accordingly, it is possible to distinguish the determination end sound of the monitoring operation in which of the video display units 401. In this case, sound of "La" is allocated to the determination end sound of the image determination operation in the video display unit 401f described above.

In addition, a display aspect such as the colors of the frames representing each of the determination regions, and the type, the melody, the scale, or the like of the determination end sound and the abnormality detection sound may be changed according to the setting.

Image Determination Reproducing Operation on Viewer Screen

Figure 25:
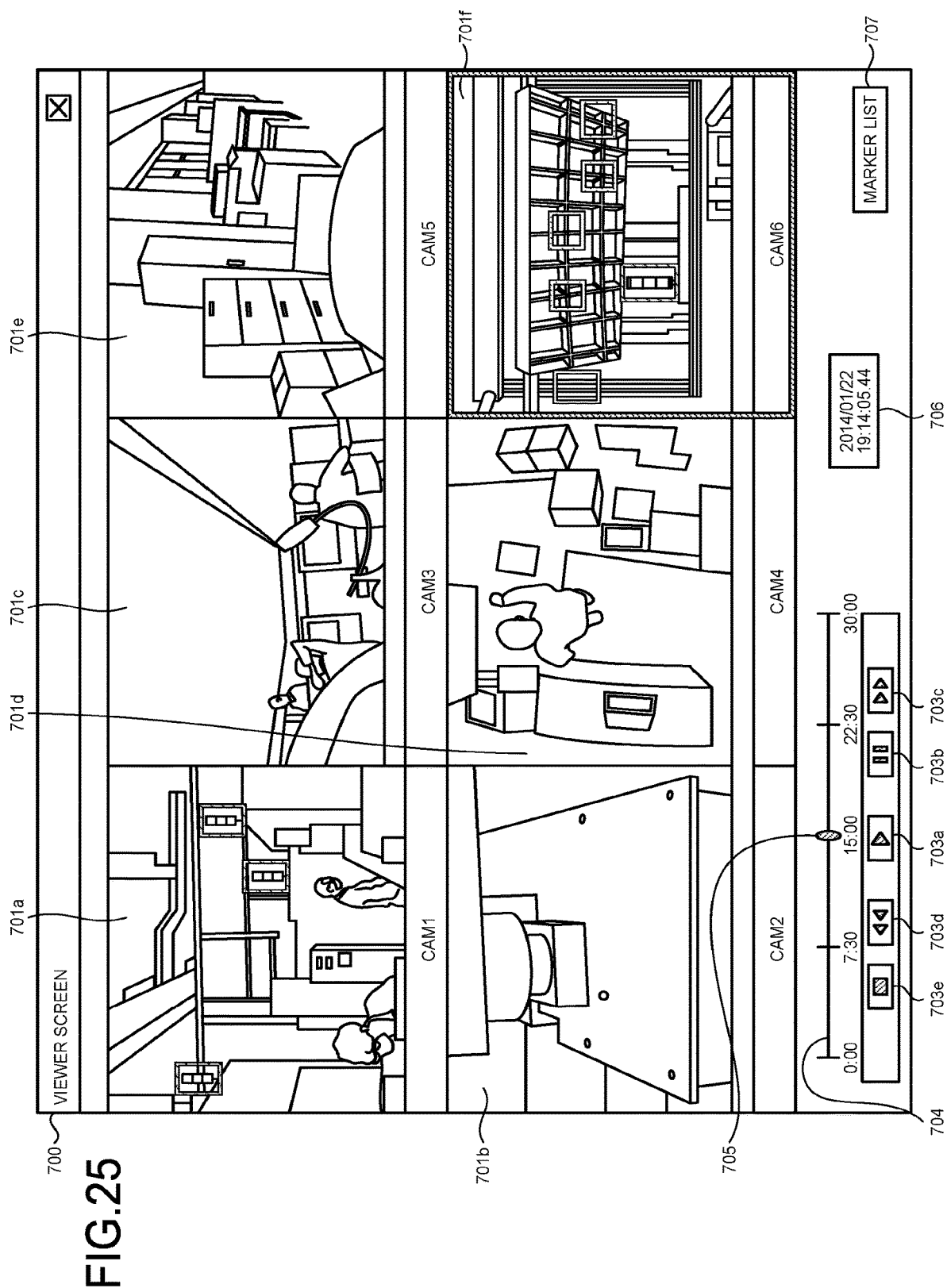
FIG. 25 is a diagram illustrating an example of a state in which a recorded video is displayed on a viewer screen to be displayed in the display region of the information processing device according to the embodiment.
Figure 26:
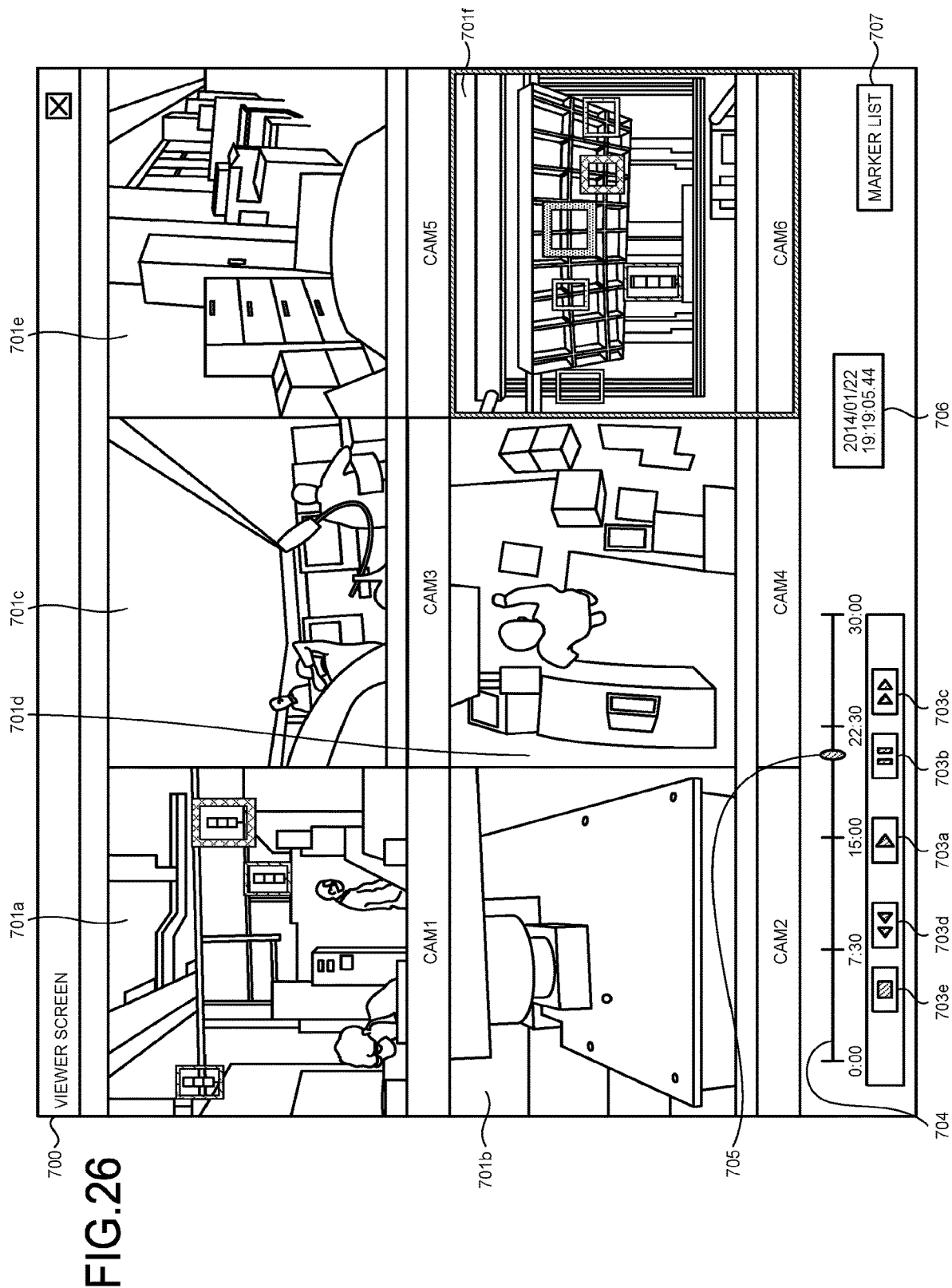
FIG. 26 is a diagram illustrating an example of a state in which a state of the image determination is reproduced with respect to the video which is reproduced and displayed on the viewer screen to be displayed in the display region of the information processing device according to the embodiment.

FIG. 25 is a diagram illustrating an example of a state in which a recorded video is reproduced and displayed on the viewer screen to be displayed in the display region of the information processing device according to the embodiment. FIG. 26 is a diagram illustrating an example of a state in which the state of the image determination is reproduced with respect to the video reproduced and displayed on the viewer screen to be displayed in the display region of the information processing device according to the embodiment. The configuration of the viewer screen 700 and an operation in which a plurality of recorded videos are displayed will be described with reference to FIGS. 25 and 26.

The viewer screen 700 illustrated in FIG. 25 is displayed on the display unit 333 according to a program (an application) which is executed by the CPU 101. The viewer screen 700 is a screen which displays the video data received from the plurality of imaging devices 2, which is the past video data stored in the storing unit 302 by the video distributing unit 312, and reproduces the state of the image determination in each of the designated determination regions, by the second reproducing unit 318.

As illustrated in FIG. 26, the viewer screen 700 includes the video display units 701a to 701f, a reproducing button 703a, a temporary stop button 703b, a fast-forward button 703c, a fast-backward button 703d, a stop button 703e, a seek bar 704, a slider 705, a time display unit 706, and a marker list button 707.

The video display units 701a to 701f are display units which respectively display the past video data of each of the imaging devices 2 stored in the video distributing unit 312, according to the manipulation signal from the input unit 303 manipulated by the user. In addition, here, the video display units 701a to 701f display video data of the same date and time. In addition, the video display units 701a to 701f can be in the selective state upon being pressed according to the manipulation of the input unit 303 by the user (for example, a click manipulation or the like of the mouse 108, the same applies hereinafter). Furthermore, in a case where the video display units 701a to 701f are referred without being distinguished or collectively referred, the video display units 701a to 701f will be simply referred to as a "video display unit 701".

When the reproducing button 703a is pressed according to the manipulation of the input unit 303 by the user, the video data displayed on the video display unit 701 is started to be reproduced by the second reproducing unit 318. When the temporary stop button 703b is pressed according to the manipulation of the input unit 303 by the user, the video data which is reproduced and displayed on the video display unit 701 is temporarily stopped by the second reproducing unit 318. When the fast-forward button 703c is pressed according to the manipulation of the input unit 303 by the user, the video data which is reproduced and displayed on the video display unit 701 is subjected to fast-forward display by the second reproducing unit 318. When the fast-backward button 703d is pressed according to the manipulation of the input unit 303 by the user, the video data which is reproduced and displayed on the video display unit 701 is subjected to the fast-backward display by the second reproducing unit 318. When the stop button 703e is pressed according to the manipulation of the input unit 303 by the user, the video data which is reproduced and displayed on the video display unit 701 is stopped by the second reproducing unit 318.

The seek bar 704 is a rod-like body which represents the time of the video data reproduced and displayed on the video display unit 701 according to the position of the slider 705 which is disposed on the seek bar. The slider 705 is a body and a manipulating unit which slide to the position on the seek bar 704 corresponding to imaging time of the video data reproduced and displayed on the video display unit 701 (time when the displayed frame is imaged). In contrast, in a case where the slider 705 slides according to the manipulation of the input unit 303 by the user, the frame of the video data of the imaging time corresponding to the position on the seek bar 704 where the slider 705 exists is displayed on the video display unit 701 by the second reproducing unit 318.

The time display unit 706 is a display unit which displays the imaging date and the imaging time of the video data reproduced and displayed video display unit 701 by the second reproducing unit 318.

When the marker list button 707 is pressed according to the manipulation of the input unit 303 by the user, the marker file stored in the storing unit 302 is read out by the list control unit 320, and the marker list screen 800 described below in FIG. 27 displays the contents of the marker file.

In a case where the past video data stored in the storing unit 302 is displayed on the video display unit 701 of the viewer screen 700 by the second reproducing unit 318, the region display control unit 319 reads out the information at the time when the image determination operation (the monitoring operation) is started and ended, the information at the time when the each of the determination regions is designated, and the information at the time when the detection is performed in the determination region, which are stored in the storing unit 302. As illustrated in FIG. 25, the region display control unit 319 displays the frames representing each of the determination regions by superimposing the frames on the past video data which is reproduced and displayed on the video display unit 701, on the basis of such time information. For example, in a case where the time when each of the determination regions is designated is faster than time when the image determination operation is started from the time information, the region display control unit 319 displays the frame representing each of the designated determination regions from the start time of the image determination operation. In addition, the region display control unit 319 deletes the frame representing each of the displayed determination regions at a time point where the time of the video data reproduced and displayed on the video display unit 701 is end time of the image determination operation of the time information.

In addition, as illustrated in FIG. 26, the region display control unit 319 displays the frame representing the determination region with a color different from the color in the normal state and displays the frame to be bolder than the frame in the normal state, at a time point where the time of the video data reproduced and displayed on the video display unit 701 is the trigger detection time or normality detection time of a specific determination region of the time information. Specifically, as with the frames representing each of the determination regions to be displayed on the watcher screen 400, the region display control unit 319, for example, displays the frame with "Blue" and displays the frame to be bold.

In addition, as illustrated in FIG. 26, the region display control unit 319 displays the frame representing the determination region with a color different from the color in the normal state and displays the frame to be bolder than the frame in the normal state, at a time point where the time of the video data reproduced and displayed on the video display unit 701 is abnormality detection time of a specific determination region of the time information. Specifically, as with the frames representing each of determination regions to be displayed on the watcher screen 400, the region display control unit 319, for example, displays the frame with "Red" and displays the frame to be bold.

In an example of the viewer screen 700 illustrated in FIG. 26, the display of the frame represents that an abnormality is detected in one full-time detection region of the video display unit 701*a*. In addition, in the video display unit 701*f*, the display of the frame displays that a normality is detected and an abnormality is detected in the detection regions corresponds to the detection regions 536 and 537.

As described above, according to the region display control unit 319, the display states of the frames of each of the determination regions are controlled on the basis of each of the time information items stored in the storing unit 302, and thus, the state of the image determination operation (the monitoring operation) on the watcher screen 400 can be reproduced by the past video data. Accordingly, the user is capable of confirming which image determination operation is performed with respect to the past video but not the real-time video.

Furthermore, the video display units 701*a* to 701*f* display the video data of the same date and time, but the video data is not limited thereto, and for example, the seek bar, the manipulation button, and the like may be provided in each of the video display units 701, and video data items of different dates and times may be displayed on the video display unit 701.

In addition, as with the image determination operation on the watcher screen 400, even when the image determination operation is reproduced on the viewer screen 700, the abnormality detection sound and the determination end sound may be respectively output at a timing where an abnormality is detected in the determination region and a timing where all of the determinations in the detection regions corresponding to a specific trigger region are ended on the basis of the flash detecting function, on the basis of the time information.

Figure 27:
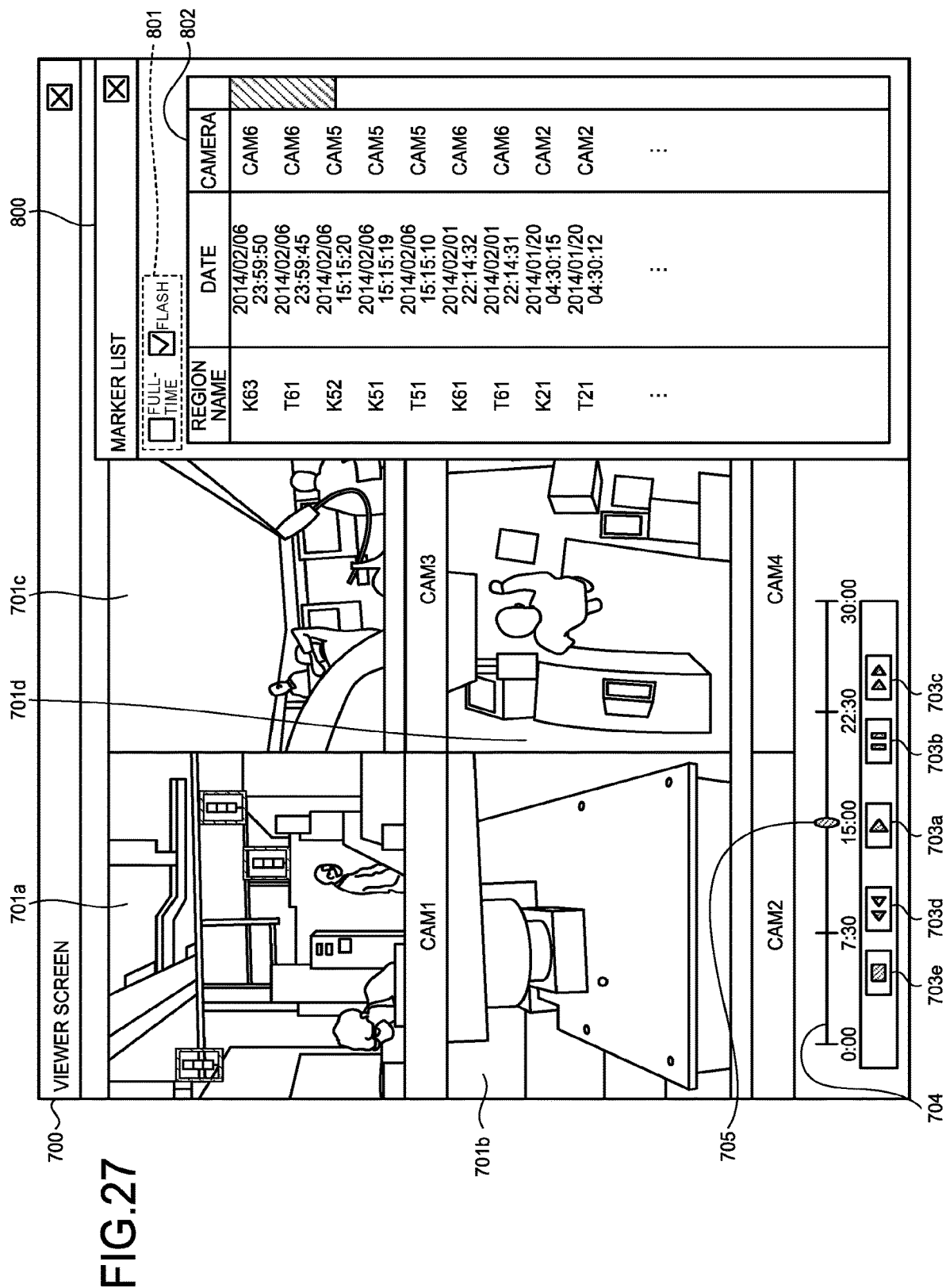
FIG. 27 is a diagram illustrating an example of a state in which a marker list screen is displayed on the viewer screen to be displayed in the display region of the information processing device according to the embodiment.

FIG. 27 is a diagram illustrating an example of a state in which the marker list screen is displayed on the viewer screen to be displayed in the display region of the information processing device according to the embodiment. As illustrated in FIG. 27, in a case where the marker list button 707 is pressed according to the manipulation of the input unit 303 by the user, the list control unit 320 reads out the marker file stored in the storing unit 302, and displays the marker list screen 800 representing the contents of the marker file. As illustrated in FIG. 27, the marker list screen 800 includes a detection selecting unit 801 and a detection history display unit 802.

The detection selecting unit 801 selecting manipulating unit for selecting any display of the list of the date and time where an abnormality is detected in the image determination of the full-time detection region on the basis of the full-time detecting function, or the list of the date and time where the trigger is detected in the trigger detection region and an abnormality is detected in the detection region, on the basis of the flash detecting function.

The detection history display unit 802 is a display unit of the list of the date and time of the detection based on the full-time detecting function which is selected by the detection selecting unit 801 or the list of the date and time of the detection based on the flash detecting function. The detection history display unit 802 illustrated in FIG. 27 represents that the flash detecting function is selected by the detection selecting unit 801, and displays the list of the date and time of the detection based on the flash detecting function. Specifically, the detection history display unit 802 displays region names of the trigger region and the detection region based on the flash detecting function, the detected date and time, and a name of identifying the corresponding imaging device 2.

In a case where a record representing any one determination region of the detection history display unit 802 is pressed according to the manipulation of the input unit 303 by the user, the list control unit 320 allows the second reproducing unit 318 to display the video data of the date and time represented by the record on the video display unit 701.

Thus, the marker list screen 800 illustrated in FIG. 27 is displayed, and thus, the date and time of the detection in each of the determination regions is displayed in a list, and it is possible to easily specify a timing where a problem occurs, a tendency or a cause of the occurrence of an abnormality, or the like.

(Overall Flow of Image Determination Operation on Watcher Screen)

Figure 28:
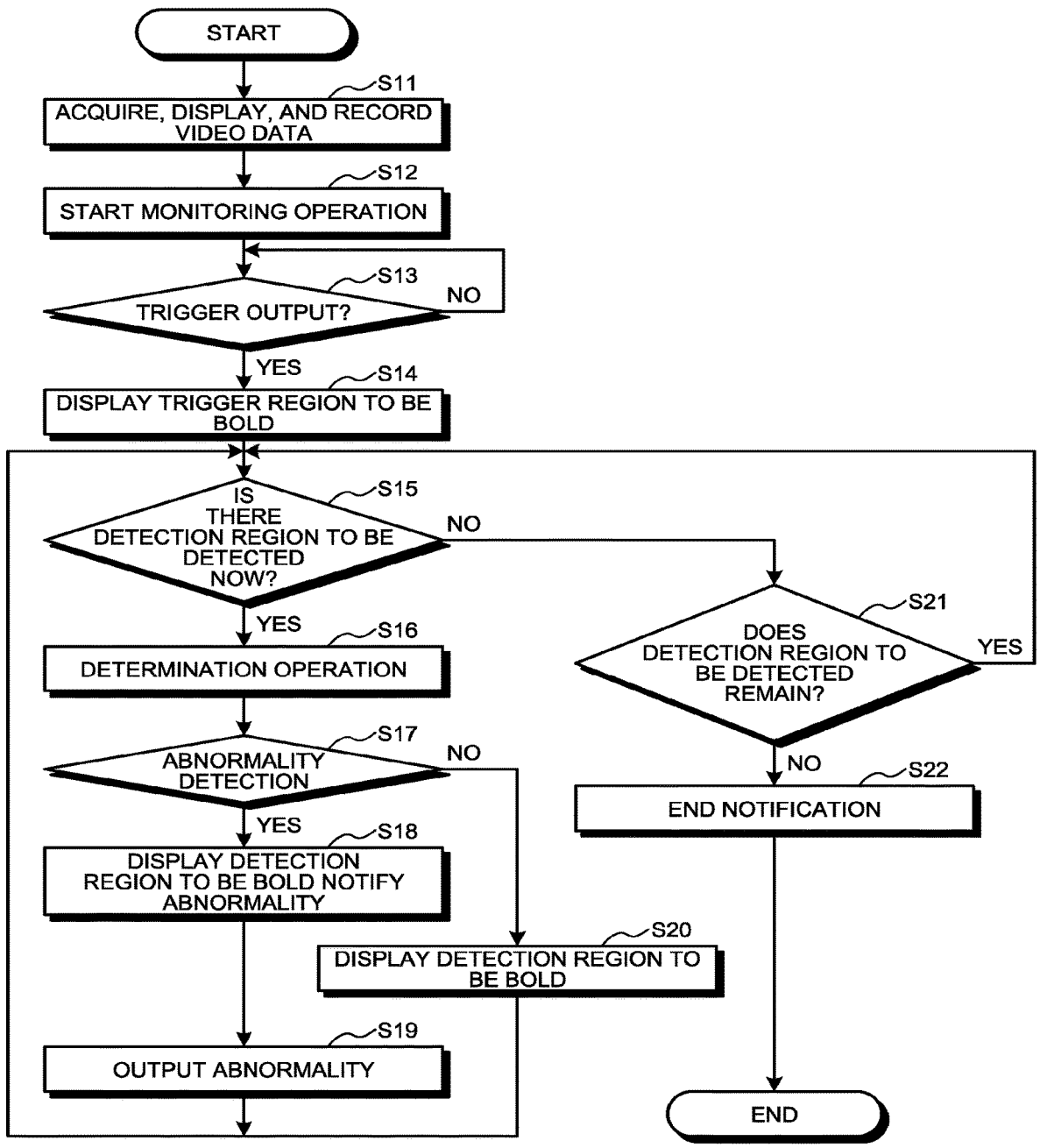
FIG. 28 is a flowchart illustrating an example of the monitoring operation on the watcher screen to be displayed on the display device of the information processing device according to the embodiment.

FIG. 28 is a flowchart illustrating an example of the monitoring operation on the watcher screen to be displayed on the display device of the information processing device according to the embodiment. The flow of the image determination operation (the monitoring operation) on the watcher screen 400 will be comprehensively described with reference to FIG. 28. Furthermore, in FIG. 28, the image determination operation based on the flash detecting function will be described as an example.

<Step S11>

The video distributing unit 312 sorts and displays the real-time video data acquired from the video receiving unit 301 on the video display units 401a to 401f of the watcher screen 400 to be displayed on the display unit 333, according to the manipulation signal from the input unit 303 manipulated by the user. In addition, the video distributing unit 312 stores (records) each of the video data items to be displayed on the video display unit 401 in the storing unit 302. Then, the process proceeds to Step S12.

<Step S12>

The user presses video display unit 401 corresponding to the imaging device 2 in which the image determination operation (the monitoring operation) is planned to be started, and sets the video display unit to be in the selective state, according to the manipulation of the input unit 303. Then, in a case where the monitoring start button 411 is pressed according to the manipulation of the input unit 303 by the user, the first control unit 316 starts the image determination operation with respect to the real-time video data of the imaging device 2 to be displayed on the video display unit 401 in the selective state. In a case where the image determination operation is started with respect to the video display unit 401, the first control unit 316 displays the frames representing each of the determination regions designated by the setting screen 500 by superimposing the frame on the video data of the video display unit 401. At this time, the first control unit 316 displays the frames representing each of the determination regions in the normal state (a state in which the detection is not performed in each of the determination regions) with different colors. For example, the first control unit 316 displays the frame representing the trigger region with "White", the frame representing the detection region with "Yellow", and the frame representing the full-time detection region with "Green". In addition, the first control unit 316 stores the information (the time information) at the time when the image determination operation (the monitoring operation) is started in the storing unit 302, in association with the imaging device 2 corresponding to the video display unit 401 in the selective state (hereinafter, simply referred to as a "video display unit 401"). Then, the process proceeds to Step S13.

<Step S13>

The trigger generating unit 313 acquires the difference image of the frame at the change point which is detected by the change point detecting unit 306 from the storing unit 302. Then, the trigger generating unit 313 compares the difference image with the image in the trigger region of the frame of the video data, in the trigger region which is designated by the video display unit 401. The trigger generating unit 313 compares the image in the trigger region of the frame of the video data with the difference image of the frame at the change point, and in a case where the difference, which is the total number of pixels of which the pixel value is different by greater than or equal to predetermined sensitivity is less than the predetermined threshold value, generates (outputs) the trigger signal (the trigger is detected) (Step S13: Yes). Then, the trigger generating unit 313 stores the information (the time information) at the time when the trigger signal is generated by the image determination operation in the storing unit 302, in association with the imaging device 2 where the image determination operation is executed. Then, the process proceeds to Step S14.

In addition, in a case where the difference is not less than the predetermined threshold value (Step S13: No), the trigger generating unit 313 continues the determination with respect to the difference.

<Step S14>

In a case where the trigger generating unit 313 detects the trigger, the first control unit 316 displays the frame representing the trigger region with a color different from the color in the normal state and displays the frame to be bolder than the frame in the normal state. For example, the first control unit 316 displays the frame representing the trigger region with "Blue" and displays the frame to be bold, and continues the display state for 1 second. Then, the first control unit 316 returns the display of the frame representing the trigger region to the display of the frame in the normal state after 1 second. Then, the process proceeds to Step S15.

<Step S15>

In a case where the trigger signal is received from the trigger generating unit 313, and then, there is a detection region which is after the detection delay time set with respect to the detection region (Step S15: Yes), the process proceeds to Step S16, and in the contrary case (Step S15: No), the process proceeds to Step S21.

<Step S16>

The detection region determination unit 314 receives the trigger signal from the trigger generating unit 313, and then, compares the detection standard image with the image in the detection region of the frame of the video data, and performs the image determination of whether or not there is an abnormality, in the designated detection region, after the detection delay time set with respect to the detection region. Specifically, the detection region determination unit 314 compares the image in the detection region of the frame of the video data after the detection delay time corresponding to the detection region with the detection standard image, and performs the image determination of whether or not there is an abnormality, from a time point where the trigger signal corresponding to the trigger region is received by the trigger generating unit 313. At this time, in the image determination, the detection region determination unit 314 compares the detection standard image with the image in the detection region, and in a case where the difference, which is the total number of pixels of which the pixel value is different by greater than or equal to predetermined sensitivity of the attribute information of the detection region is greater than or equal to the threshold value of the attribute information, determines that there is an abnormality by the image determination of the detection region. Then, the detection region determination unit 314 stores the information (the time information) at the detection time a normality is detected or an abnormality is detected by the image determination operation in the storing unit 302, in association with the imaging device 2 where the image determination operation is executed. Then, the process proceeds to Step S17.

<Step S17>

As a result of the image determination of the detection region determination unit 314, in a case where an abnormality is detected (Step S17: Yes), the process proceeds to Step S18, and in a case where a normality is detected (Step S17: No), the process proceeds to Step S20.

<Step S18>

In a case where an abnormality is detected by the image determination, the detection region determination unit 314 stores the information (the time information) at the abnormality detection time in the storing unit 302, in association with the imaging device 2 where the image determination operation is executed. In addition, in a case where an abnormality is detected in the detection region, the first control unit 316 displays the frame representing the detection region with a color different from the color in the normal state and displays the frame to be bolder than the frame in the normal state. For example, in order to represent that an abnormality is detected, the first control unit 316 displays the frame representing the detection region with "Red" and displays the frame to be bold, and continues the display state for 1 second. At this time, the notifying control unit 317 outputs the abnormality detection sound notifying that the abnormality is detected to the notifying unit 334 for a predetermined time (for example, 1 second), at a timing where an abnormality is detected in the detection region by the detection region determination unit 314. Then, the first control unit 316 returns the display of the frame representing the detection region to the display of the frame in the normal state after 1 second. Then, the process proceeds to Step S19.

<Step S19>

In a case where the determination of an abnormality is performed by the detection region determination unit 314, the external output unit 332 outputs the abnormality signal to the external device 10. Then, the process is returned to Step S15.

<Step S20>

In a case where a normality is detected by the image determination operation, the detection region determination unit 314 stores the information (the time information) at the normality detection time in the storing unit 302, in association with the imaging device 2 where the image determination operation is executed. In addition, in a case where a normality is detected in the detection region, the first control unit 316 displays the frame representing the detection region with a color different from the color in the normal state and displays the frame to be bolder than the frame in the normal state. For example, in order to represent that a normality is detected, the first control unit 316 displays the frame representing the detection region with "Blue" and displays the frame to be bold, and continues the display state for 1 second. Then, the first control unit 316 returns the display of the frame representing the detection region to the display of the frame in the normal state after 1 second. Then, the process is returned to Step S15.

<Step S21>

In a case where the detection region according to the trigger of the trigger generating unit 313 remains (Step S21: Yes), the process is returned to Step S15, and in the contrary case (Step S21: No), the process proceeds to Step S22.

<Step S22>

The notifying control unit 317 outputs the determination end sound representing that the image determination of the detection region is ended to the notifying unit 334 for a predetermined time (for example, 0.2 seconds), at a timing where all of the image determinations of the detection regions according to the trigger of the trigger generating unit 313 are ended by the detection region determination unit 314.

As described above, the image determination operation based on the flash detecting function is executed by repeating Steps S13 to S22 described above.

Overall Flow of Image Determination Operation on Viewer Screen

Figure 29:
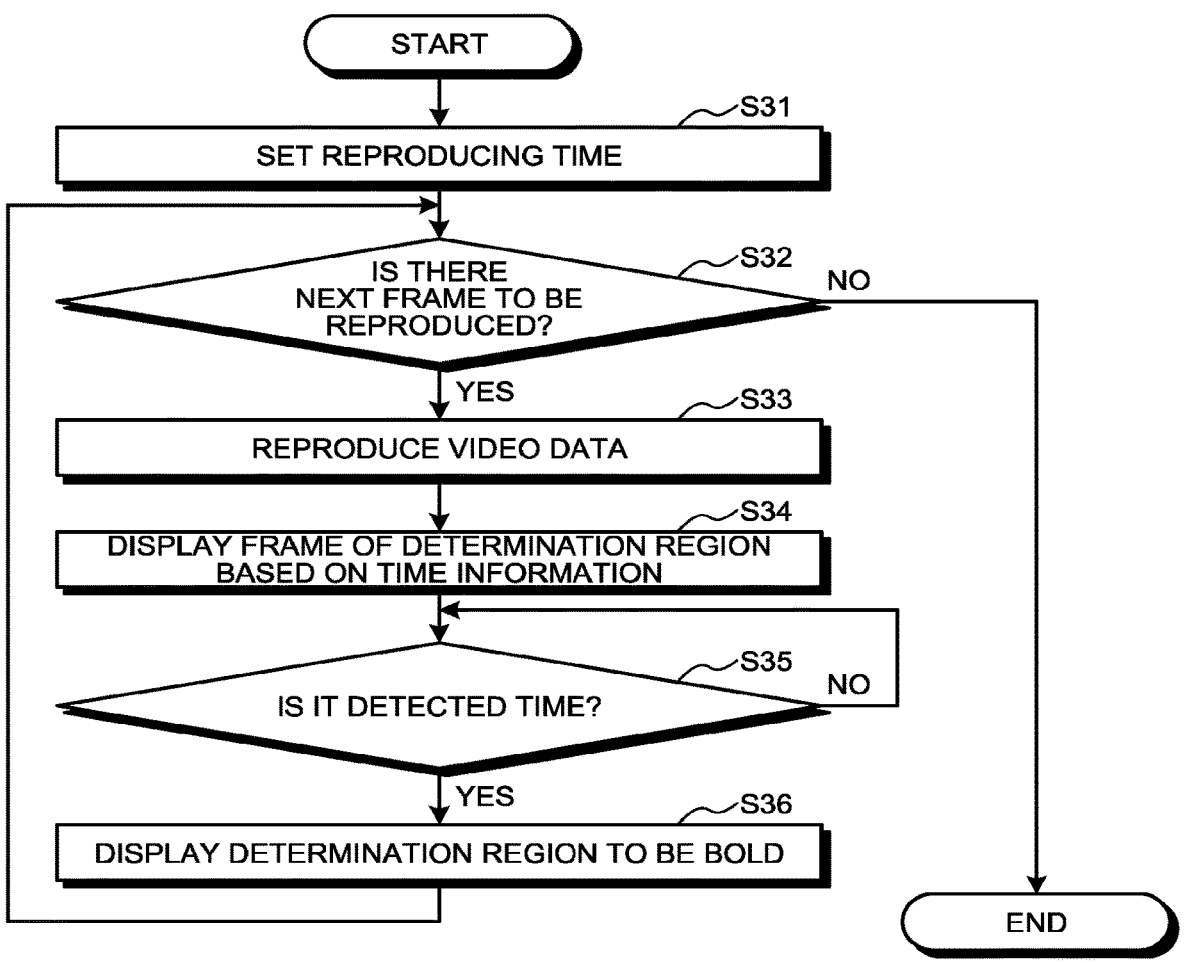
FIG. 29 is a flowchart illustrating an example of an operation in which the state of the image determination is reproduced with respect to the video which is reproduced and displayed on the viewer screen to be displayed on the display device of the information processing device according to the embodiment.

FIG. 29 is a flowchart illustrating an example of an operation in which the state of the image determination is reproduced with respect to the video to be reproduced and displayed on the viewer screen to be displayed on the display device of the information processing device according to the embodiment. The flow of the operation of reproducing the state of the image determination on the viewer screen 700 will be comprehensively described with reference to FIG. 29.

<Step S31>

The user sets desirable reproducing time (time) according to the manipulation of the input unit 303. Then, the process proceeds to Step S32.

<Step S32>

The second reproducing unit 318 acquires the set past video data from the reproducing time (the time) from the storing unit 302, according to the manipulation signal from the input unit 303 manipulated by the user. In this case, in a case where the video data is acquired (that is, where there is the next frame of the video data to be reproduced) (Step S32: Yes), the process proceeds to Step S33, and in a case where it is not possible to acquire the past video data (that is, in a case where there is no next frame of the video data to be reproduced) (Step S32: No), the operation of reproducing the state of the image determination is ended.

<Step S33>

The second reproducing unit 318 sorts, and reproduces and displays the corresponding video data on the video display units 701*a* to 701*f* of the viewer screen 700 displaying the past video data acquired from the storing unit 302 on the display unit 333. At this time, the second reproducing unit 318 reproduces and displays the video data from the frame at desirable reproducing time (time) of the user, according to the manipulation signal from the input unit 303 manipulated by the user. Then, the process proceeds to Step S34.

<Step S34>

In a case where the past video data stored in the storing unit 302 is displayed on the video display unit 701 by the second reproducing unit 318, the region display control unit 319 reads out the information at the time when the image determination operation (the monitoring operation) is started and ended, the information at the time when each of the determination regions is designated, and the information at the time when the detection is performed in each of the determination regions, which are stored in the storing unit 302. The region display control unit 319 displays the frames representing each of the determination regions by superimposing the frames on the past video data reproduced and displayed on the video display unit 701, on the basis of such time information. For example, in a case where the time when each of the determination regions is designated is faster than time when the image determination operation is started from the time information, the region display control unit 319 displays the designated frames representing each of the determination regions from the start time of the image determination operation. Then, the process proceeds to Step S35.

<Step S35>

In a case where the time of the video data reproduced and displayed on the video display unit 701 is the detection time of a specific determination region of the time information (Step S35: Yes), the process proceeds to Step S36, and in a case where the time is not the detection time (Step S35: No), the confirmation of whether or not the time is the detection time is continuously performed.

<Step S36>

The region display control unit 319 displays the frame representing the determination region with a color different from the color in the normal state and displays the frame to be bolder than the frame in the normal state at a time point where the time of the video data reproduced and displayed on the video display unit 701 is the detection time of a specific determination region of the time information. Then, the process is returned to Step S32.

As described above, the operation of reproducing the state of the image determination is executed by repeating Steps S32 to S36 described above.

As described above, frames representing a plurality of types of determination regions (in the embodiment described above, any one of the trigger region, the detection region, and the full-time detection region) are displayed in the display region of the display unit 333 (the video display unit 401 and the video display unit 701) by being superimposed on the video data. Accordingly, the user is capable of grasping the timing where the detection is performed in each of the determination regions (the detection of the trigger, the detection of the normality, the detection of the abnormality, and the like) and the contents of the detection, and thus, it is possible to simultaneously grasp the states of a plurality of types of determination operations.

In addition, in the plurality of types of determination regions displayed in the display region of the display unit 333, at least any one determination region is displayed with a different color. Accordingly, it is possible to visually grasp that the determination region is based on which determination function (the flash detecting function and the full-time detecting function).

In addition, the frames representing the plurality of types of determination regions displayed in the display region of the display unit 333 are displayed in an aspect different from the display aspect in the normal state, at the detected timing. Accordingly, it is possible to visually grasp that which detection is performed in the determination region.

In addition, it is possible to represent the state of the operation in each of the determination region of the image determination operation as described above with respect to the real-time video data displayed on the video display unit 401 of the display unit 333. Accordingly, it is possible for the user to grasp the state of the operation in each of the determination regions in real time.

In addition, each of the time information items such as the information at the time when the image determination operation (the monitoring operation) is started and ended, the information at the time when each of the determination regions is designated, and the information at the time when the detection is performed in each of the determination regions is stored by the image determination operation of the real-time video data. Accordingly, it is possible to reproduce the state of the image determination operation with respect to the recorded past video data, on the basis of the time information. Accordingly, the user confirms the reproduced image determination operation, and thus, is capable of easily specifying a timing where a problem occurs, a tendency or a cause of the occurrence of an abnormality, or the like.

In addition, the marker file based on the time information described above is displayed, and the detection times in each of the determination regions are chronologically displayed. Accordingly, it is possible to chronologically confirm the date and time of the detection in each of the determination regions, and to easily specify a timing where a problem occurs, a tendency or a cause of the occurrence of an abnormality, or the like.

In addition, the state of the image determination with respect to the real-time video data or the past video data of each of the plurality of imaging devices 2 is displayed in the plurality of display regions. Accordingly, it is possible to simultaneously confirm the state of the image determination with respect to the video data which is imaged by each of the imaging devices 2.

In addition, the abnormality detection sound and the determination end sound are respectively output at a timing where an abnormality is detected in the determination region and at a timing where all of the determinations in the detection regions corresponding to the specific trigger region based on the flash detecting function are ended. Accordingly, it is possible to auditorily recognize a timing where an abnormality occurs and a timing where the detection is ended.

Furthermore, in this embodiment, the trigger region and the detection region based on the flash detecting function, and the full-time detection region based on the full-time detecting function have been described as an example of the determination region, but the determination region is not limited thereto. For example, the image determination operation may be executed according to a determination region based on a function of detecting whether or not a set of operations are performed in the order in a production process, or a determination region based on an optical character recognition (OCR) function for detecting a character described in a product, a bar code, or the like.

In addition, as described above, the display is performed by dividing the screen such that the real-time video data is displayed on the watcher screen 400 and the past video data is displayed on the viewer screen 700, but is not limited thereto. That is, the functions of the watcher screen 400 and the viewer screen 700 may be realized on the common screen.

In addition, in each of the display regions (the video display units 401 and 701), the frames are used as display elements representing each of the determination regions, but the display element is not limited thereto, and any display element may be displayed insofar as the display element is capable of representing each of the determination regions.

In addition, the trigger signal generated by the trigger generating unit 313 is used as a standard of a timing for the image determination of the detection region determination unit 314 in the embodiment described above, but the standard is not limited thereto. For example, the trigger signal may be used as a standard of a timing where predetermined processing is performed on a production facility side, and in this case, the trigger signal may be transmitted to the production facility at a time point where the trigger signal is generated.

Modification Example

Figure 30:
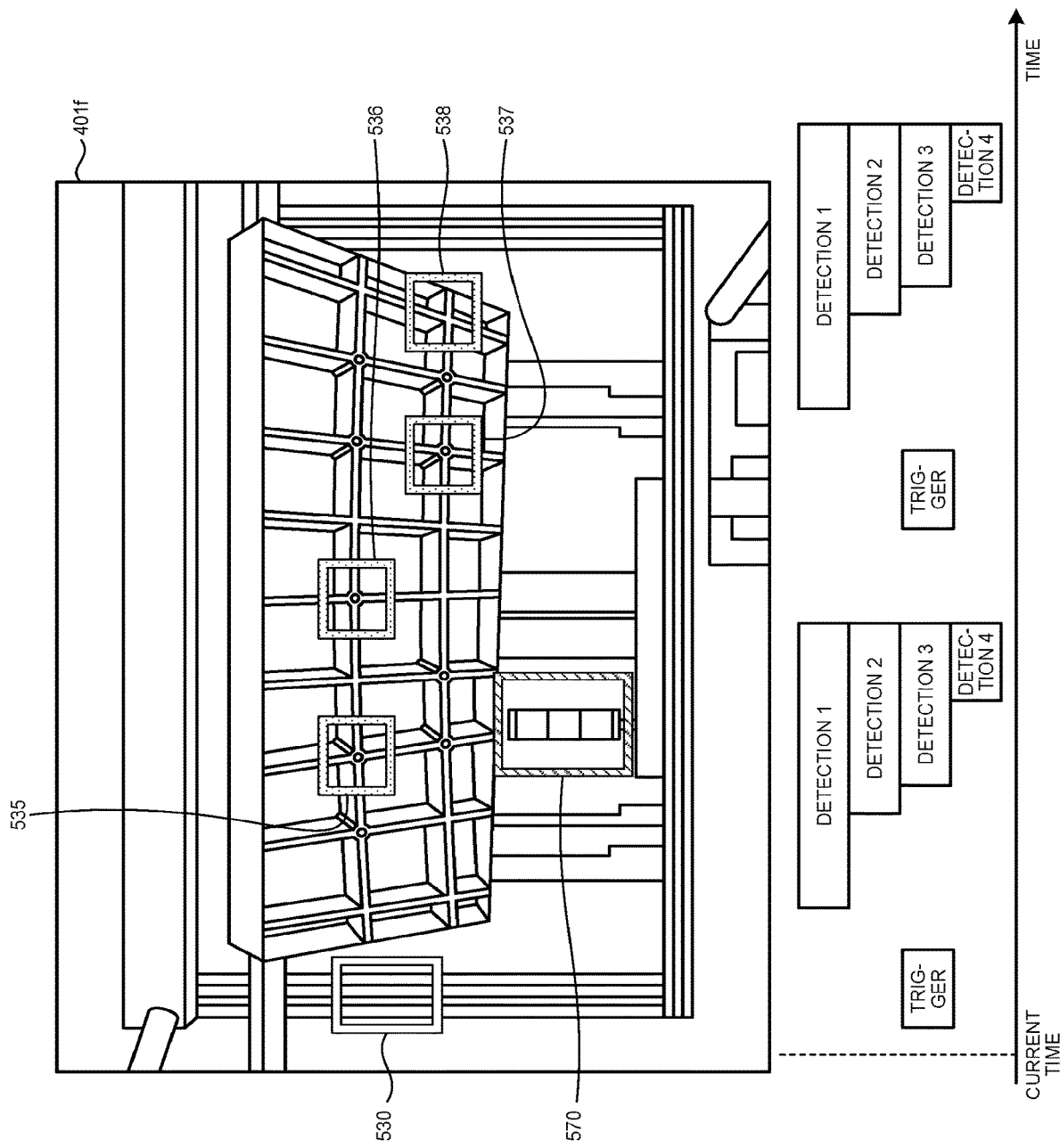
FIG. 30 is a diagram illustrating an example of a state before a trigger is generated by a monitoring operation which is executed on a watcher screen to be displayed in a display region of an information processing device according to a modification example of the embodiment.
Figure 31:
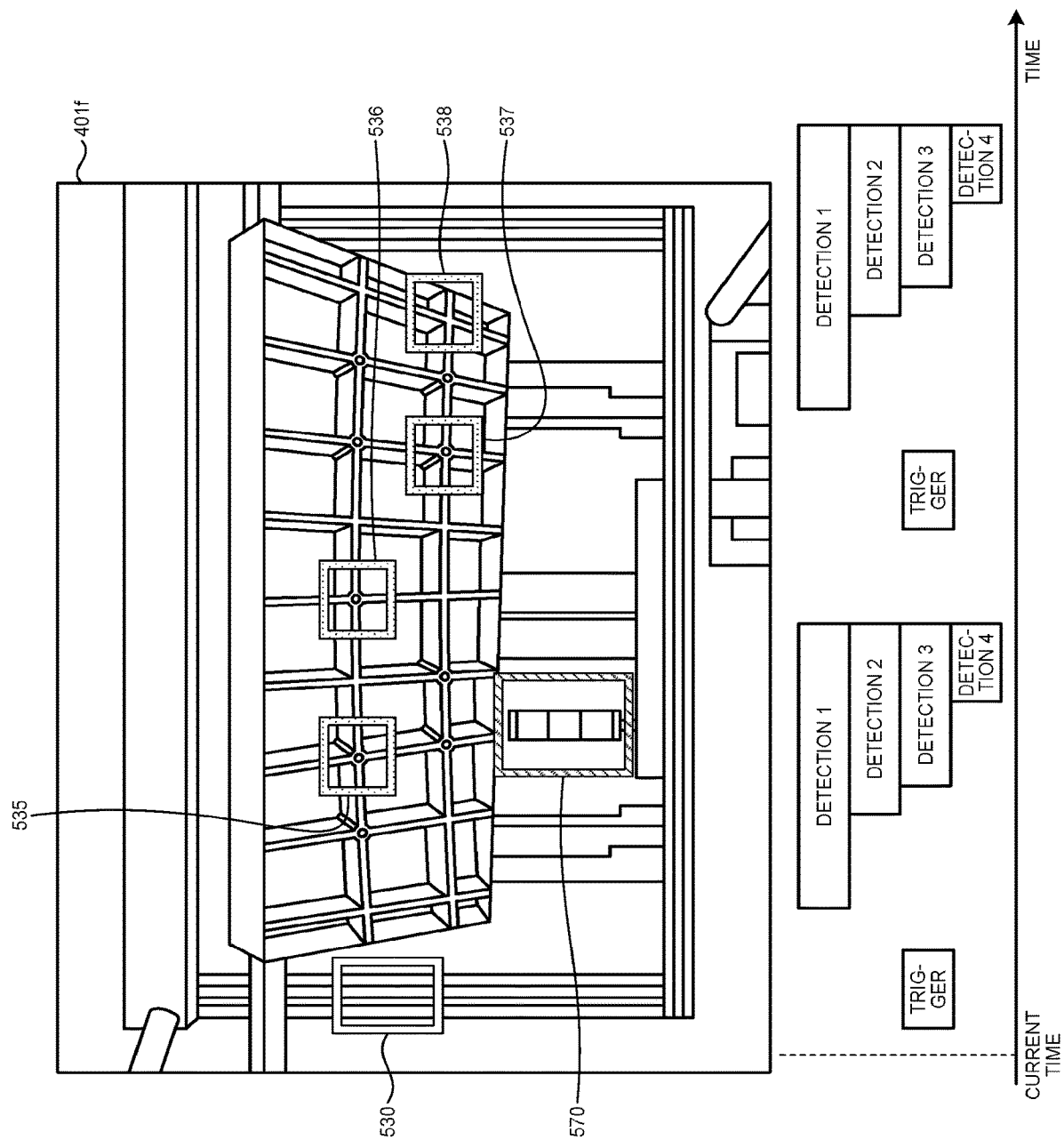
FIG. 31 is a diagram illustrating an example of a state in which the trigger is generated by the monitoring operation which is executed on the watcher screen to be displayed in the display region of the information processing device according to the modification example of the embodiment.

FIG. 30 is a diagram illustrating an example of a state before a trigger is generated by a monitoring operation which is executed on a watcher screen to be displayed in a display region of an information processing device according to a modification example of the embodiment. FIG. 31 is a diagram illustrating an example of a state in which the trigger is generated by the monitoring operation which is executed on the watcher screen to be displayed in the display region of the information processing device according to the modification example of the embodiment. FIGS. 32 to 37 are diagrams illustrating an example of a state in which image determination is performed in a detection region by the monitoring operation which is executed on the watcher screen to be displayed in the display region of the information processing device according to the modification example of the embodiment. An image determination operation (a monitoring operation) with respect to video data based on a flash detecting function in this modification example will be described in detail by using the video display unit 401f of the watcher screen 400 as an example, with reference to FIGS. 30 to 37. In this modification example, an operation will be described in which the frames representing all of the detection regions are continued in the display state representing the result of the image determination until all of the image determinations in all of the detection regions associated with the trigger region are ended, in a case where the trigger generating unit 313 detects a trigger with respect to one or more detection regions associated with a trigger region. In addition, it will be described that the detection delay time is set to each of "1.0" second, "2.2" seconds, "2.5" seconds, and "4.0" seconds in the attribute information items of the detection regions 535 to 538.

First, in a case where the image determination operation is started with respect to the video display unit 401f, the first control unit 316 displays the frames representing each of the determination regions, designated on the setting screen 500, by superimposing the frames on the video data of the video display unit 401f. Specifically, as illustrated in FIG. 30, the video display unit 401f displays the trigger region 530, the detection regions 535 to 538, and the full-time detection region 570. At this time, the first control unit 316 displays the frames representing each of the determination regions (an example of the display element) in the normal state (a state in which the detection is not performed in each of the determination regions) with different colors. For example, the first control unit 316 displays the frame representing the trigger region 530 with "White", the frame representing the detection regions 535 to 538 with "Yellow", and the frame representing the full-time detection region 570 with "Green".

Next, as illustrated in FIG. 31, in a case where the trigger generating unit 313 detects the trigger, the first control unit 316 displays the frame representing the trigger region 530 with a color different from the color in the normal state and displays the frame to be bolder than the frame in the normal state. For example, the first control unit 316 displays the frame representing the trigger region 530 with "Blue" and displays the frame to be bold, and continues the display state for 1 second. Then, the first control unit 316 returns the display of the frame representing the trigger region 530 to the display of the frame in the normal state after 1 second.

Figure 32:
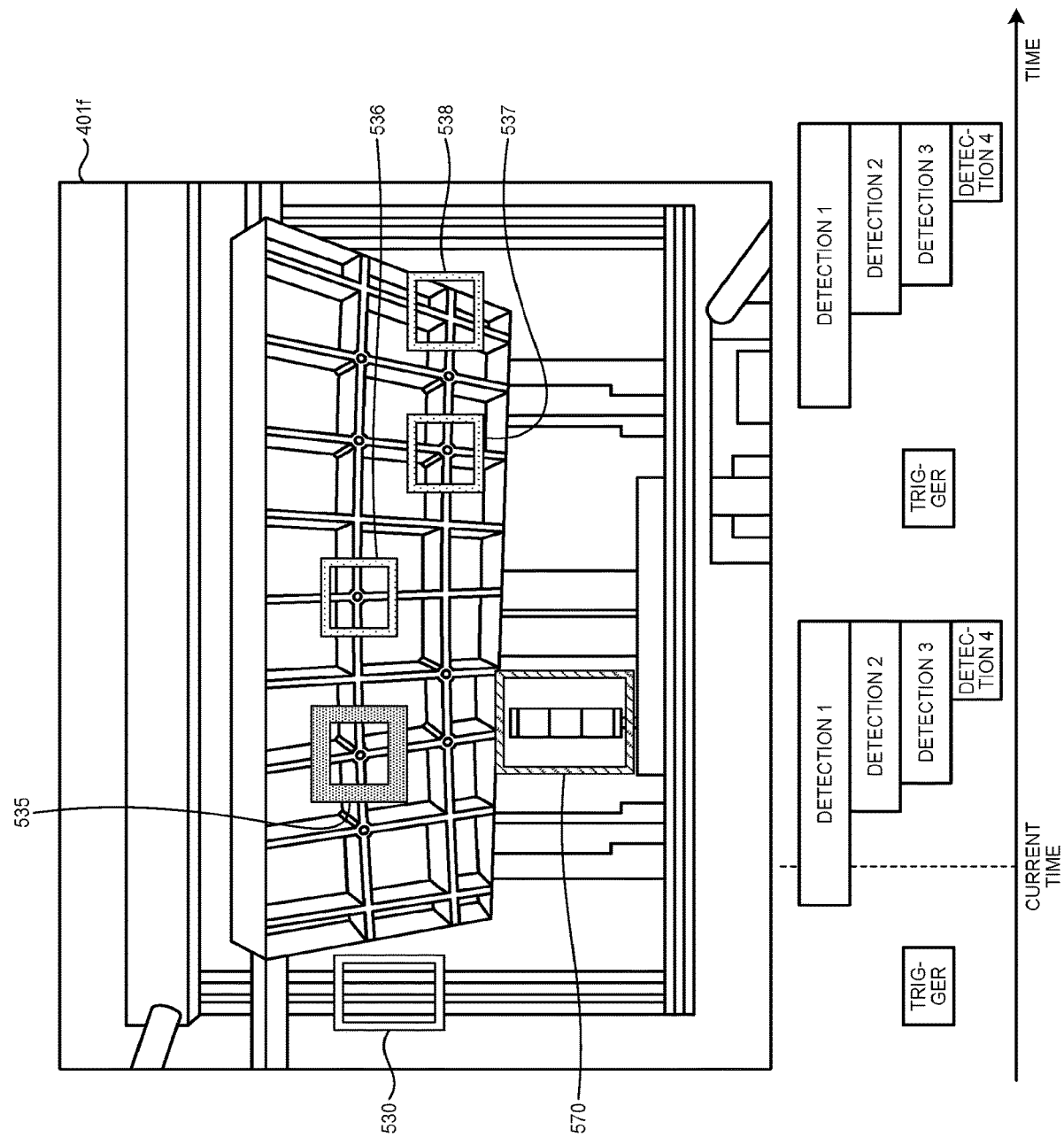
FIG. 32 is a diagram illustrating an example of a state in which image determination is performed in a detection region by the monitoring operation which is executed on the watcher screen to be displayed in the display region of the information processing device according to the modification example of the embodiment.

Next, the detection region determination unit 314 receives the trigger signal from the trigger generating unit 313, and then, performs the image determination in the detection region 535, after "1.0" second, which is the detection delay time set with respect to the detection region 535. As a result of the determination, in a case where a normality is detected, as illustrated in FIG. 32, the first control unit 316 displays the frame representing the detection region 535 with a color different from the color in the normal state and displays the frame to be bolder than the frame in the normal state. For example, in order to represent that a normality is detected, the first control unit 316 displays the frame representing the detection region 535 with "Blue" and displays the frame to be bold, and continues the display state.

Figure 33:
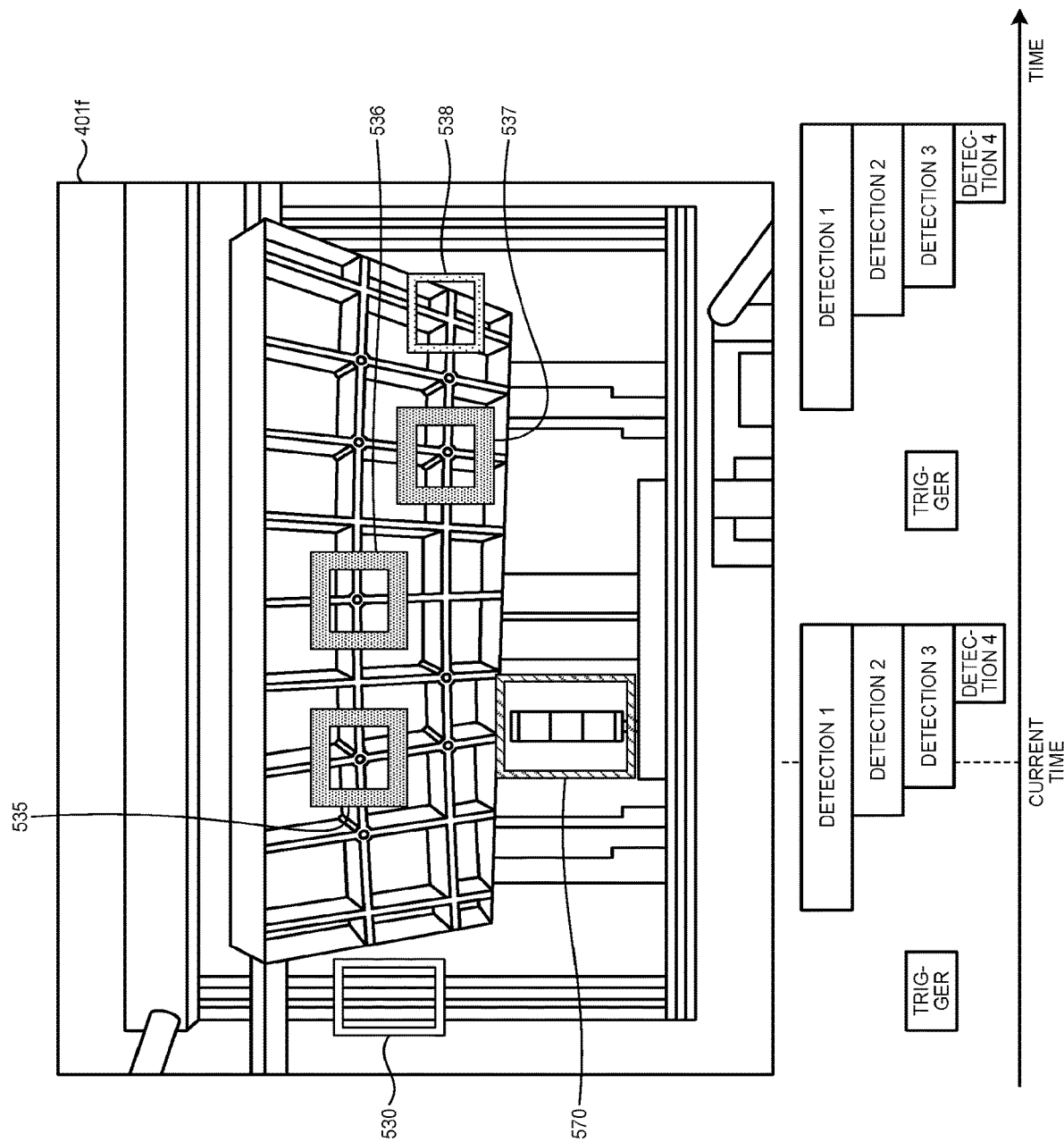
FIG. 33 is a diagram illustrating an example of a state in which the image determination is performed in the detection region by the monitoring operation which is executed on the watcher screen to be displayed in the display region of the information processing device according to the modification example of the embodiment.

Next, the detection region determination unit 314 receives the trigger signal from the trigger generating unit 313, and then, performs the image determination in the detection region 536 after "2.2" seconds, which is the detection delay time set with respect to the detection region 536. Further, the detection region determination unit 314 receives the trigger signal from the trigger generating unit 313, and performs the image determination in the detection region 537 after "2.5" seconds, which is the detection delay time set with respect to the detection region 537. As a result of the determination, in a case where normalities are respectively detected, as illustrated in FIG. 33, the first control unit 316 displays the frames representing each of the detection regions 536 and 537 with a color different from the color in the normal state and displays the frame to be bolder than the frame in the normal state. For example, in order to represent that a normality is detected, the first control unit 316 respectively displays the frames representing the detection regions 536 and 537 with "Blue" and displays the frame to be bold, and continues the display state. In such a time point, as illustrated in FIG. 33, both of the detection regions 535 to 537 are in the display state in which a normality is detected (a state in which the frame is displayed with "Blue" and is displayed to be bold).

Figure 34:
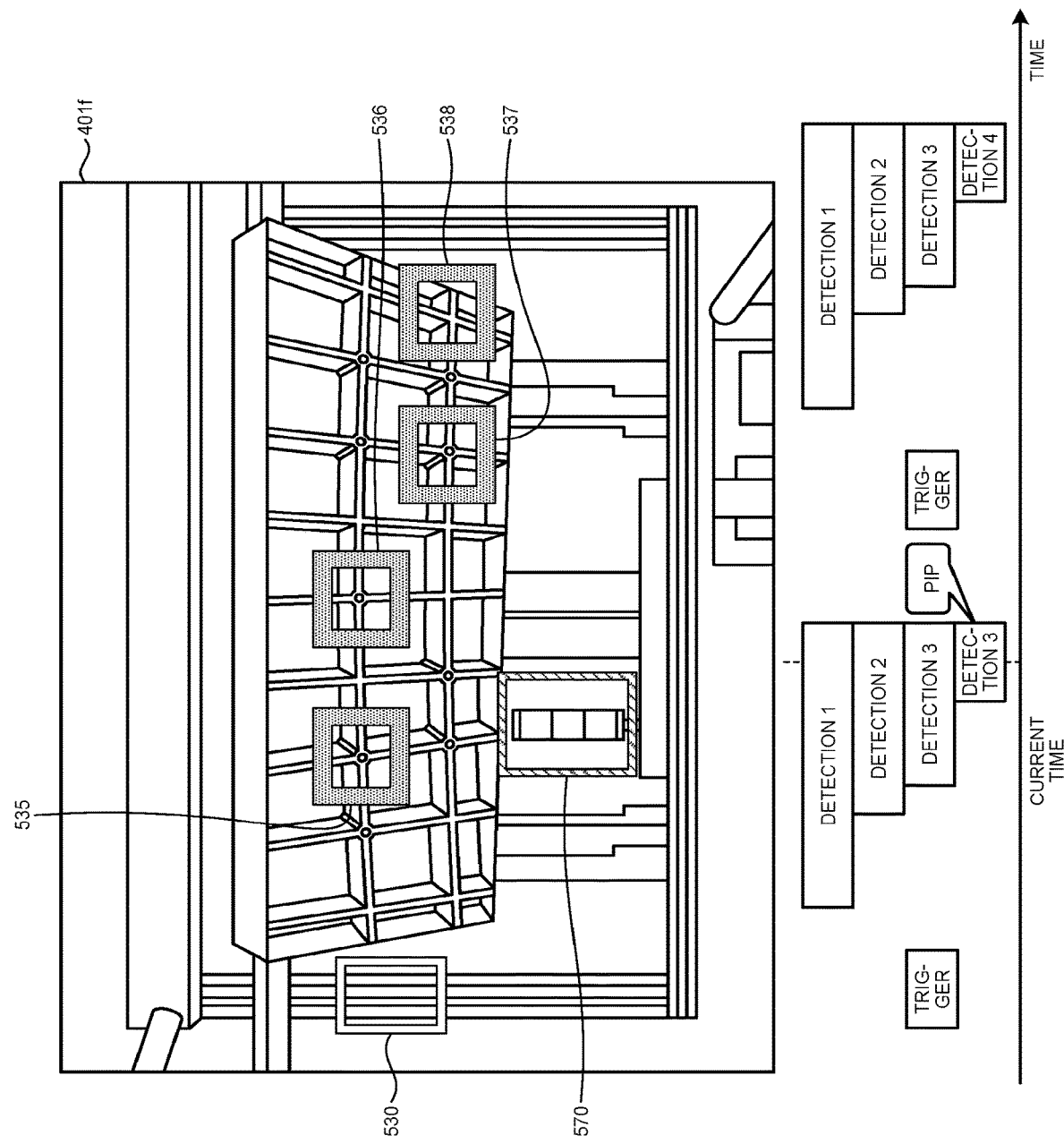
FIG. 34 is a diagram illustrating an example of a state in which the image determination is performed in the detection region by the monitoring operation which is executed on the watcher screen to be displayed in the display region of the information processing device according to the modification example of the embodiment.

Then, the detection region determination unit 314 receives the trigger signal from the trigger generating unit 313, and performs the image determination in the detection region 538 after "4.0" seconds, which is the detection delay time set with respect to the detection region 538. As a result of the determination, in a case where a normality is detected, as illustrated in FIG. 34, the first control unit 316 displays the frame representing the detection region 538 with a color different from the color in the normal state and displays the frame to be bolder than the frame in the normal state. For example, in order to represent that a normality is detected, the first control unit 316 displays the frame representing the detection region 538 with "Blue" and displays the frame to be bold. As such a time point, as illustrated in FIG. 34, all of the detection regions 535 to 538 are in the display state in which a normality is detected (a state in which the frame is displayed with "Blue" and is displayed to be bold).

Then, first control unit 316 continues the display state of the detection regions 535 to 538, in which a normality is detected, for a predetermined time (for example, for 1 second) after the image determination in the detection region 538 to be subjected to the image determination is ended at a final timing, in the detection regions 535 to 538 associated with the trigger region 530. Then, the first control unit 316 returns the display of each of the frames representing the detection regions 535 to 538 to the display of the frame in the normal state after a predetermined time.

In addition, the notifying control unit 317 outputs the determination end sound representing that the image determination of the detection region is ended (in FIG. 34, represented as "Pip") to the notifying unit 334 for a predetermined time (for example, 0.2 seconds), at a timing where all of the image determinations of the detection region according to the trigger of the trigger generating unit 313 are ended by the detection region determination unit 314 (that is, a timing where the image determination in the detection region 538 is ended). As described above, in FIGS. 32 to 34, a case will be described in which a normality is detected in all of the image determinations of the detection regions 535 to 538. Next, a case will be described in which an abnormality is detected in any one of the detection regions 535 to 538.

Figure 35:
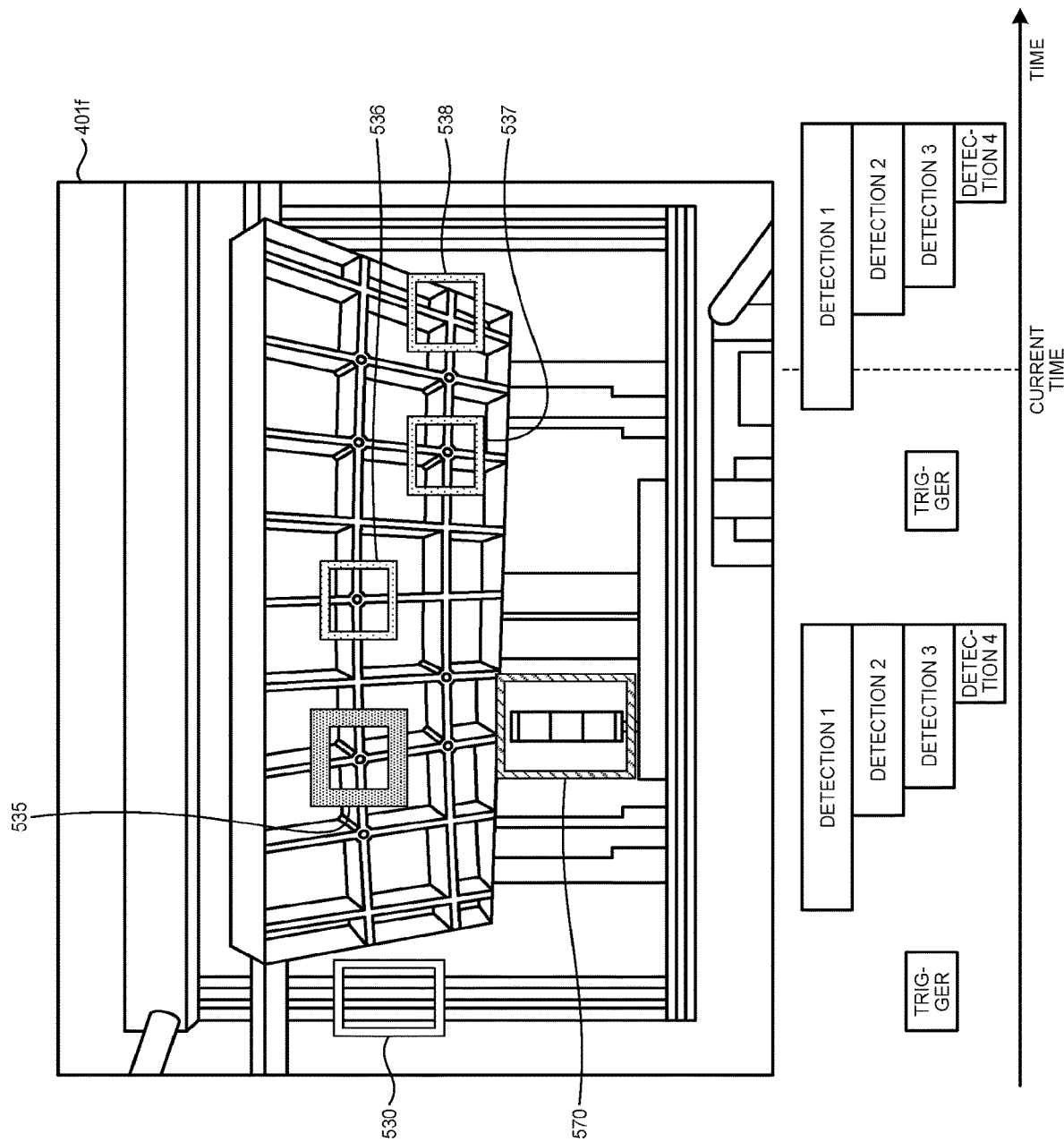
FIG. 35 is a diagram illustrating an example of a state in which the image determination is performed in the detection region by the monitoring operation which is executed on the watcher screen to be displayed in the display region of the information processing device according to the modification example of the embodiment.

As illustrated in FIG. 31, an operation after the trigger generating unit 313 detects the trigger, and then, the trigger is detected again will be described. The detection region determination unit 314 receives the trigger signal from the trigger generating unit 313, and performs the image determination in the detection region 535 after "1.0" second, which is the detection delay time set with respect to the detection region 535. As a result of the determination, in a case where a normality is detected, as illustrated in FIG. 35, the first control unit 316 displays the frame representing the detection region 535 with a color different from the color in the normal state and displays the frame to be bolder than the frame in the normal state. For example, in order to represent that a normality is detected, the first control unit 316 displays the frame representing the detection region 535 with "Blue" and displays the frame to be bold, and continues the display state.

Figure 36:
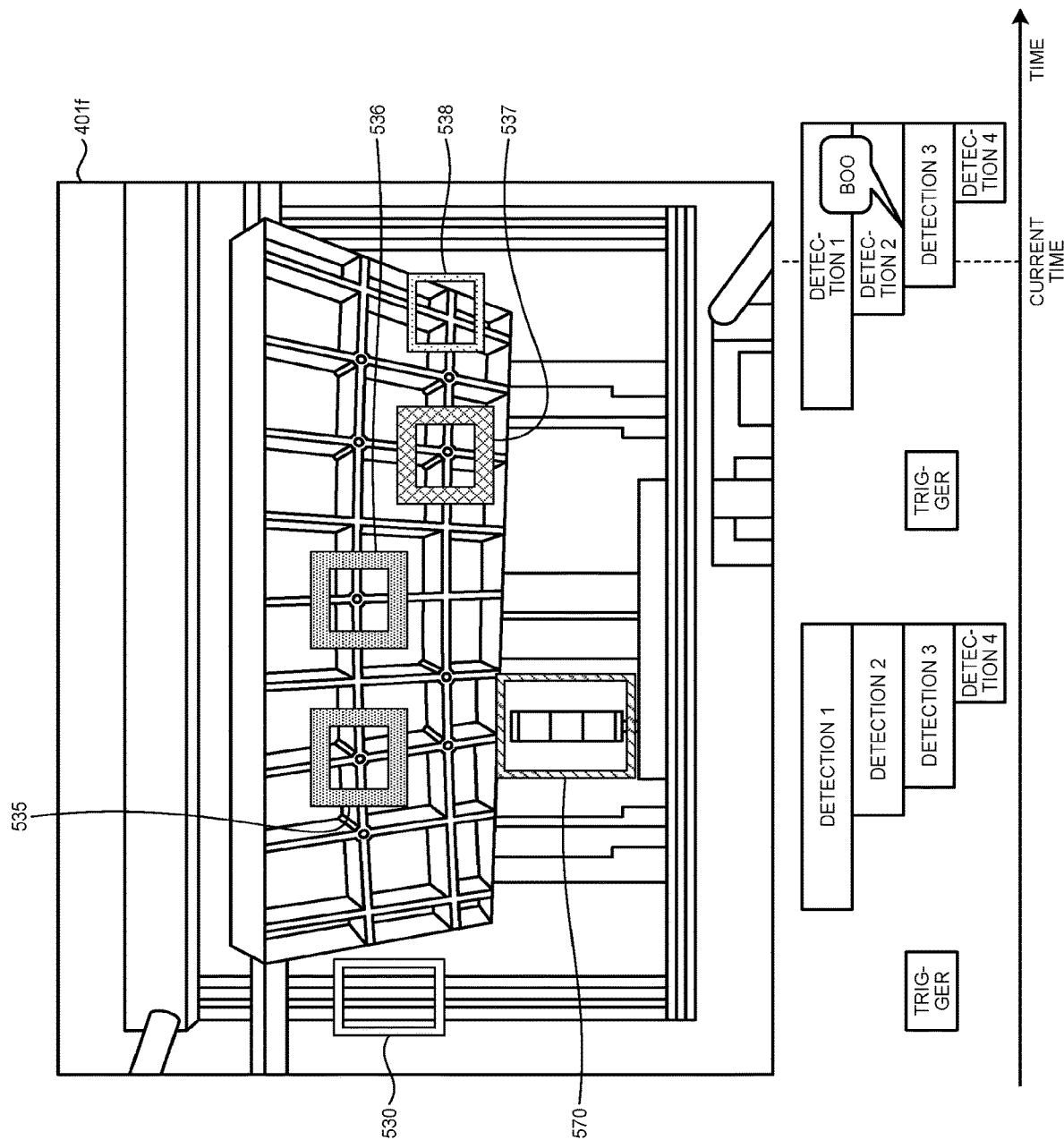
FIG. 36 is a diagram illustrating an example of a state in which the image determination is performed in the detection region by the monitoring operation which is executed on the watcher screen to be displayed in the display region of the information processing device according to the modification example of the embodiment.

Next, the detection region determination unit 314 receives the trigger signal from the trigger generating unit 313, and then, performs the image determination in the detection region 536 after "2.2" seconds, which is the detection delay time set with respect to the detection region 536. Further, the detection region determination unit 314 receives the trigger signal from the trigger generating unit 313, and performs the image determination in the detection region 537 after "2.5" seconds, which is the detection delay time set with respect to the detection region 537. As a result of the determination, in a case where a normality is detected in the detection region 536, as illustrated in FIG. 36, the first control unit 316 displays the frame representing the detection region 536 with a color different from the color in the normal state and displays the frame to be bolder than the frame in the normal state. For example, in order to represent that a normality is detected, the first control unit 316 displays the frame representing the detection region 536 with "Blue" and displays the frame to be bold, and continues the display state. In addition, as a result of the determination described above, in a case where an abnormality is detected in the detection region 537, as illustrated in FIG. 36, the first control unit 316 displays the frame representing the detection region 537 with a color different from the color in the normal state and displays the frame to be bolder than the frame in the normal state. For example, in order to represent that an abnormality is detected, the first control unit 316 displays the frame representing the detection region 537 with "Red" and displays the frame to be bold, and continues the display state.

At this time, the notifying control unit 317 outputs the abnormality detection sound notifying that an abnormality is detected (in FIG. 36, represented as "Boo") to the notifying unit 334 for a predetermined time (for example, 1 second), at a timing where an abnormality is detected in the detection region 537 by the detection region determination unit 314. At such a time point, as illustrated in FIG. 36, both of the detection regions 535 and 536 are in the display state in which a normality is detected (a state in which the frame is displayed with "Blue" and is displayed to be bold), and the detection region 537 is in the display state in which an abnormality is detected (a state in which the frame is displayed with "Red" and is display to be bold).

Figure 37:
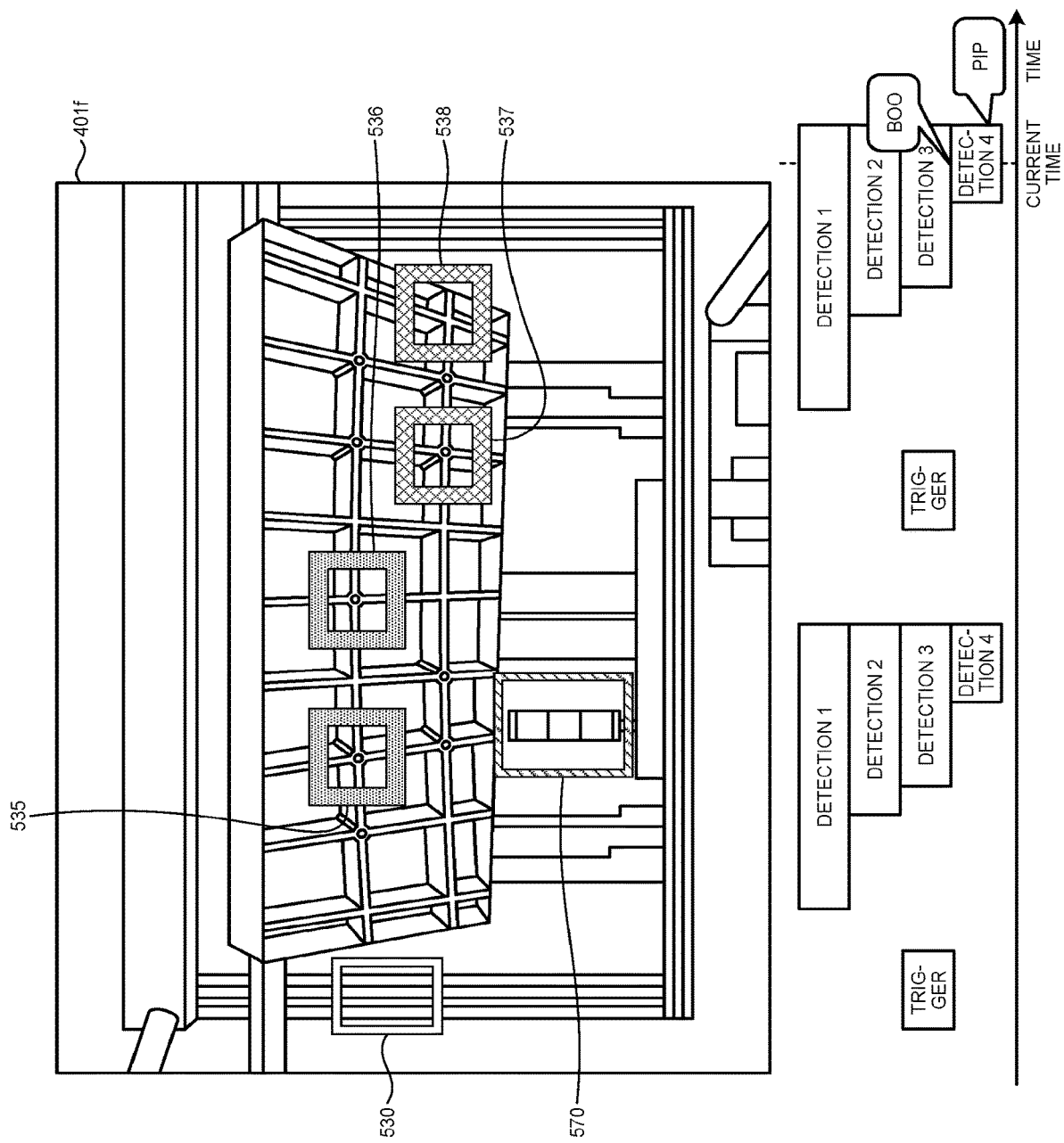
FIG. 37 is a diagram illustrating an example of a state in which the image determination is performed in the detection region by the monitoring operation which is executed on the watcher screen to be displayed in the display region of the information processing device according to the modification example of the embodiment.

Then, the detection region determination unit 314 receives the trigger signal from the trigger generating unit 313, and then, performs the image determination in the detection region 538 after "4.0" seconds, which is the detection delay time set with respect to the detection region 538. As a result of the determination, in a case where an abnormality is detected, as illustrated in FIG. 37, the first control unit 316 displays the frame representing the detection region 538 with a color different from the color in the normal state and displays the frame to be bolder than the frame in the normal state. For example, in order to represent that an abnormality is detected, the first control unit 316 displays the frame representing the detection region 538 with "Red" and displays the frame to be bold. At this time, the notifying control unit 317 outputs the abnormality detection sound notifying that an abnormality is detected to the notifying unit 334 (in FIG. 37, represented as "Boo") for a predetermined time (for example, 1 second), at a timing where an abnormality is detected in the detection region 538 by the detection region determination unit 314. At such a time point, as illustrated in FIG. 37, both of the detection regions 535 and 536 are in the display state in which a normality is detected (a state in which the frame is displayed with "Blue" and is displayed to be bold), and both of the detection regions 537 and 538 are in the display state in which an abnormality is detected (a state in which the frame is displayed with "Red" and is displayed to be bold).

Then, the first control unit 316 continues the display state of the detection regions 535 and 536, in which a normality is detected, for a predetermined time (for example, for 1 second) after the image determination in the detection region 538 to be subjected to the image determination at the final timing is ended in the detection regions 535 to 538 associated with the trigger region 530, and continues the display state of the detection regions 537 and 538, in which an abnormality is detected, for a predetermined time (for example, for 1 second). Then, the first control unit 316 returns each of the displays of the frames representing the detection regions 535 to 538 to the display of the frame in the normal state after a predetermined time.

In addition, the notifying control unit 317 outputs the determination end sound representing that the image determination in the detection region is ended (in FIG. 37, represented as "Pip") to the notifying unit 334 for a predetermined time (for example, 0.2 seconds), at a timing where all of the image determinations in the detection region according to the trigger of the trigger generating unit 313 are ended by the detection region determination unit 314 (that is, a timing where the image determination of the detection region 538 is ended). In this case, according to the image determination of the detection region 538, the abnormality detection sound and the determination end sound are superimposed and output by the notifying unit 334, but the sounds are different from each other (for example, sound of different scales, or different waveforms or melodies), and thus, it is possible for the user to differentially listen to both of the sounds. As described above, in FIGS. 35 to 37, a case will be described in which an abnormality is detected in all of the image determinations of the detection regions 535 to 538.

As with the modification example described above, the first control unit 316 continues the display state representing the determination result of each of the detection regions in the image determination operation based on the flash detecting function, until all of the image determinations of the detection regions according to the trigger of the trigger generating unit 313 are ended. Accordingly, it is possible for the user to instantly grasp the results of all of the image determinations in the detection regions according to the trigger of the trigger generating unit 313, and thus, to improve convenience.

In addition, in a case where at least any one of the function units of the first reproducing unit 304, the trigger region designating unit 305, the change point detecting unit 306, the detection region designating unit 307, the setting unit 308, the full-time detection region designating unit 309, the video distributing unit 312, the trigger generating unit 313, the detection region determination unit 314, the full-time detection region determination unit 315, the first control unit 316, the notifying control unit 317, the second reproducing unit 318, the region display control unit 319, the list control unit 320, the second control unit 321, and the display control unit 331 of this embodiment is realized by executing a program, the program is provided by being incorporated in advance in an ROM or the like. In addition, the program to be executed in the information processing device 3 of this embodiment may be configured to be provided by being recorded in a recording medium which is readable by a computer such as a CD-ROM, a flexible disk (FD), a CD-R, and a DVD in a file of an installable format or an executable format. In addition, the program to be executed in the information processing device 3 of this embodiment may be configured to be stored on a computer connected to a network such as the internet and to be provided by being downloaded through a network. In addition, the program to be executed in the information processing device 3 of this embodiment may be configured to be provided or distributed through the network such as the internet. The program to be executed in the information processing device 3 of this embodiment has a module configuration including at least any one of the function units described above, and the CPU reads out and executes the program from the ROM described above as actual hardware, and thus, each of the units described above may be generated by being loaded on a main storing device.

The above-described embodiments are illustrative and do not limit the present invention. Thus, numerous additional modifications and variations are possible in light of the above teachings. For example, at least one element of different illustrative and exemplary embodiments herein may be combined with each other or substituted for each other within the scope of this disclosure and appended claims. Further, features of components of the embodiments, such as the number, the position, and the shape are not limited the embodiments and thus may be preferably set. It is therefore to be understood that within the scope of the appended claims, the disclosure of the present invention may be practiced otherwise than as specifically described herein.

Further, any of the above-described apparatus, devices, or units can be implemented as a hardware apparatus, such as a special-purpose circuit or device, or as a hardware/software combination, such as a processor executing a software program.

Further, as described above, any one of the above-described and other methods of the present invention may be embodied in the form of a computer program stored in any kind of storage medium. Examples of storage mediums include, but are not limited to, flexible disk, hard disk, optical discs, magneto-optical discs, magnetic tapes, non-volatile memory, semiconductor memory, read-only-memory (ROM), etc.

Alternatively, any one of the above-described and other methods of the present invention may be implemented by an application specific integrated circuit (ASIC), a digital signal processor (DSP) or a field programmable gate array (FPGA), prepared by interconnecting an appropriate network of conventional component circuits or by a combination thereof with one or more conventional general purpose microprocessors or signal processors programmed accordingly.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA) and conventional circuit components arranged to perform the recited functions.

What is claimed is:

1. An image processing device, comprising:
a display device; and
processing circuitry configured to
    display real-time video data imaged by an imaging device in a predetermined display region to be displayed by the display device,
    designate a first determination region and a second determination region according to a user operation, the first determination region being a target of a first determination function for performing a first determination with respect to the video data, the second determination region being a target of a second determination function for performing a second determination with respect to the video data, both the first determination region and the second determination region being fixed regions, the first determination function being different from the second determination function, and
    display a display element representing the first determination region and a display element representing the second determination region in the display region by superimposing the elements on the video data in aspects different from each other,
wherein the processing circuitry displays, as one of the determination regions, a display element of a trigger region, which is a portion of the displayed real-time video data imaged by the imaging device, for generating a trigger on the basis of a comparison result of an image currently displayed within the trigger region with respect to a first standard image, and display elements of a plurality of detection regions as a plurality of the determination regions that are portions of the displayed real-time video data imaged by the image device and that are separate from the trigger region, for performing image determination of whether or not there is an abnormality by an image currently displayed within each respective detection region being compared with each of one or more second standard images before a predetermined time or after the predetermined time on the basis of a timing of the trigger, on each of the display regions, and the processing circuitry is further configured to
- compare an image in the trigger region with the first standard image, to generate a trigger signal on the basis of the comparison result, and
- compare features in an image in each of the detection regions with features in a corresponding second standard image of the one or more second standard images at a time point, to determine whether or not there is the abnormality based on a threshold corresponding to a similarity or difference between the compared features being exceeded, the time point being set in advance for each of the one or more detection regions, to be earlier or later than when the trigger signal is generated, by a predetermined time, wherein for at least one of the detection regions, the time point is set to be earlier than when the trigger signal is generated, and for at least another of the detection regions, the time point is set to be later than when the trigger signal is generated.

2. The image processing device according to claim 1, wherein the processing circuitry displays at least any one of the display elements of each of the determination regions as frames surrounding the determination regions of colors different from each other.

3. The image processing device according to claim 1, wherein the processing circuitry changes an aspect of the display element in a case where a predetermined state is detected in the determination region to an aspect of the display element in a case where the predetermined state is not detected in the determination region, with respect to at least any one of the display elements of each of the determination regions, and displays the changed aspect.

4. The image processing device according to claim 1, further comprising:
- a memory configured to store the video data imaged by the imaging device; and
- the processing circuitry is configured to cause the memory to store information of a date in which each of the determination regions is designated and information of a date in which the predetermined state is detected in each of the determination regions,
- wherein the processing circuitry reproduces and displays the video data stored in the storage in the display region, and
- the processing circuitry displays the display elements representing each of the determination regions in the display region, according to the information of the date stored in the memory.

5. The image processing device according to claim 4, wherein the processing circuitry is configured to display a detection date of at least any one of the predetermined states detected in each of the determination regions in a list, on the basis of the information of the date stored in the memory.

6. The image processing device according to claim 1, wherein the processing circuitry displays the video data imaged by the plurality of imaging devices in the display region.

7. The image processing device according to claim 1, wherein the processing circuitry continues display of each of the display elements representing a determination result of the image determination in each of one or more detection regions until at least all of the image determinations of one or more detection regions associated with the trigger region are ended.

8. The image processing device according to claim 1, wherein the processing circuitry is configured to output sound representing determination end when the image determination in a final detection region of the detection regions associated with the trigger region is ended.

9. The image processing device according to claim 1, wherein the processing circuitry is configured to output sound representing occurrence of an abnormality when the abnormality is detected in the detection region.

10. An image processing system, comprising:
- the image processing device according to claim 1; and
- one or more imaging devices.

11. An image processing method, comprising:
- displaying real-time video data imaged by an imaging device in a predetermined display region to be displayed by a display device;
- designating a first determination region and a second determination region according to a user operation, the first determination region being a target of a first determination function for performing a first determination with respect to the video data, the second determination region being a target of a second determination function for performing a second determination with respect to the video data, both the first determination region and the second determination region being fixed regions, the first determination function being different from the second determination function; and
- displaying a display element representing the first determination region and a display element representing the second determination region in the display region by superimposing the elements on the video data in aspects different from each other,
- wherein the method includes displaying, as one of the determination regions, a display element of a trigger region, which is a portion of the displayed real-time video data imaged by the imaging device, for generating a trigger on the basis of a comparison result of an image currently displayed within the trigger region with respect to a first standard image, and displaying elements of a plurality of detection regions as a plurality of the determination regions that are portions of the displayed real-time video data imaged by the image device and that are separate from the trigger region, for performing image determination of whether or not there is an abnormality by an image currently displayed within each respective detection region being compared with each of one or more second standard images before a predetermined time or after the predetermined time on the basis of a timing of the trigger, on each of the display regions, and
- the method further including
  - comparing an image in the trigger region with the first standard image, to generate a trigger signal on the basis of the comparison result, and
  - comparing features in an image in each of the detection regions with features in a corresponding second standard image of the one or more second standard images at a time point, to determine whether or not there is the abnormality based on a threshold corresponding to a similarity or difference between the compared features being exceeded, the time point being set in advance for each of the one or more detection regions, to be earlier or later than when the trigger signal is generated, by a predetermined time, wherein for at least one of the detection regions, the time point is set to be earlier than when the trigger signal is generated, and for at least another of the detection regions, the time point is set to be later than when the trigger signal is generated.

12. A computer program product comprising a non-transitory computer-readable recording medium having stored therein a program that causes a computer to execute:

displaying real-time video data imaged by an imaging device in a predetermined display region to be displayed by a display device;

designating a first determination region and a second determination region according to a user operation, the first determination region being a target of a first determination function for performing a first determination with respect to the video data, the second determination region being a target of a second determination function for performing a second determination with respect to the video data, both the first determination region and the second determination region being fixed regions, the first determination function being different from the second determination function; and displaying a display element representing the first determination region and a display element representing the second determination region in the display region by superimposing the elements on the video data in aspects different from each other, wherein the method includes displaying, as one of the determination regions, a display element of a trigger region, which is a portion of the displayed real-time video data imaged by the imaging device, for generating a trigger on the basis of a comparison result of an image currently displayed within the trigger region with respect to a first standard image, and displaying elements of a plurality of detection regions as a plurality of the determination regions that are portions of the displayed real-time video data imaged by the image device and that are separate from the trigger region, for performing image determination of whether or not there is an abnormality by an image currently displayed within each respective detection region being compared with each of one or more second standard images before a predetermined time or after the predetermined time on the basis of a timing of the trigger, on each of the display regions, and the method further including comparing an image in the trigger region with the first standard image, to generate a trigger signal on the basis of the comparison result, and comparing features in an image in each of the detection regions with features in a corresponding second standard image of the one or more second standard images at a time point, to determine whether or not there is the abnormality based on a threshold corresponding to a similarity or difference between the compared features being exceeded, the time point being set in advance for each of the one or more detection regions, to be earlier or later than when the trigger signal is generated, by a predetermined time, wherein for at least one of the detection regions, the time point is set to be earlier than when the trigger signal is generated, and for at least another of the detection regions, the time point is set to be later than when the trigger signal is generated.

13. The image processing device according to claim 1, wherein the determination regions are set in advance by a user of the image processing device.

14. The image processing device according to claim 1, wherein the first detection function and the second detection function comprise a full-time detecting function and a flash detecting function, the full-time detecting function being a function of constantly executing image determination of whether or not an image in a full-time detection region as one of the determination regions is abnormal, the flash detecting function is a function of executing image determination of whether or not an image in a detection region of the determination regions is abnormal at a specific timing.

15. The image processing device according to claim 1, wherein the features in the image in each of the one or more detection regions and the features in the corresponding second standard image of the one or more second standard images are pixel values in each respective image.

16. The image processing device according to claim 1, wherein for the detection regions, the abnormality is based on a threshold corresponding to a similarity between the compared features being exceeded, or based on a threshold corresponding to a difference between the compared features being exceeded.

* * * * *